(12) United States Patent
Barber

(10) Patent No.: US 6,198,947 B1
(45) Date of Patent: Mar. 6, 2001

(54) EXTERNAL CONTROL UNIT WITH REDUCED KEYPAD INTEGRATED IN VOICE ACTIVATED VEHICULAR TELEPHONE SYSTEM WITH CALL-IN-PROCESS VOICE-TO-TONES AND VOICE TO-MEMORY CONVERSION FACILITIES

(75) Inventor: Clifton J. Barber, Forest Park, GA (US)

(73) Assignee: Oki Telecom, Inc., Suwanee, GA (US)

( * ) Notice: Subject to any disclaimer, the term of this patent is extended or adjusted under 35 U.S.C. 154(b) by 0 days.

(21) Appl. No.: 08/613,633

(22) Filed: Mar. 9, 1996

Related U.S. Application Data

(60) Provisional application No. 60/012,428, filed on Feb. 28, 1996.

(51) Int. Cl.[7] .............. H04B 1/38; H04B 7/00; H04M 1/00; H04Q 3/02
(52) U.S. Cl. .......... 455/563; 455/31.2; 455/410; 379/88.02; 379/88.03
(58) Field of Search .................. 455/563, 410, 455/31.2; 379/88.02, 88.03

(56) References Cited

U.S. PATENT DOCUMENTS

| | | | |
|---|---|---|---|
| 4,320,256 | | 3/1982 | Freeman .................. 179/6.04 |
| 4,853,953 | * | 8/1989 | Fujisaki ................... 379/88 |
| 5,128,980 | * | 7/1992 | Choi ....................... 379/56 |
| 5,165,095 | * | 11/1992 | Borcherding .............. 379/88 |
| 5,297,183 | * | 3/1994 | Bareis et al. ............. 379/59 |
| 5,297,194 | * | 3/1994 | Hunt et al. ............... 379/88 |
| 5,335,261 | * | 8/1994 | Fujinaka .................. 379/58 |
| 5,384,825 | * | 1/1995 | Dillard et al. ............ 379/59 |
| 5,459,773 | * | 10/1995 | Hwang ..................... 379/57 |
| 5,481,595 | * | 1/1996 | Ohashi et al. ............. 379/67 |
| 5,530,740 | * | 6/1996 | Irribarren et al. ......... 379/89 |
| 5,561,705 | * | 10/1996 | Allard et al. ............. 379/58 |
| 5,592,531 | * | 1/1997 | Cheng et al. .............. 379/57 |
| 5,596,626 | * | 1/1997 | Nakayama ................... 379/61 |
| 5,604,791 | * | 2/1997 | Lee ........................ 379/67 |
| 5,619,556 | * | 4/1997 | Richardson, Jr. et al. .... 379/88 |
| 5,633,916 | * | 5/1997 | Goldhagen et al. .......... 379/67 |
| 5,651,055 | * | 7/1997 | Argade .................... 379/88 |
| 5,651,056 | * | 7/1997 | Eting et al. .............. 379/88 |
| 5,657,378 | * | 8/1997 | Haddock et al. ............ 379/93.23 |
| 5,698,834 | * | 12/1997 | Worthington et al. ........ 235/472 |
| 5,701,339 | * | 12/1997 | Suda ...................... 379/88 |

* cited by examiner

*Primary Examiner*—William Cumming
(74) *Attorney, Agent, or Firm*—Thomas, Kayden, Horstemeyer & Risley, LLP

(57) ABSTRACT

An external control unit (ECU) with a reduced keypad is tightly integrated in a voice activated vehicular telephone system which further includes a voice adapter (VA) providing an intelligent interface between the ECU and a portable telephone removably coupled to a portable telephone holder. By taking full advantage of the voice recognition capabilities of the VA, the ECU is able to effectively harness the extensive power of the vehicular telephone system while requiring a very small amount of vehicle space through the combination of an internal microphone and a keypad with a very few number of keys. The remaining keys are specifically chosen for their unique value in the integrated system and are further defined to support multiple mode-specific functions. Accordingly, use of a voice activated dialer key causes the system during an idle mode to prompt the user to speak a number to be dialed, yet also causes the system during a call-in-process mode to activate a voice-to-tones conversion facility for operating, for example, voice mail systems, without the need for a conventional keypad. Likewise, use of a directory key during the idle mode results in a prompt for the user to speak a name previously stored in the directory with an accompanying telephone number for dialing the number, yet use of the same key during the call-in-process mode enables a voice-to-memory conversion facility for storing in scratchpad memory spoken digits which are easily dialed upon completion of the current call.

26 Claims, 25 Drawing Sheets

EXTERNAL CONTROL UNIT WITH REDUCED KEYPAD INTEGRATED IN VOICE ACTIVATED VEHICULAR TELEPHONE SYSTEM WITH CALL-IN-PROCESS VOICE-TO-TONES AND VOICE TO-MEMORY CONVERSION FACILITIES

CROSS-REFERENCE TO RELATED APPLICATION

This application claims the benefit of U.S. Provisional Application No. 60/012,428, filed Feb. 28, 1996.

BACKGROUND OF THE INVENTION

The present invention relates generally to the field of telecommunications, and more specifically, to the field of voice activated vehicular telephone systems.

It is well known in the wireless telecommunications industry that voice recognition technologies can be used to interface with vehicular telephone systems, including analog and digital cellular telephones, personal communication system devices, and other types of communication devices. It has long been hoped that the addition of voice recognition capabilities to such systems would make the systems more user friendly, more convenient and efficient to use, easier to learn to use, and more conducive to driver safety. However, the reality is that such systems have not yet been very successful in the market. Past implementations of voice recognition technologies with vehicular telephone systems have often proven to be user unfriendly, difficult to use and learn, and lacking in incentive to overcome the learning curves associated with such systems. First of all, some of the previous systems are capable of providing only a small portion of the important call processing functions which are manually supported by the vehicular telephone system, thus incentive to use is low. Secondly, in order for other systems to provide the user a voice-based method of accomplishing many of the option-laden functions of a vehicular telephone system, such a system would need to support a large and complicated set of multi-layered commands, making it much easier for the user to decide to simply look & reach down to use the vehicular telephone system handset. As a result of not being used, the voice recognition capabilities of such systems have not facilitated greater driver safety.

Another element in many conventional vehicular telephone systems is an external control unit (ECU). Such a device provides an additional user interface which is intended to be more convenient to use than the primary control unit and is often located in the dash of an automobile, or other type of vehicle, but may also be located elsewhere inside the vehicle. A typical ECU includes an output display and most, if not all, of the keys located on the primary control unit, such as a portable telephone resting in a vehicular holder or an installed full-function handset. While ECU's are often more conveniently positioned with respect to the driver, they are typically rather large and present great positioning difficulties to automotive designers. As a result, ECU's are not currently implemented on a very large scale, and, furthermore, after-market attempts to accomplish similar functions frequently appear to consumers to be less impressive or valuable.

There have also been vehicular telephone systems which include both an ECU and a voice recognition component. While both elements have previously been included as options in vehicular telephone systems, each element has previously been designed to address the individual objectives of that element. Consequently, such thrown-together systems also fail to address the problems discussed above. In addition, the very presence of both elements in a vehicular telephone system often exacerbates those problems. For example, a user is much less likely to try to learn how to use a voice recognition system if similar call processing functions may be accessed more quickly through manual operation of a conveniently located, yet non-integrated, ECU.

There is, therefore, a need in the industry for a system for addressing these and other related, and unrelated, problems.

SUMMARY OF THE INVENTION

According to the preferred embodiment of the present invention, an external control unit (ECU) with a reduced keypad for more versatile and universal vehicular installation is tightly integrated in a voice activated vehicular telephone system which further includes a voice adapter (VA) providing an intelligent interface between the ECU and a portable telephone removably coupled to a portable telephone holder (instead of a portable telephone and holder, other embodiments include a conventional full-function automotive handset system). By taking full advantage of the voice recognition capabilities of the VA, the ECU is able to effectively harness the extensive power of the telephone system while requiring a very small amount of vehicle space through the combination of an internal microphone and a keypad with substantially fewer keys than conventional portable telephones. The keys which remain on the ECU are specifically chosen for their value as one-touch implementations of many functions which could otherwise require more time-consuming and complicated voice instructions, as well as for their ability to ensure that all call processing functions are provided by the telephone system without access to a complete keypad. Likewise, by leveraging a carefully designed VA's ability to efficiently and precisely provide audible prompts and other status information to the user, the ECU of the preferred embodiment of the present invention is intentionally designed without a display. Thus, due, at least in part, to the reduced number of keys on the ECU and the intentional absence of a display, the ECU of the preferred embodiment is easy and convenient to learn and use and provides a user the incentive to use the voice recognition capabilities of the VA, resulting in more realization of the intended benefits of voice recognition integration into a vehicular telephone system.

In addition, the tight integration of the telephone system enables the ECU keys to provide a variety of different functions varying with different operational modes of the system, such as, for example, during an idle mode compared to a call-in-process mode. Accordingly, use of a voice activated dialer (VAD) key during the idle mode causes the vehicular telephone system to prompt the user to speak a number to be dialed. However, use of the VAD key during the call-in-process mode causes the vehicular telephone system to, for as long as the key is depressed, to activate a voice-to-tones conversion facility to generate, play, and transmit dual tone multi-frequency (DTMF) tones, a unique voice-activated call-in-process facility. This facility enables a user to, for example, operate an audio response system, such as a voice mail system, without the need for a conventional keypad with a full complement of digit keys. Likewise, use of a directory (DIR) key during the idle mode results in a prompt for the user to speak a name previously stored in the directory for quickly dialing an accompanying stored telephone number. However, use of the same key during the call-in-process mode enables a voice-to-memory conversion facility for storing in scratchpad memory digits spoken while the key is depressed. According to this inventive aspect of the present invention, a call to the telephone number spoken by the user during the current call may be started immediately upon completion of the current call. Of course, a variety of other equally important inventive aspects of the present invention are also described below, such as, for example, the existence of UP and DOWN keys on the ECU which are supported by the VA to be mode-specific and multi-functional, as is discussed below.

It is therefore an object of the present invention to provide an external control unit with a reduced keypad based on a supporting voice activated dialing facility.

Another object of the present invention is to provide a voice activated vehicular telephone system with a call-in-process voice-to-tones facility.

Yet another object of the present invention is to provide a voice activated vehicular telephone system with a call-in-process voice-to-memory facility.

Still another object of the present invention is to provide a voice activated vehicular telephone system with an external control unit with a reduced keypad integrated with a call-in-process voice-to-tones facility and a call-in-process voice-to-memory facility.

Another object of the present invention is to provide an external control unit for a voice activated vehicular telephone system wherein the external control unit includes a plurality of keys and an internal microphone.

Yet another object of the present invention is to provide an external control unit interface for a voice activated vehicular telephone system wherein the external control unit includes fewer than a complete complement of digit keys.

One other object of the invention is to provide an external control unit interface for a voice activated vehicular telephone system wherein the external control unit does not include a display.

Still another object of the present invention is to provide an external control unit interface for a voice activated vehicular telephone system wherein the external control unit includes at least one of a VAD key or a DIR key.

Another object of the present invention is to provide an external control unit interface for a voice activated vehicular telephone system wherein the external control unit includes a mute key and a mute indicator.

Yet another object of the present invention is to provide a voice activated vehicular telephone system including a portable telephone, a portable telephone holder, a voice adapter, and an external control unit with a reduced keypad.

Still another object of the present invention is to provide a method for generating, playing, and transmitting dual tone multi-frequency tones corresponding to user speech detected during a call.

Another object of the present invention is to provide a method for storing digits into memory corresponding to user speech detected during a call.

Yet another object of the present invention is to provide a voice adapter for a vehicular telephone system which passes to a portable all keystrokes from an ECU, except for UP and DOWN keys during a directory scroll mode, in which case those keys are used to control the scrolling of stored audio label playback.

Other objects, features and advantages of the present invention will become apparent upon reading and understanding the present specification, when taken in conjunction with the accompanying drawings.

DETAILED DESCRIPTION OF THE PREFERRED EMBODIMENTS

Figure 1:
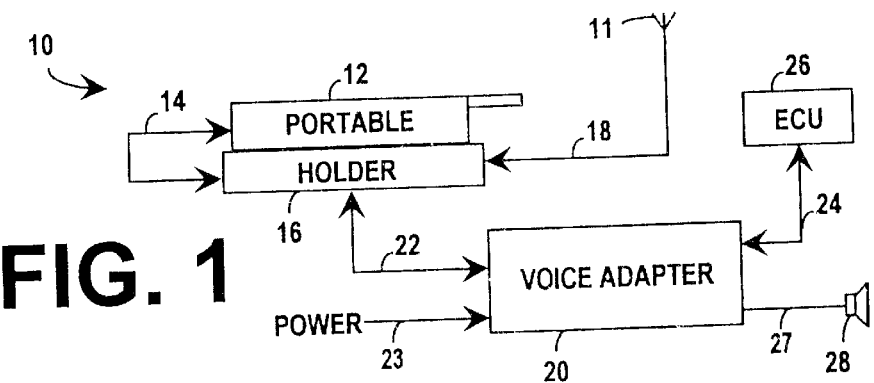
FIG. 1 is a block diagram representation of a vehicular telephone system in accordance with one preferred embodiment of the present invention.

Reference is now made to the drawings wherein like reference numerals designate corresponding parts throughout the several figures. Referring now to FIG. 1, the first preferred embodiment of the present invention includes a voice activated vehicular telephone system 10 which includes a portable telephone 12 removably coupled (both physically and electrically) through a line 14 to a holder 16 which is electrically coupled to an external antenna 11 through a radio frequency (RF) coaxial line 18 and to a voice adapter (VA) 20 through a multi-conductor line 22. The VA 20 is further connected to a power source (e.g., an automobile battery, not shown) through a line 23 (including raw power, ignition-switched power, and ground), to a speaker 28 through a speaker line 27, and to an external control unit (ECU) 26 through a line 24.

Figure 2:
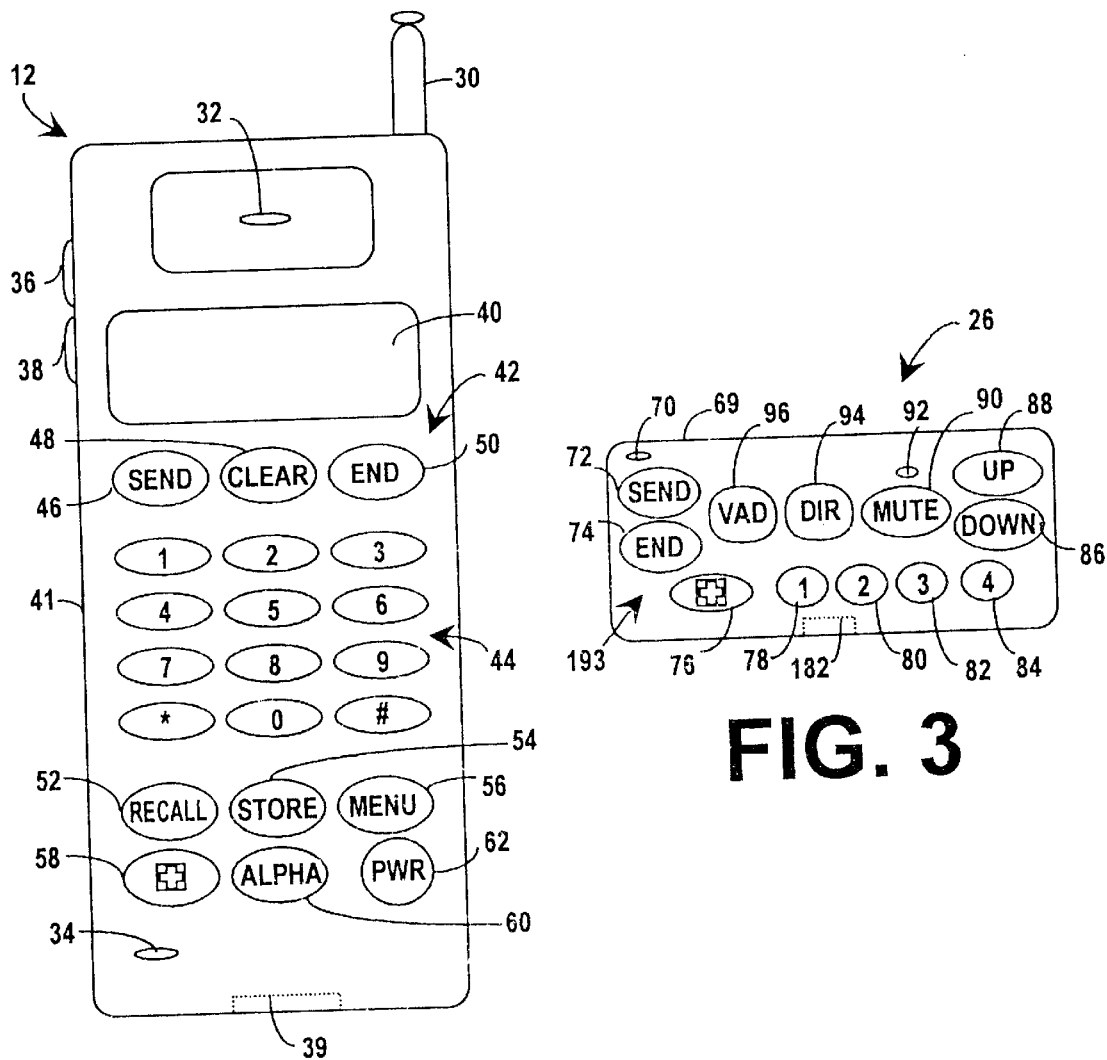
FIG. 2 is a schematic block representation of the portable telephone thereof.

Refer now to FIG. 2 for a schematic block representation of the portable telephone 12 of the first preferred embodiment of the present invention. Portable 12 includes, at least, an external interface 41 accommodating a front keypad 42, a display 40 (such as a liquid crystal or other type of display), an RF antenna 30, up/down keys 36, 38, an internal speaker 32, an internal microphone 34, and an input/output (I/O) connector 39. Keypad 42 includes a numeric keypad 44 including a full complement of digit keys and "*", "#" keys. Keypad 42 also includes a send key 46, a clear key 48, an end key 50, a recall key 52, a store key 54, a menu key 56, an emergency dialing key 58, an alpha-numeric key 60, and a power key 62. These keys are all used in normal cellular telephone functionality, and, when appropriate, the function of particular keys are described below as the functions relate to the present invention. Moreover, other components of the portable 12 will be described below in more detail in reference to FIG. 4.

Figure 3:
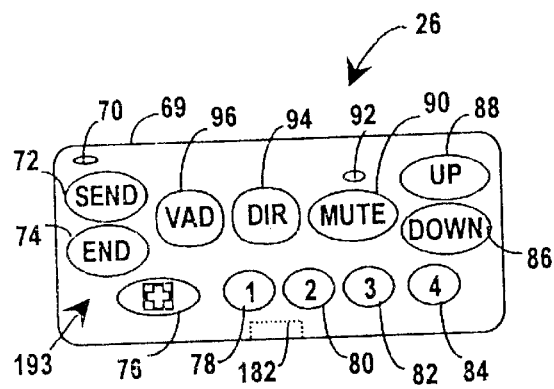
FIG. 3 is a schematic block representation of the external control unit thereof.

FIG. 3 is a schematic block representation of the ECU 26 of the first preferred embodiment of the present invention. Constructed for being mounted to a surface within an automobile (such as a dash, or, alternately, the inside surface of a windshield), the ECU 26 includes a rigid vehicular mounting structure 69 supporting a reduced keypad 193, a microphone 70, and a mute indicator light 92. The reduced keypad 193 includes a send key 72, an end key 74, an emergency dialing key 76 (also a special type of "quick dial" key), quick dial (QD) keys 78, 70, 82, 84, labeled "1", "2", "3", and "4", respectively, a down key 86, an up key 88, a mute key 90, a directory (DIR) key 94, and a voice activated dialing (VAD) key 96. The ECU 26 further includes an I/O connector 182 coupled to internal supporting circuitry of the ECU 26 as is discussed below.

Figure 4:
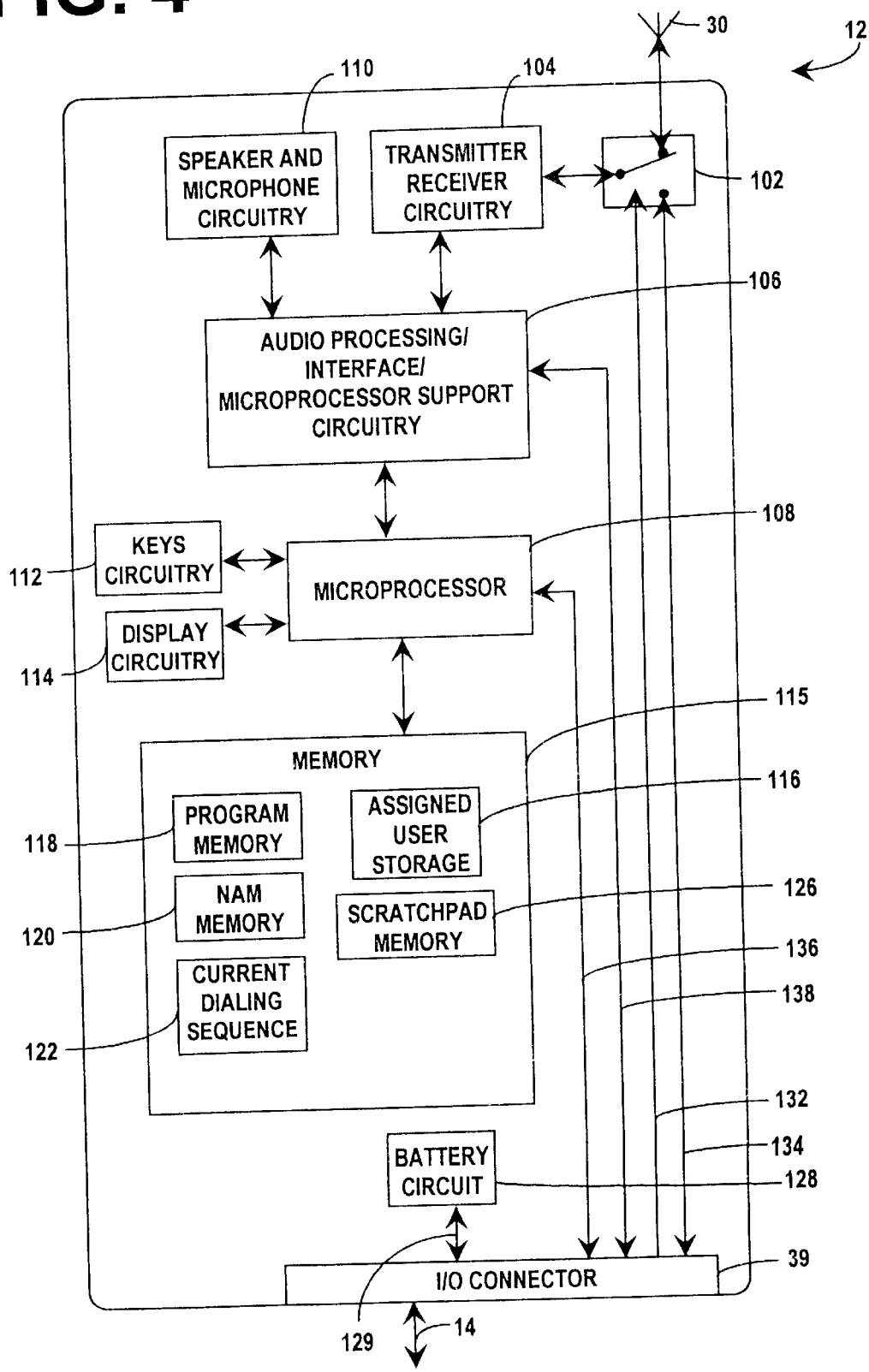
FIG. 4 is a block diagram representation of the portable telephone thereof.

Turn now to FIG. 4 for a block diagram representation of the portable telephone 12 according to the first preferred embodiment of the present invention. Portable 12 internally includes a microprocessor 108, memory 115 having memory allocated for various functions (described in detail below), keys circuitry 112, display circuitry 114, audio processing/interface/microprocessor support circuitry 106, speaker and microphone circuitry 110, transmitter and receiver circuitry 104, RF relay 102 connected to antenna 30, I/O connector 39, and battery circuit 128. Through various conductors, microprocessor 108 is coupled to memory 115, display circuitry 114, keys circuitry 112, audioprocessing/interface/microprocessor support circuitry 106, and to I/O connector 39 through line 136. Battery circuit 128 of portable 12 is coupled to I/O connector 39 through line 129 and through other lines (not shown) to various components of portable 12 which require power and ground from battery circuit 128, as would be understood by one reasonably skilled in the art. Audio processing/interface/microprocessor support circuitry 106 is further coupled through line 138 to I/O connector 39, through a line to transmitter and receiver circuitry 104, and through a line to speaker and microphone circuitry 110. Transmitter and receiver circuitry 104 is coupled through a line to RF relay 102, which alternates between connecting the line from transmitter and receiver circuitry 104 to an RF line coupled to portable antenna 30 and a connection to line 134 coupled through I/O connector 39 and an RF line of line 14 through the holder 16 and RF line 18 to external antenna 11 (FIG. 1). During operation, the particular state of RF relay 102 at any given time (i.e., whether transmitter and receiver circuitry 104 is coupled to portable antenna 30 or through I/O connector 39 to external antenna 11) is determined by whether portable 12 is electronically coupled to the holder 16 (FIG. 1). It should also be understood that additional lines not shown are connected through I/O connector 39 (as with other connectors of this first preferred embodiment) as necessary and as would be understood by those reasonably skilled in the art (e.g., digital and analog grounds, other sensing lines, etc.)

Consideration is now given to a more detailed description of memory 115 of portable 12, according to the first preferred embodiment of the present invention as illustrated in FIG. 4. It should be understood that, although not specifically delineated in FIG. 4, memory 115 encompasses all on-board memory of portable 12 associated with microprocessor 108 of portable 12. Thus, in addition to other memory areas not specifically delineated, memory 115 includes, at least, program memory 118, NAM (number assignment module) memory 120, assigned user storage 116, scratchpad memory 126, and current dialing sequence memory 122. Memories 116, 118, 120, 122, and 126 may include both nonvolatile and volatile memory. Program memory 118 stores executable programs which run, as determined by microprocessor 108, during any operation of portable 12. NAM memory 120 stores the telephone number for the portable 12, electronic serial number information, personal & vehicle options, and other parameters required for proper operation of the phone, etc. Assigned user storage 116 stores telephone numbers and assigned alpha-numeric descriptions (names) in a scrollable and individually addressable arrangement; scratchpad memory 126 temporarily stores unassigned telephone numbers in scrollable form; and current dialing sequence memory 122 temporarily stores the telephone number which will be used to initiate the next call. Speaker and microphone circuitry 110 supports the internal speaker 32 and microphone 34 (FIG. 2) which are operational when the portable 12 is not in a handsfree mode, and keys circuit 112 supports normal key entry on cellular telephone keypad 42 (FIG. 2) and up/down keys 36, 38 (FIG. 2) of portable 12. Display circuitry 114 is associated with controlling display 40 of portable 12.

Figure 5:
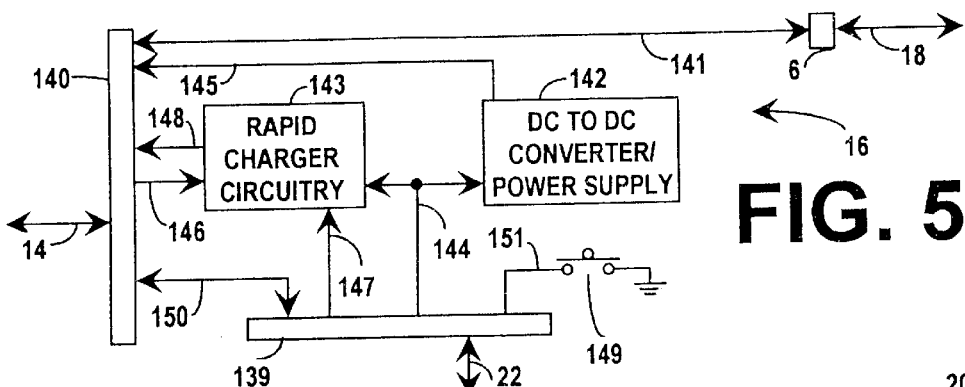
FIG. 5 is a block diagram representation of the holder thereof.

Reference is now made to FIG. 5 which is a block diagram representation of the holder 16. Connectors 139 and 140 combine and couple data signal lines and audio signal lines 150 through holder 16 for data and audio communication between portable 12 and VA 20 (FIG. 1) through lines 14 and 22. The connector 140 also couples RF signals through the holder 16 over an RF signal line 141 to coaxial connector 6 connected to the RF line 18, and eventually the external antenna 11 (FIG. 1). A power line 144 couples power through the connector 139 to rapid charger circuitry 143 and DC-to-DC converter/power supply 142, which in turn couples power through line 145 to the connector 140 and line 14 for powering the portable 12 and controlling the antenna relay 102 (FIG. 4). The rapid charger circuitry 143 also receives a control signal from the VA 20 (FIG. 1) coupled through the connector 139 and line 147 to suspend battery charging while a call is in process. A thermal indicator line 146 also enables the charger 143 to sense battery temperature in the portable 12 (FIG. 1) and adjust accordingly as it supplies charging current over line 148. When the portable 12 is mechanically engaged into the holder 16 (FIG. 1), an on-hook/off-hook switch 149 is closed. The movement of the switch 149 grounds a circuit internal to the holder 16, an action which is signaled on line 151.

Figure 6:
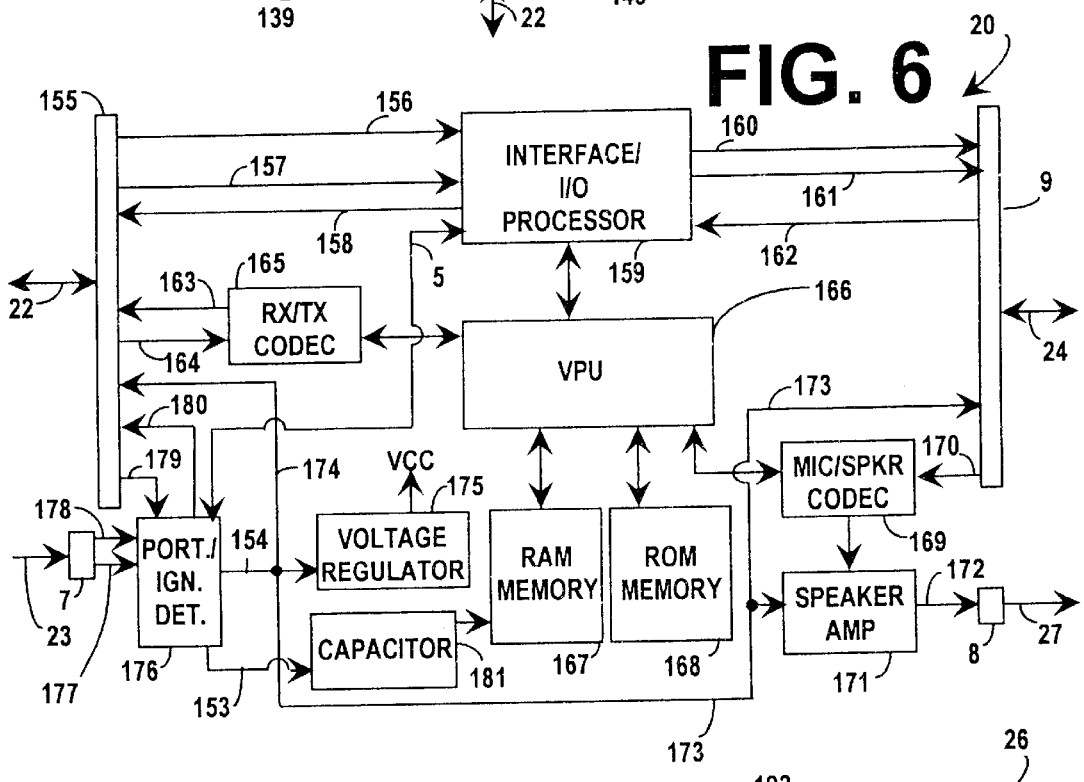
FIG. 6 is a block diagram representation of the voice adapter thereof.

Attention is next directed to FIG. 6 which is a block diagram representation of the voice adapter (VA) 20 in the first preferred embodiment. The VA 20 includes, at least, an interface/(I/O) processor 159 (an acceptable example of which is the 80C51) which is coupled to holder 16 (FIG. 1) through lines 156, 157, and 158, the connector 155, and line 22, and also coupled to the ECU 26 (FIG. 1) through synchronous clock line 160 and synchronous data lines 161 and 162, a connector 9, and line 24. Line 156 is coupled to line 151 of FIG. 5 to notify the interface/(I/O) processor 159 of the mechanical engagement of the portable 12 into the holder 16 (FIG. 1) to evoke handsfree capabilities. Serial data lines 157 and 158 provide for asynchronous data communication between the interface/(I/O) processor 159 and the microprocessor 108 in the portable 12 (FIG. 4) after traveling through line 22, the holder 16, and line 14 (FIG. 1). The interface/(I/O) processor 159 is also coupled to a voice processing unit (VPU) 166. One example of an acceptable VPU 166 includes a digital signal processor (DSP) TI 320C541 with handsfree operation provided through software. Another example of an acceptable VPU 166 includes a microprocessor/application-specific integrated circuit (ASIC) combination with separate hardware for handsfree functionality. Thus, the CODECs 165, 169 discussed below are omitted in the non-DSP embodiment since the handsfree functionality is handled through separate hardware.

According to this first preferred embodiment, the VPU 166 is coupled to a MIC/SPKR CODEC 169 which is a microphone/speaker coder-decoder that is coupled to the microphone 70 of ECU 26 (FIG. 3) through a line 170, connector 9, and line 24, and is also coupled to speaker 28 (FIG. 1) through a speaker amplifier 171, a connector 8, and line 27. When the interface/(I/O) processor 159 detects a hook switch close at the holder 16 via line 156, the portable 12 is notified through the data line 158 to cease using the internal microphone and speaker 34, 32, respectively, (FIG. 2). Simultaneously, the VPU 166 is instructed to enable operation of the MIC/SPKR CODEC 169 by passing digitized voice back and forth between the RX/TX CODEC 165 and the MIC/SPKR CODEC 169. Thus the VPU 166 handles the handsfree audio signal conditioning including handsfree echo canceling, noise reduction, etc. The RX/TX CODEC 165 is a receive/transmit coder-decoder that is in turn coupled through line 163, the connector 155, line 22, through the holder 16 (FIG. 5), through line 14, through the I/O connector 39 (FIG. 4), and line 138 to the audio processing/interface/microprocessor support circuitry 106 of portable 12. Furthermore, the VPU 166 is coupled to RAM memory 167 and ROM memory 168, including both volatile (with limited backup power) and nonvolatile memory, respectively. ROM memory 168 includes static information, such as program memory, standard tables (including speaker independent voice recognition template memory), and standard prompts. However, RAM memory 167 includes directory memory for storing recorded user-defined names and numbers, voice recognition template memory for those user-defined names, and personal/vehicle options memory.

Raw, unswitched, vehicular battery power is coupled through line 23, a connector 7, and a line 177 to a portable/ignition detector 176. Ignition-switched vehicular battery power is also coupled through line 23, connector 7, and a line 178 to the portable/ignition detector 176. A portion of the raw battery power coupled to the portable/ignition detector 176 is voltage regulated and coupled through a line 153 to a capacitor 181. The capacitor 181 is normally charged by the power coupled through the line 153 to provide back-up power to the RAM 167. For example, if the vehicle battery dies or is disconnected as it is during normal vehicle service operations, the residual charge on the capacitor 181 is used to maintain power to the RAM 167 to maintain the integrity of information stored therein for a period of time until the battery is charged again or a new battery is installed in the vehicle. Switched battery power (approximately 12 volts) is coupled from portable/ignition detector 176 through lines 154, 173, and 174 to various other subsystems of the first preferred embodiment including various other components of the VA 20. This includes any portion of system 10 requiring switched battery power, including: i) holder 16 (FIG. 1) through line 174, connector 155, and line 22; ii) ECU 26 through line 173, connector 9, and line 24; iii) through line 173 to the speaker amplifier 171 which is in turn coupled through the line 172 and the connector 8 to drive the speaker 28; iv) through line 154 to a voltage regulator 175 on-board VA 20 which is used to regulate power coupled to any other portion of the system 10 requiring regulated power (i.e., power coupled after the voltage regulator 175 as Vcc to the other subsystems of system 10 or components of VA 20).

The portable/ignition detector 176 of the VA 20 is also coupled through a line 179 to detect if the portable 12 (FIG. 1) has been electrically connected to the holder 16 for the purpose of enabling operation of all modules in system 10. The portable/ignition detector 176 is coupled to the interface/(I/O) processor 159 through a line 5 to receive an indication of whether a call is in process for holding after ignition dies and for assisting in charge control, as well as letting the interface/(I/O) processor 159 know when the vehicle ignition key has been turned to the on position. In addition, the portable/ignition detector 176 is coupled to the holder 16 through a line 180 to control battery charging. When the portable 12 (FIG. 1) is not electrically connected to the holder 16 (line 179), power is switched off from being provided by the portable/ignition detector 176 to other elements, except for power to the capacitor 181. This situation is also true when the ignition key is determined to be in the off position (line 177), except when a call is in process (line 5).

Figure 7:
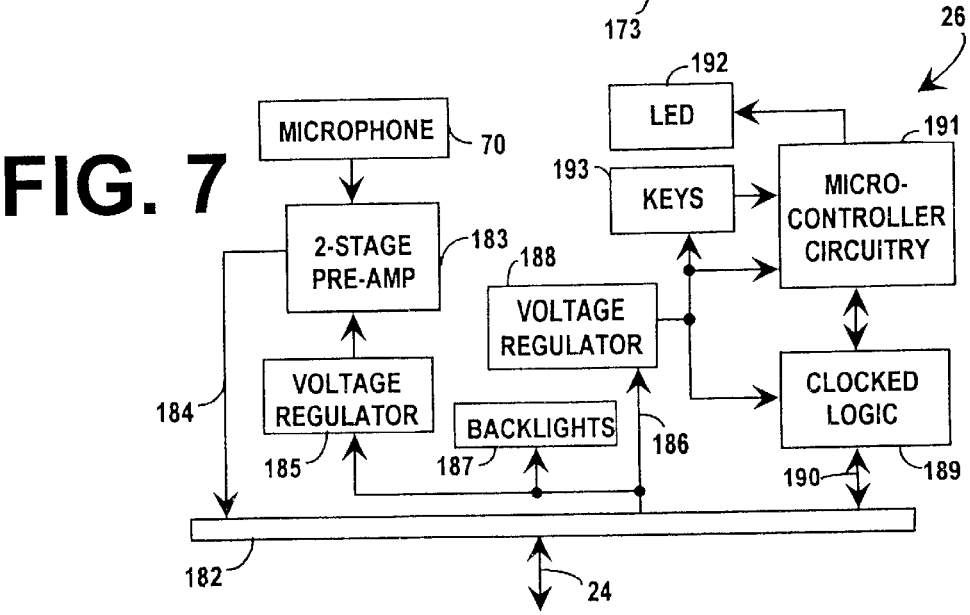
FIG. 7 is a block diagram representation of the external control unit thereof.

At this point, for a more detailed discussion of the ECU 26, reference is made to FIG. 7 which is a block diagram representation of the ECU 26. The ECU 26 includes, at least, a connector 182, microcontroller circuitry 191, a reduced keypad 193, an LED 192, backlights 187, voltage regulators 185 and 188, a 2-stage preamplifier 183, and the microphone 70. The ECU 26 is coupled to line 24 through connector 182 for propagating signals sent between ECU 26 and VA 20 (FIG. 6). The microcontroller circuitry 191 of ECU 26 is coupled to the connector 182 through clocked logic 189 and a line 190. Moreover, the microcontroller circuitry 191 controls activation of the LED 192 as directed by the VA 20 (FIG. 6), continually polls the reduced keypad 193 to detect key presses and key releases (NOOP's) before notifying the VA 20 through the clocked logic 189 and line 190, and receives power from voltage regulator 188. The voltage regulators 185 and 188 are coupled to the connector 182 through a line 186, while the voltage regulator 188 is also coupled to the clocked logic 189. The backlights 187 are coupled to the connector 182 likewise through the line 186 and provide light to the reduced keypad 193. The reduced keypad 193 is also coupled to the voltage regulator 188. In addition, the voltage regulator 185 is coupled to the 2-stage preamplifier 183, which is in turn coupled to the connector 184 and the microphone 70 which detects user audio sounds and generates representative signals transmitted to the VA 20 (FIG. 6). Note that, in general, in the figures, the directions of arrowheads on any lines coupling any subsystems of the system 10, or any of the components thereof, are meant to indicate the direction of flow of signals therebetween. Lines coupling these subsystems, or subsystem components, having more than one arrowhead indicate that signals are coupled in more than one direction.

Up until now the discussion has centered mainly on the structural relationships between the various subsystems, and components thereof, of the first preferred embodiment in accordance with the present invention. The focus hereinbelow presently shifts more to a description of the functional relationships of these subsystems and components, and to methods of the first preferred embodiment in accordance with the present invention. Thus, along with the specified flowcharts, also refer to one or more of FIGS. 1–7 to see the various structural elements.

At the heart of the present invention is the VA 20. The VA 20, in combination with the ECU 26, enables a user to control all basic call processing functions through an integrated combination of voice commands and operation of the ECU 26, including, at least, the following: i) generating signals for placing a call; ii) generating DTMF signals while a call is in process; iii) entering digits into scratchpad memory while a call is in process; iv) answering calls; v) terminating calls; vi) placing calls by selecting names in a user directory having numerous locations (the directory memory), such as "HOME", "OFFICE", or "MOM" in the VA 20; vii) placing calls by selecting memory location numbers in numerous memory locations in the portable 12; viii) muting; ix) volume changes; x) quick dialing; and xi) programming and/or deleting phone numbers in both the numerous memory locations in the portable 12 (by memory location number) and/or in the directory memory in the VA 20 (by voice label). In implementing the above described first preferred embodiment, the different operational modes of the system 10 will be described in some detail, including an idle mode 200 (discussed below in reference to FIG. 8) and a call-in-process (CIP) mode 1060 (discussed below in reference to FIG. 29). However, before discussing these modes, which occur after power-on and initialization of the system 10, (with the portable 12 positioned in the holder 16 in handsfree mode), consideration is given specifically to the events that occur upon power-on and initialization of the VA 20.

Accordingly, on power-up, the VA 20 enters its initialization or wake-up mode and initializes all circuits (including audio processing) to their default settings. Also, in wake-up mode, the portable 12 (if powered-on and initialized) will send a TERM VERS REQ (terminal version request) command to the VA 20 over a reverse data connection (including lines 14, 150, 22, and 157 of FIGS. 5 and 6) to determine which peripherals are attached to system 10. For instance, if a 3-WATT BOOSTER is also coupled to the VA 20, then the VA 20 must accommodate the portable 12 and intercept the TERM VERS REQ command, send a response (a CONFIG command) to the portable 12 such as, for example, 00H=NO 3-WATT BOOSTER or 01H=3-WATT BOOSTER ATTACHED, and forward the TERM VERS REQ command to the ECU 26 through line 24. Communication from the VA 20 to the portable 12 is accomplished through a forward data connection, including lines 158, 22, 150, and 14. The ECU 26, upon receipt of the TER VERS REQ command, will also send a response (TERM VERS STATUS) which will be passed to the portable 12 via the VA 20 to indicate the type of control unit (i.e., the ECU 26) which is attached. This response will allow the portable 12 to specifically control and interface to the ECU 26 based on a list of control units that the portable 12 is capable of supporting. In addition, in wake-up mode, the portable 12 will send a volume command to the VA 20 which the VA 20 will use to set a volume level for voice prompts (discussed below) and user-programmed label playback. The VA 20 will then reply with a KEYTONES ON command to indicate the presence of the VPU 166 in the system, and enter its idle mode (also described below). However, the VA 20 will not go into its idle mode if the portable 12 sends a KEY CONTROL STOP DATA command to the VA 20 to indicate that the portable 12 is in its initialization routines and that no Forward Data should be sent. The VA 20 will pass the KEY CONTROL STOP DATA command on a Reverse Data line though line 24 to the ECU 26, but no forward data will be accepted by, or transmitted to, the portable 12 on a Forward Data line through line 22 until a KEY CONTROL SEND TEST command is received at the VA 20 from the portable 12. Once the initialization routines of the portable 12 have been completed, the portable 12 will send the KEY CONTROL SEND TEST command to indicate their completion and that the Forward Data line is again active. This command is passed by the portable 12 through the holder 16 and the VA 20 to the ECU 26.

Figure 8:
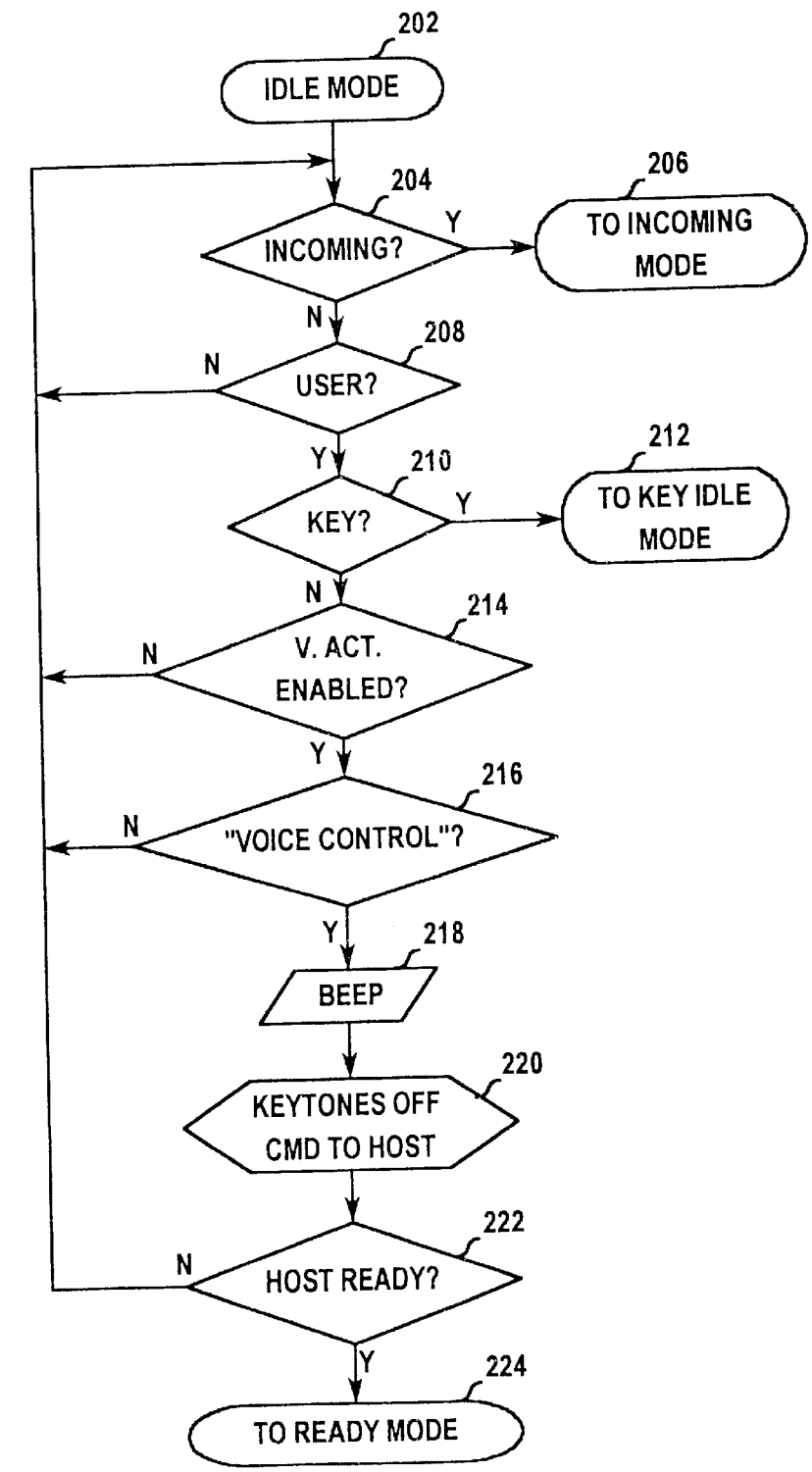
FIG. 8 is a flow chart representation of an idle mode of operation thereof.

Once the portable 12 and the VA 20 are powered-on and initialized, the system 10 enters the idle mode 200 FIG. 8).Before discussing idle mode 200 (see FIG. 8) of system 10 further, it should be noted that for the system 10, there is another parallel operating mode which, for certain processing modes of the VA 20, allows the VA 20 to receive (over coupled lines as described above) and process commands from the portable 12 to perform other activities. These commands include, as an example, a KEYTONE VOLUME command from the portable 12 which functions to pause a current processing state of the VA 20 to set an audio output volume level for speaker 28 according to the command parameters and then return VA 20 to its current processing state. Another command which can be received by the VA 20 from the portable 12 is an ALERT TONE START command, which causes the VA 20 to cancel any voice activated dialing operation in progress, and then the VA 20 goes to an incoming call mode 230 (described below in reference to FIG. 9). Similarly, commands received by the VA 20 produce corresponding actions by the VA 20 as follows: i) TRANSFER TO V-CH (voice-channel) causes the VA 20 to go to CALL IN PROCESS mode; ii) AUDIO MUTE ENABLE causes the VA 20 to set an AUDIO MUTE signal to ON (for those implementations including a signal output to mute a car stereo while a call is in process); iii) AUDIO MUTE DISABLE causes the VA 20 to set the AUDIO MUTE signal to OFF; iv) HORN ON causes the VA 20 to set a HORN ALERT signal to ON (for those implementations including a signal output to use an automotive horn to alert a user of an incoming call; v) HORN OFF causes the VA 20 to set the HORN ALERT signal to OFF; vi) BOOSTER POWER ON causes the VA 20 to set a BOOSTER ENABLE line to ON, to set POWER LEVEL= 000, and to set an internal BOOSTER POWER flag ON; vii) BOOSTER POWER OFF causes the VA 20 to set the BOOSTER ENABLE line to OFF and set the internal BOOSTER POWER flag to OFF; viii) SET BOOSTER POWER LEVEL causes VA 20, if BOOSTER POWER flag=ON, to set BOOSTER POWER CONTROL lines to a BOOSTER POWER LEVEL indicated by this command, and if BOOSTER POWER flag=OFF, to ignore this command; ix) VA DTMF ENABLE causes the VA 20 to enable DTMF tone detector function in the VA 20; and x) VA DTMF DISABLE causes the VA 20 to disable the DTMF tone detector function in the VA 20. Without implying anything about the other commands above, the last two commands are not required in the preferred embodiment. Note also that the VA 20 forwards all commands from the portable 12 to the ECU 26 and key presses and status responses from the ECU 26 to the portable 12 except for the UP 88 and DOWN 86 keys as they apply to a directory scroll mode 510 which is described in more detail in relation to FIG. 15.

When the VPU 166 is actively processing voice commands (i.e., active mode=not in idle mode), any 10 second period where no voice command is detected will cause the VA 20 to forward "RCL" "RCL" (i.e., two RECALL commands as if a user pressed the RECALL key twice on the portable 12) keystrokes to the portable 12 to abort any commands in process and to retain the current dialing sequence on the display 40. Then the VA 20 will issue two audible beeps over the speaker 28, and then return to idle mode 200. Also, similar results will occur if the VA 20 receives a VAD NOT READY, an OFF HOOK, or a DC LOOP ON command. While in active mode, the VA 20 will recognize a user saying "HELP" or "TERMINATE" (global keywords recognized at almost any time). The function of the "HELP" verbal command is to request a voice synthesized response over the speaker 28 from the VA 20 as to valid keywords for the VA 20 at the particular time the voice command is issued. The VA 20 responds to "HELP" by playing back an initial prompt for that entry point plus acceptable keywords for the benefit of the user. On the other hand, the "TERMINATE" verbal command functions to cancel active mode. The VA 20 responds to "TERMINATE" to cancel any operations in process by sending the "RCL" "RCL" keystroke commands to terminate any commands in process and retain a dialing sequence on the display 40. The VA 20 also issues a KEY TONES ON command to the portable 12, issues two (2) audible beeps or "bye" on the speaker 28, and the system 10 (the VA 20) returns to the idle mode 200.

Note, however, that during active mode, if any improper keystroke on the ECU 26 is detected by the VA 20, active mode will be aborted, the VA 20 will issue two (2) beeps over the speaker 28, and the VA 20 will return to idle mode 200. The UP and DOWN commands will be passed through to the portable 12 in response to a user pressing the UP 88 and DOWN 86 keys on the ECU 26 for volume control or intercepted for DIRECTORY SCROLL functions (described below). Note also that there are recognition prompts which are voice synthesized by the VA 20 and issued over speaker 28 if the VA 20 cannot recognize a verbal command from the user. Such global prompts include, at least, "PLEASE REPEAT" and "LOUDER, PLEASE". The former is heard over the speaker 28 if the user says a word which is detected by the VA 20, but the word is not close enough in sound to any active key word recognized by the VA 20. On the other hand, the latter is heard over the speaker 28 if the user says a word, but the word is not sufficiently detected by the VA 20, perhaps because the user spoke at too low a volume.

Returning now to FIG. 8, in idle mode 200, before decision block 204, a VRU PERS PREF command may be sent from the portable 12 which indicates a user's PERSONAL PREFERENCE options to VA 20. As a result of this, PERSONAL PREFERENCE options are set per data in the VRU PERS PREF command and idle mode 200 continues. The portable 12 may also send a VRU VEHICLE OPTIONS command which transmits VEHICLE CONFIGURATION options to the VA 20 to be set per data in the VRU VEHICLE OPTIONS command and idle mode 200 continues. If an incoming call is detected by system 10, then flow proceeds along the yes branch of step 204 through incoming mode step 206 to incoming mode 230 (FIG. 9) which is described below. As discussed below, "global" keywords of the system 10 are not active when system 10 is in idle mode 200. If, however, there is no incoming call in step 204, flow proceeds along the no branch of step 204 to step 208 in which it is determined if there is any user action. If there is no user action, flow proceeds along the no branch of step 208 and the system 10 returns to step 204.

If, however, the user acts, flow proceeds to step 210 in which it is determined if a key has been pressed (either on the portable 12 or the ECU 26). If a key has been pressed, flow proceeds along the yes branch of step 210 through key idle mode step 212 to key idle mode 260 (FIG. 10) which is described below. On the other hand, if no key has been pressed, then flow continues along the no branch of step 210 to step 214 where it is ascertained whether or not voice activation has been enabled. Note that if, at any time, VOICE ACTIVATION ENABLE=OFF is set by a command to the VA 20, or such is the initialization state, voice recognition algorithms within the VPU 166 are not enabled during the idle mode 200. When voice activation is not enabled, flow proceeds along the no branch of step 214 and system 10 returns to step 204. Alternatively, when voice activation is enabled, flow moves along the yes branch of step 214 to step 216 where the VA 20 determines if the user has said "VOICE CONTROL". In other words, the user's speech is picked up by microphone 70 of ECU 26 for conversion to an audio signal which is coupled through line 24 to VA 20 for recognition and processing. If the speech detected by the VA 20 is not "VOICE CONTROL" (or some other activation phrase), flow moves along the no branch of step 216 and system 10 returns to step 204. If, however, the user has said "VOICE CONTROL", then flow instead follows the yes branch of step 216 and the VA 20 issues an audible beep in step 218 through the speaker 28. Flow now continues to step 220, wherein a KEYTONES OFF command is issued from the VA 20 to the portable 12 signifying that the VA 20 desires to enter the ready mode. This is followed by step 222 in which it is determined if the host (portable 12) is ready. If the portable 12 is not ready (i.e., a VAD NOT READY command is sent from the portable 12 and received at the VA 20), then flow moves along the no branch of step 222 and system 10 moves back to step 204. Alternatively, if the host (portable 12) is ready (i.e., a VAD READY command is received at the VA 20), then flow proceeds along the yes branch of step 222 and system 10 goes through ready mode step 224 to ready mode 320 which is discussed in more detail below in relation to FIG. 11.

For the system 10 in idle mode 200 as introduced above, the user says "VOICE CONTROL" to go to the ready mode step 224 for voice activated dialing (VAD). Note that the VOICE CONTROL command is disabled by a VOICE ACTIVATION ENABLE=OFF command in the PERSONAL PREFERENCE option word. When the VOICE ACTIVATION ENABLE=OFF is set, the VOICE CONTROL command (keyword) will not be detected by the VA 20. However, as indicated in step 218, a single audible beep is issued over the speaker 28 after detection by the VA 20 of the complete voice activation phrase (VOICE CONTROL command). Note also that the user must pause approximately 0.5 to 2 seconds between the words "VOICE" and "CONTROL" in saying "VOICE CONTROL" aloud for proper detection by the VA 20. If this phrase is not completed after 2 seconds, the system 10 resets to step 204 along the no branch of step 216.

Figure 9:
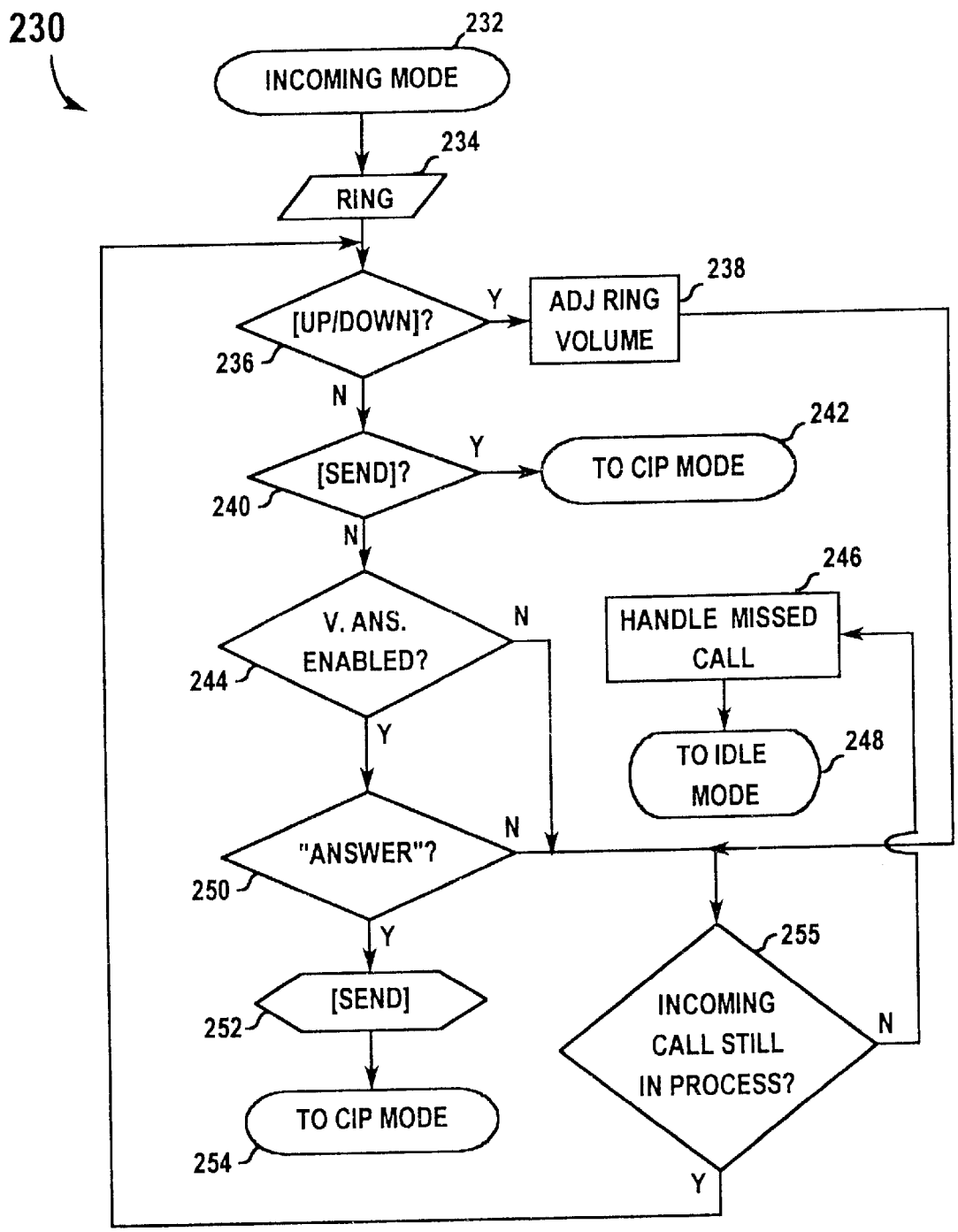
FIG. 9 is a flow chart representation of an incoming mode of operation thereof.

FIG. 9 is a flow chart representation of an incoming mode 230 of operation of the system 10. Proceeding through the steps of FIG. 9, a telephone ring is audibly output in step 234. The system 10 flow then proceeds to step 236, where it is determined if any of the up or down control keys 88 or 86, respectively, of the ECU 26, or the up or down keys 36 or 38, respectively, of the portable 12 have been pressed by the user. If any of the keys 36, 38, 86, or 88 have been pressed, then the yes branch of step 236 is followed to adjust ring volume in step 238 after which flow proceeds to step 255 (described below). If none of the keys 36, 38, 86, or 88 have been pressed, then flow proceeds along the no branch of step 236 to step 240, after which it is ascertained if the send key 46 on the portable 12 or the send key 72 on the ECU 26 have been pressed. In step 240, if either of send keys 46 or 72 have been pressed, the flow proceeds along the yes branch of step 240 to CIP (call in process) mode 1060, which is detailed below in relation to FIG. 29, through CIP mode step 242. If send keys 46 or 72 have not been pressed, however, flow follows the no branch of step 240 to step 244 where it is ascertained if voice answer is enabled (i.e., has the VOICE ANSWER ENABLE=ON command been received by the VA 20). If voice answer is not enabled, then flow follows the no branch of step 244 to step 255. If the incoming call is still in process, the yes branch of step 255 is taken back to step 236. On the other hand, if the call is no longer in process, the no branch of step 255 is taken to step 246. If, on the other hand, in step 244, voice answer is enabled, then the yes branch of step 244 is taken to step 250, in which the VA 20 determines if the user has said the word "ANSWER". If "ANSWER" has not been detected in step 250, flow proceeds along the no branch of step 250 to step 255 with subsequent flow from step 255 as above. Alternatively, if the keyword "ANSWER" has been detected in step 250, the yes branch of step 250 is taken to step 252, wherein a SEND command is sent to the portable 12 as if the send key 72 was pressed, and flow proceeds to CIP mode 1060 (FIG. 29) through step 254 now that the incoming call has been answered. Note that in incoming mode 230, if VOICE ANSWER ENABLE=OFF is set, the voice recognition algorithms of the VA 20 are not active at that point.

Figure 10:
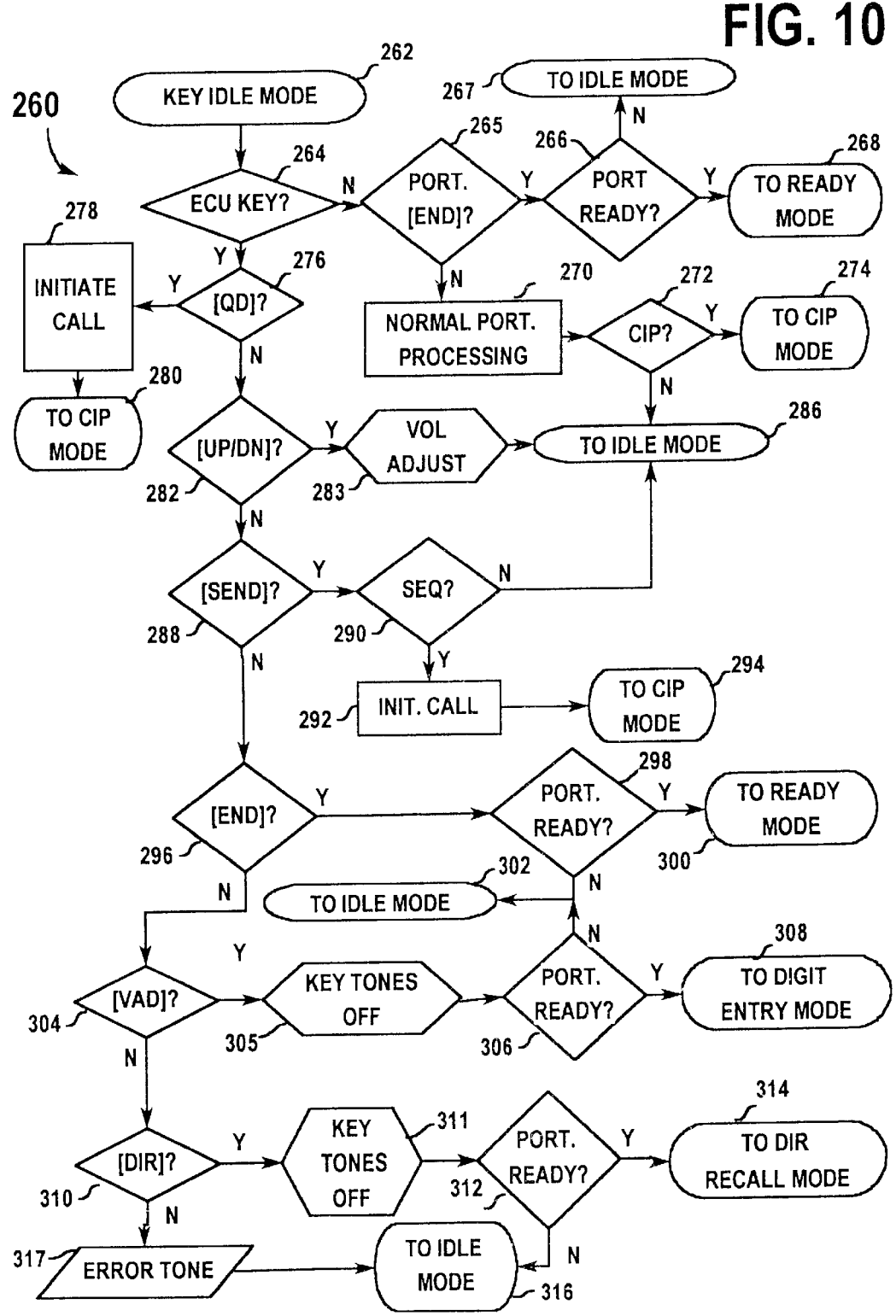
FIG. 10 is a flow chart representation of a key idle mode of operation thereof.

Reference is now made to FIG. 10 which is a flow chart representation of a key idle mode 260 of operation of system 10. As discussed above, if the flow of system 10 proceeds along the yes branch of step 210 in FIG. 8, then the flow moves to key idle mode 212, which is the same as moving to key idle mode 262 of FIG. 10 and the steps thereafter. In FIG. 10, in step 264, it is determined whether the key that was pressed to get to 212 in FIG. 8 is an ECU 26 key. If an ECU 26 key was not pressed, system 10 flow proceeds along the no branch of step 264 to step 265, where it is determined if the end key 50 of portable 12 is the key that was pressed. If the end key 50 was pressed, the flow moves along the yes branch of step 265 to step 266 to see if the host (portable 12) is ready (i.e., whether the VA 20 has received a VAD READY command from the portable 12). If the host is not ready, the flow follows the no branch of step 266 through idle mode step 267 back to the idle mode 200 of FIG. 8. However, if the host is ready, then flow proceeds along the yes branch of step 266 through ready mode step 268 to a ready mode 320 which is discussed in more detail below in relation to FIG. 11.

Going back to step 265, if, on the other hand, the end key 50 of the portable 12 was not pressed, then flow follows the no branch of step 265 to step 270 where normal portable 12 key processing will occur. This is followed by flow proceeding to step 272, where it is ascertained whether a call is ever in process. If there is a call in process, the flow moves along the yes branch of step 272 to CIP mode 1060, which is discussed in more detail below in relation to FIG. 29, through CIP mode step 274. If, instead, there is no call in process, then flow moves along the no branch of step 272 to idle mode 200 (FIG. 8) through idle mode step 286.

Note that back in step 264, if an ECU 26 key was pressed instead, then the flow of system 10 proceeds along the yes branch of step 264 to step 276 to ascertain whether the key that was pressed is one of the quick dial (QD) keys 76, 78, 80, 82, or 84 (FIG. 3). Note that each of the QD keys 76, 78, 80, 82, and 84 of the ECU 26 is capable, according to the user's preference and with a single touch of the user's finger, of causing the portable 12 to dial a particular stored telephone number. Accordingly, if one of the QD keys 76, 78, 80, 82, or 84 was pressed, then the flow moves along the yes branch of step 276 to step 278 where the portable 12 initiates the call, followed by flow to CIP mode in step 1060 (FIG. 29) through CIP mode step 280.

However, if one of the QD keys was not pressed, then flow continues along the no branch of step 276 to step 282 to see if one of the UP 88 or DOWN 86 keys of the ECU 26 was pressed instead. If one of the UP 88 or DOWN 86 keys was pressed, then flow goes along the yes branch of step 282 to step 283, wherein the portable 12 responds with a volume adjustment command to the VA 20, and the flow continues to idle mode 200 (FIG. 8) through idle mode step 286.

Considering again step 282, if one of the UP 88 or DOWN 86 keys of the ECU 26 was not pressed, then flow continues along the no branch of step 282 to step 288, wherein it is determined whether the send key 72 of the ECU 26 is the key that was pressed. If the SEND key 72 was pressed, then the flow of system 10 moves along the yes branch of step 288 to step 290 to determine if any digits occupy the current dialing sequence memory 122 of the portable 12. If there are no digits in the sequence, flow proceeds along the no branch of step 290 to idle mode 200 (FIG. 8) through idle mode step 286. If, however, the current dialing sequence is available in the current dialing sequence memory 122, then the flow continues along the yes branch of step 290 to step 292 to begin a call, and then to CIP mode 1060 (FIG. 29) through CIP mode step 294. If the SEND key 72 was not pressed, then the flow moves along the no branch of step 288 to step 296 to determine if the END key 74 of the ECU 26 is the key that was pressed. If the END key 74 was pressed, then flow moves along the yes branch of step 296 to step 298 to determine whether the portable 12 is ready (has a VAD READY command been received by the VA 20). If the portable 12 is ready in step 298, then flow goes along the yes branch of step 298 to ready mode 320 (FIG. 11) through ready mode step 300. On the other hand, if the portable is not ready in step 298, then flow follows the no branch of step 298 to idle mode 200 (FIG. 8) through idle mode step 302.

Considering again step 296, if the END key 74 was not pressed, then flow proceeds to step 304 to determine if the VAD key 96 is the key that was pressed on ECU 26. Note that the VAD 96 key functions to turn on voice activated dialing in the VA 20. If the VAD 96 key was pressed, then system 10 flow moves along the yes branch of step 304 to step 305, wherein a KEY TONES OFF command is sent from the VA 20 to the portable 12. The flow of system 10 then moves to step 306 in which it is determined whether the portable 12 is ready (whether a VAD READY command is received from the portable 12). If the portable 12 is not ready in step 306, then flow moves along the no branch of step 306 to idle mode 200 (FIG. 8) through idle mode step 302. If, however, the portable 12 is ready in step 306, then flow goes along the yes branch of step 306 to digit entry mode 400, which is described in more detail below with reference to FIG. 12, through digit entry mode step 308.

Considering step 304 again, if the VAD key 96 is not the key that was pressed on the ECU 26, then flow moves along the no branch of step 304 to step 310, wherein it is determined whether the DIR key 94 of the ECU 26 is the key that was pressed. If the DIR key 94 was pressed, then the flow continues along the yes branch of step 310 to step 311, wherein a KEY TONES OFF command is sent from the VA 20 to the portable 12. The system 10 flow then continues to step 312, wherein it is determined as to whether the portable 12 is ready. If the portable 12 is ready in step 312, then flow goes along the yes branch of step 312 to directory recall mode 480, which is discussed in more detail below in reference to FIG. 14, through directory recall mode step 314. In contrast, in step 312, if the portable 12 is not ready, then flow moves along the no branch of step 312 to idle mode 200 (FIG. 8) through idle mode step 316.

Considering step 310 again, if the DIR key 94 of the ECU 26 is not the key that was pressed, then the flow continues along the no branch of step 310 to step 317 where an error tone is played since the MUTE key 90 must have been the ECU key pressed, and such a function, while not in call-in-process (CIP) mode, is improper. After step 317, the system 10 proceeds to idle mode 200 (FIG. 8) through idle mode step 316.

Figure 11:
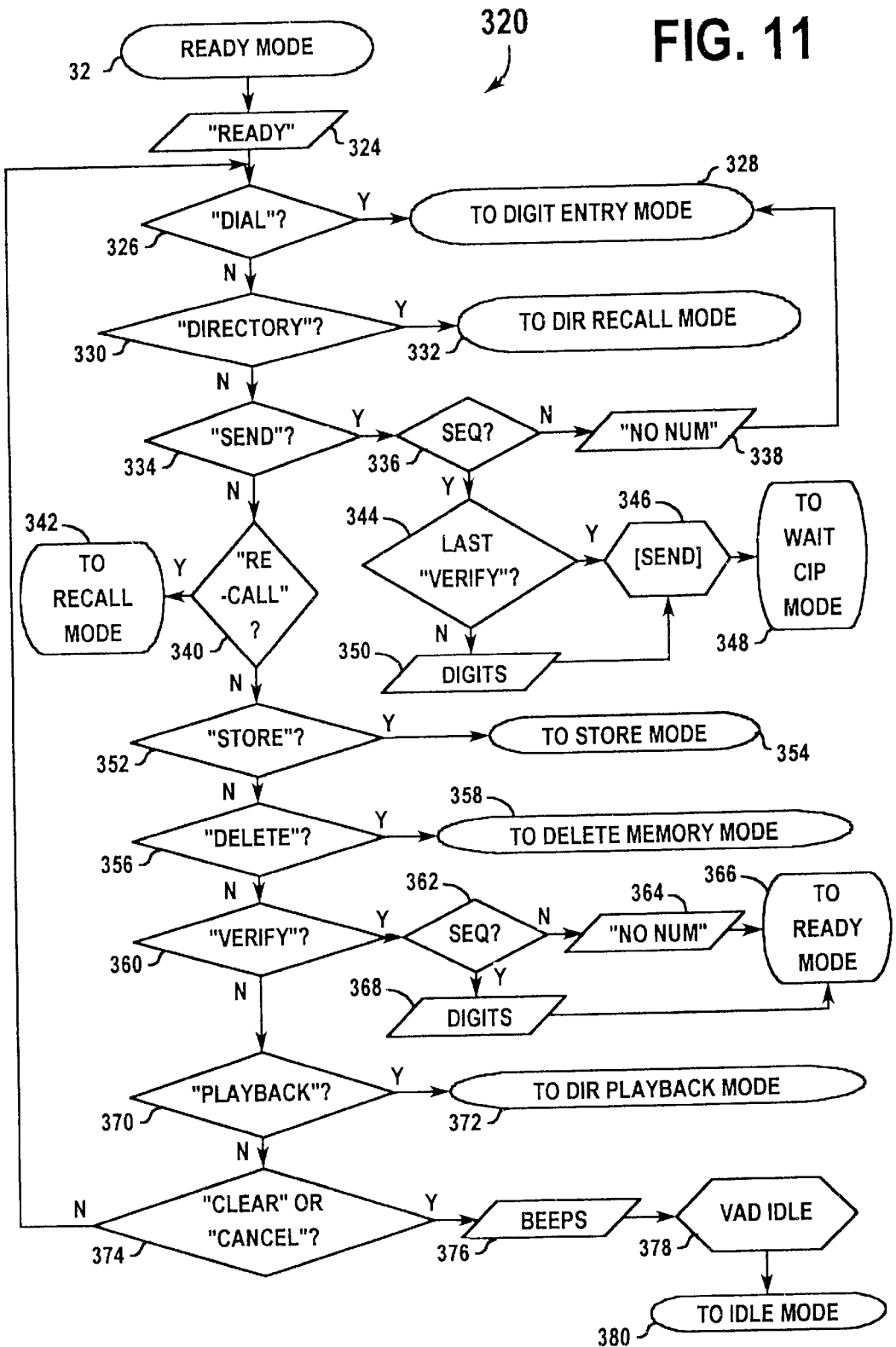
FIG. 11 is a flow chart representation of a ready mode of operation thereof.

Attention is now directed to FIG. 11 which is a flow chart representation of a ready mode 320 of operation of system 10. The flow of system 10 to ready mode through step 224 that was discussed above in reference to FIG. 8, and through steps 268 and 300 that were discussed above in reference to FIG. 10, proceeds to ready mode 322 and steps thereafter of FIG. 11. In step 324, the VA 20 voice synthesizes and prompts the user with the word "READY" over the speaker 28. Then, in step 326, it is determined whether the user has responded to the "READY" prompt by saying the word "DIAL" aloud for the VA 20 to recognize that the user wants to say a phone number to the portable 12 for dialing or storage. If the user responds by saying "DIAL", as detected in step 326, then the flow of system 10 follows along the yes branch of step 326 to digit entry mode 400, which is described in more detail below with reference to FIG. 12, through digit entry mode step 328. However, as would be detected in step 326, if the user has not said "DIAL", then the flow proceeds along the no branch of step 326 to step 330, where it is determined whether the user has said "DIRECTORY" to indicate to the VA 20 that the user wants to enter directory recall mode 480 (FIG. 14) through directory recall mode step 332. If the user says "DIRECTORY", as detected in step 330, then flow goes along the yes branch of step 330 to directory recall mode 480 through directory recall mode step 332. Thus, the user is able to access special memory locations in the assigned user storage 116 by user-programmed voice labels by saying the word "DIRECTORY".

Alternatively, as would be detected in step 330, if the user does not say "DIRECTORY", then flow goes along the no branch of step 330 to step 334, where it is determined if the user responds by saying the word "SEND" to indicate to the VA 20 that the user wants to initiate a call using the current dialing sequence stored in the current dialing sequence memory 122 of the portable 12. The user says "SEND", as detected in step 334, to dial the current dialing sequence that was previously input into the memory 122. If the user says "SEND" as detected in step 334, then flow continues along the yes branch of step 334 to step 336, wherein the VA 20 determines if the current dialing sequence number is available. The number availability is determined by the VA 20 by sending "RCL" "RCL" (i.e., two RECALL) command key strokes to the portable 12 and then evaluating the number of digits in the current dialing sequence memory 122 after such digits are sent from the portable 12 to the VA 20 in response. If the number of digits=0, as ascertained in step 336, the flow of the system 10 (the VA 20) moves along the no branch of step 336 and the system 10 (the VA 20) prompts the user with "NO NUMBER", followed by flow to digit entry mode 400 (FIG. 12) through digit entry mode step 328. However, in step 336, if the number is available, then flow moves along the yes branch of step 336 to step 344, wherein, if the last audible command from the user was not "VERIFY", then flow proceeds along the no branch of step 344 to step 350, in which the dialing number sequence from the current dialing sequence memory 122 is repeated. This is followed by flow to step 346, wherein a send command key stroke is transmitted to the portable 12 to initiate a call, and, in turn, flow moves to wait (waiting for) CIP mode 1030, which is described in more detail below in reference to FIG. 28, through wait CIP mode step 348 (i.e., wait CIP mode step 348 goes to wait CIP mode 1032 in FIG. 28). Considering step 344 again, if the last audible user command was "VERIFY", then the user has recently heard the dialing sequence and flow moves along the yes branch of step 344 to step 346, wherein a send command is sent from the VA 20 to the portable 12 to activate the call without repeating the dialing sequence. This is also followed by flow to wait CIP mode 1030 (FIG. 28) through wait CIP mode step 348.

Consideration is now given again to step 334, wherein, if the user has not said "SEND", flow instead continues along the no branch of step 334 to step 340. In step 340, it is determined if the user responded with an audible "RECALL". The user says "RECALL" to access numbers stored in the VA directory or portable memory. If the user responded with an audible "RECALL", then flow moves along the yes branch of step 340 to recall mode 460, which is described below in more detail in reference to FIG. 13 and the steps after recall mode 462, through recall mode step 342. However, if the user did not respond by saying "RECALL", as would be detected in step 340, then the system 10 (the VA 20) flow continues along the no branch of step 340 to step 352, in which it is ascertained if the user responded with an audible "STORE". The user says "STORE" to save the current dialing sequence. If the user did respond with "STORE", as detected in step 352, then the flow goes along the yes branch of step 352 to store mode 670, which is described in more detail below in reference to FIG. 18 and the steps after store mode 672, through store mode step 354.

Alternatively, as would be detected in step 352, if the user did not respond by saying "STORE", then flow proceeds along the no branch of step 352 to step 356, wherein it is determined if the user responded with an audible "DELETE". The user says "DELETE" to erase memory location contents either in the memory of the portable 12 or in the directory of the VA 20. If the user responded with an audible "DELETE", as detected in step 356, then the flow of system 10 goes along the yes branch of step 356 to delete memory mode 880, which is described in more detail below in FIG. 24 after delete memory mode 877, through delete memory mode step 358. In contrast, if the user did not say "DELETE", as would be detected in step 356, then flow continues along the no branch of step 356 to step 360, where a determination is made whether the user responded with an audible "VERIFY". The user says verify to hear the current dialing sequence. If the user did respond with "VERIFY", then the flow moves along the yes branch of step 360 to step 362 where the current dialing sequence is queried as above. If the current dialing sequence is not available (number of digits=0) in step 362 as similarly determined above, then flow moves along the no branch of step 362 to step 364, in which the system 10 (the VA 20) prompts the user with "NO NUMBER". For either of these last prompts, the flow of system 10 goes to ready mode 320 (FIG. 11) through ready mode step 366, i.e., to the audible "READY" prompt of step 324. Alternatively, back in step 362, if the current dialing sequence is available, then flow proceeds along the yes branch of step 362 to step 368 in which the current dialing sequence is played back to the user digit by digit and flow then also moves to ready mode 320 (FIG. 11), i.e., to the audible "READY" prompt of step 324, through ready mode step 366. However, if the first stored digit="N" or "n", then the system 10 (the VA 20) prompts the user with a "SECRET MEMORY" instead of announcing the digits.

Considering again step 360, if the user does not respond with "VERIFY", as would be detected in step 360, then flow continues along the no branch of step 360 to step 370, wherein it is ascertained if the user responded with an audible "PLAYBACK". The user says "PLAYBACK" to hear a list of directory names from assigned user storage 116. If the user did respond with "PLAYBACK", then the flow moves along the yes branch of step 370 to directory playback mode 870, which is described in more detail below in reference to FIG. 23 and steps after directory playback mode 871, through directory playback mode step 372. However, as would be in step 370, if the user did not respond with "PLAYBACK", then the system 10 flow goes along the no branch of step 370 to step 374, in which it is determined if the user responded with an audible "CLEAR" or "CANCEL". The user says "CLEAR" or "CANCEL" to exit ready mode 320 and return to idle mode 200. If the user says one of these words (i.e., "CLEAR" or "CANCEL"), the flow moves along the yes branch of step 374 to step 376, in which the VA 20 issues two beeps over the speaker 28 to notify the user and then sends a KEY TONES ON (VAD IDLE) command to the portable 12 in step 378 before returning to idle mode 200 through idle mode step 380. Alternatively, going back to step 374, if the user did not respond with a "CLEAR" or "CANCEL", as would be detected in step 374, then the flow of the system 10 (the VA 20) continues along the no branch of step 374 to right after step 324 (i.e., step 326). It should be understood that if the user does not respond with any of the audible responses detectable in the ready mode 320, the system 10 continues to stay in (loop within) the ready mode 320 as indicated by the no branch of step 374 until a time-out occurs.

Figure 12:
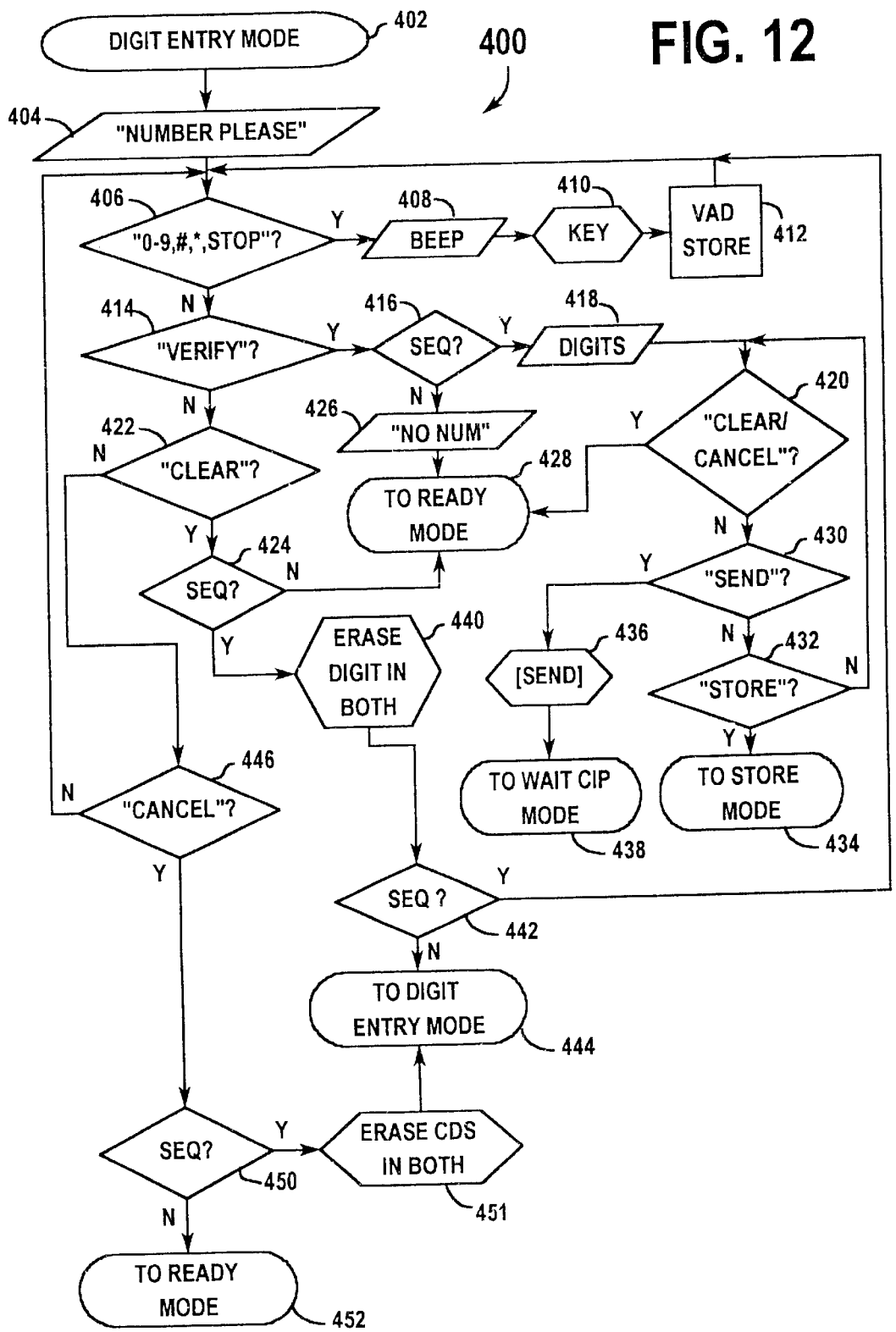
FIG. 12 is a flow chart representation of a digit entry mode of operation thereof.

Attention is now directed to FIG. 12 which is a flow chart representation of a digit entry mode 400 of the system 10 and referred to above. Digit entry mode 400 follows from step 328 in FIG. 11. Once in digit entry mode, after step 402, the system 10 prompts the user with "NUMBER PLEASE" in step 404. Note that the global keywords discussed above are not active in digit entry mode 400. In step 406, it is determined if the user responds by saying any of the digits "0–9" (including the letter "O", which is interpreted as if the user said "zero"), "POUND" (#),"STAR" (*), or "STOP". If the user does respond with any of these words, the flow of the system 10 proceeds along the yes branch of step 406 to step 408, wherein a single beep is issued from the system 10 over the speaker 28 for digit recognition confirmation. Then, instep 410, the digit key stroke commands corresponding to the response in step 406 are sent to the portable 12. Note that the word "STOP" is the voice command for a PAUSE command (function) in system 10. Note also that the PAUSE command (function) is implemented by an "END" key stroke from the VA 20 to the portable 12 as any character in a dialing sequence except the first character. After step 410, the VA 20 stores the digit key stroke commands of step 410 in RAM 167. Following step 412, the system 10 flow again proceeds back to step 406.

Considering step 406 again, if instead the user did not respond by saying "0–9", "POUND" (#),"STAR" (*), or "STOP", the system 10 flow continues along the no branch of step 406 to step 414, wherein it is determined if the user responded with a "VERIFY". The user says "VERIFY" to terminate the ability of the system 10 to detect spoken digits and to hear the current dialing sequence played by the system 10. If the user said "VERIFY", as detected in step 414, the flow of the system 10 (the VA 20) proceeds to step 416, wherein a "RCL" "RCL" key stroke command is sent to the portable 12 from the VA 20 to access all digits of the current dialing sequence. If the number of digits=0, then the system 10 prompts the user in step 426 with "NO NUMBER" and flow proceeds to ready mode 320 (FIG. 11) through ready mode step 428. However, if the current dialing sequence is available, as determined in step 416, then the flow of the system 10 goes to step 418 where the current dialing sequence is played back digit by digit to the user over the speaker 28. After step 418, the flow of the system 10 (the VA 20) goes to step 420, to determine if the user responds with a "CLEAR" or a "CANCEL" as determined in step 420. If the user responded with "CLEAR" or "CANCEL", as detected in step 420, then flow continues through the yes branch of step 420 to ready mode 320 (FIG. 11) through ready mode step 428.

If, on the other hand, the user does not say "CLEAR" or "CANCEL" as determined in step 420, then flow of the system 10 (the VA 20) proceeds along the no branch of step 420 to step 430, wherein it is determined whether the user said "SEND". The user says "SEND" to dial the current dialing sequence. If the user said "SEND", as detected in step 430, then flow moves along the yes branch of step 430 to step 436, in which the VA 20 transmits a "SEND" key stroke command to the portable 12, followed by flow to wait CIP mode 1030 (FIG. 28) through wait CIP mode step 438. However, back at step 430, if the user did not say "SEND", then flow goes along the no branch of step 430 to step 432, in which it is determined whether the user said "STORE". The user says "STORE" to save the current dialing sequence in the assigned user storage 116 of the portable 12 or in the directory memory of the VA 20. If the user said "STORE", as detected in step 432, then the flow of the system 10 (the VA 20) is along the yes branch of step 432 to store mode 670 (FIG. 18) through store mode step 434. However, if the user did not say "STORE", then the flow goes along the no branch of step 432 back to step 420.

Considering again step 414, if the user did not say "VERIFY", then the flow of the system 10 (the VA 20) continues along the no branch of step 414 to step 422, wherein it is determined whether the user said "CLEAR". If the user says "CLEAR", as detected in step 422, the last digit in the current dialing sequence is erased from the working memory of the VA 20 and the current dialing sequence memory of the portable 12. If the user said "CLEAR", then flow proceeds along the yes branch of step 422 to step 424, in which the existence of a current dialing sequence in the portable 12 is determined. If there is no current dialing sequence (an initial condition is digits=0), then flow proceeds along the no branch of step 424 to ready mode 320 (FIG. 11) through ready mode step 428. Alternatively, if there exists a current dialing sequence in step 424, then flow proceeds along the yes branch of step 424 to step 440 to erase the last digit in both memories in the portable 12 and in the VA 20. In step 442 it is determined if there still exists at least one digit left in the current dialing sequence after erasing the last digit. If the current dialing sequence still exists, the flow proceeds along the yes branch of step 442 back to step 406. However, if the final digit was cleared and there is no longer the current dialing sequence, then the flow goes along the no branch of step 442 back to the digit entry mode 400 starting with the "NUMBER PLEASE" prompt in step 404.

Now considering again step 422, if the user did not say "CLEAR", then flow goes along the no branch of step 422 to step 446, in which it is ascertained if the user said "CANCEL". The user says "CANCEL" to clear an entire current dialing sequence from the VA 20 memory and the portable 12. If the user did not say "CANCEL", as would be detected in step 446, then the flow follows along the no branch of step 446 back to step 406. However, if the user said "CANCEL", then the flow follows along the yes branch of step 446 to step 450, wherein the existence of the current dialing sequence is determined as above. If the current dialing sequence exists (i.e., if an initial condition is digits>0), then flow moves along the yes branch of step 450 to erase the current dialing sequence completely from memory 126 and RAM 167 in step 451, followed by flow back to digit entry mode 400 (FIG. 12) through digit entry mode step 444. To send a "CANCEL" command, a "CLEAR" command which includes a one (1) second hold before the associated NOOP (in the preferred embodiment) is sent from the VA 20 to the portable 12. In contrast, back at step 450, if there is no current dialing sequence (i.e., if an initial condition is digits=0), then the flow of the VA 20 proceeds along the no branch of step 450 to ready mode 320 (FIG. 11) through ready mode step 428.

Figure 13:
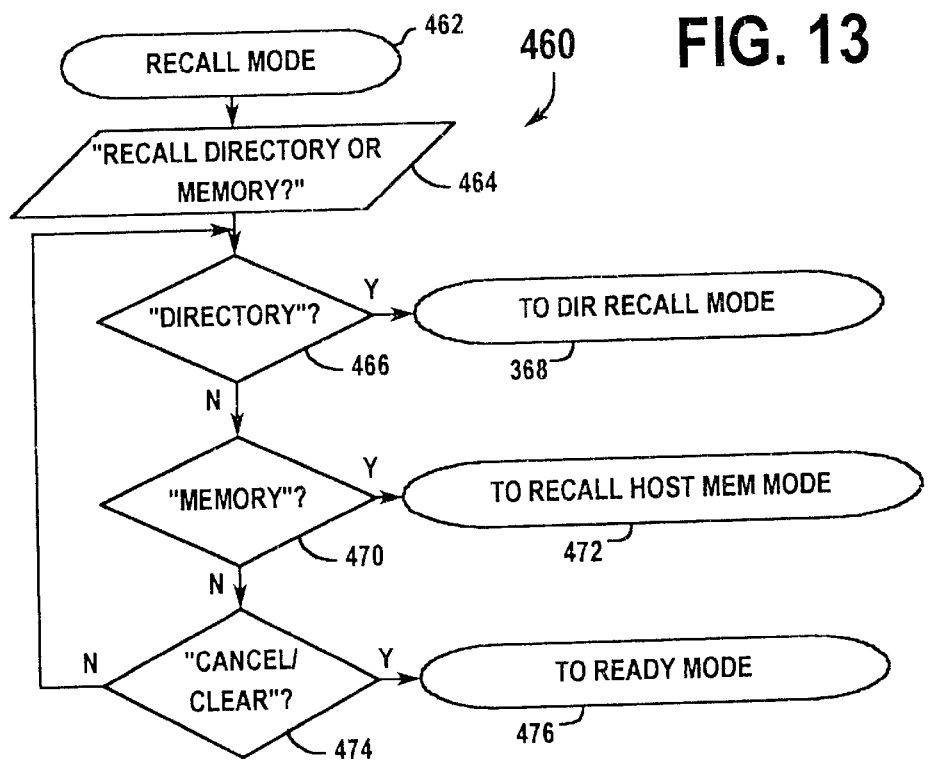
FIG. 13 is a flow chart representation of a recall mode of operation thereof.

Attention is now directed to FIG. 13 which is a flow chart representation of a recall mode 460 of the system 10. For the system 10, any discussions herein of "to recall mode", followed by a numerical reference, represent a flow to the recall mode 460 and steps below recall mode 462. Once the VA 20 has entered the recall mode 460, in step 464, the VA 20 voice synthesizes and audibly prompts the user with the words "RECALL DIRECTORY OR MEMORY?". The VA 20 then determines if the user responds by saying the words "DIRECTORY" (step 466), "MEMORY" (step 470), "CANCEL" or "CLEAR" (step 474). Note that when a "Y" or an "N" are observed in an output branch of any particular step of any of the figures, it is understood to mean flow of the VA 20 along the yes (or affirmative) branch and the no (or negative) branch in accordance with a response required (whether from the user or any subsystem of the system 10) in the particular step.

If the user responds with any of the words being expected in the steps 466, 470, or 474, then the system 10 flow proceeds to directory recall mode 480 (FIG. 14) through recall mode step 368, or to recall host memory mode 610, which is described in more detail below in reference to FIG. 17, through recall host memory mode step 472, or to ready mode 320 (FIG. 11) through ready mode step 476, respectively. If none of the responses expected in steps 466, 470, or 474 are detected from the user by the VA 20, then the system 10 flow continues to loop back from step 474 along the no branch thereof to step 466.

Figure 14:
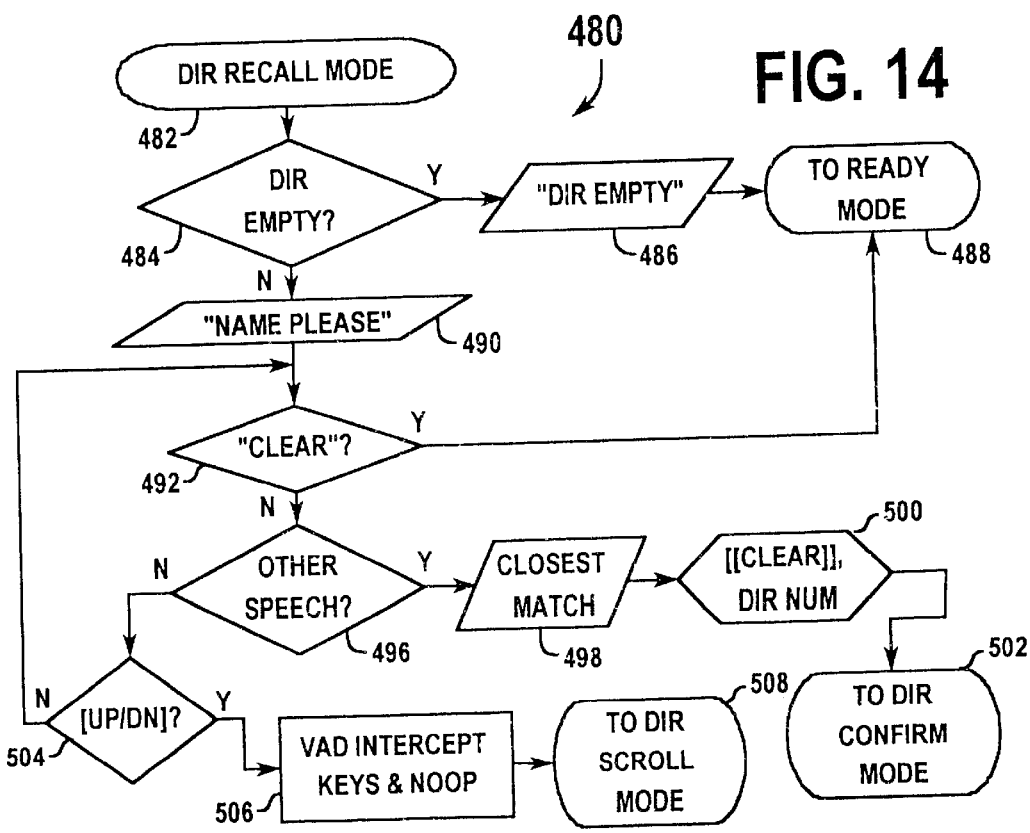
FIG. 14 is a flow chart representation of a directory recall mode of operation thereof.

Now attention is drawn to FIG. 14 which is a flow chart representation of a directory recall mode 480 of the operation of the system 10. For the system 10, any discussions herein of "to directory recall mode", followed by a numerical reference (e.g., to directory recall mode 368 of FIG. 13, etc.), represent a flow to the directory recall mode 480 and steps therein below directory recall mode 482. In step 484, it is determined whether the VA 20 directory is empty (i.e., if the number of directory entries=0). If the directory is empty, the VA 20 prompts (as above) with "DIRECTORY EMPTY" in step 486, followed by flow to ready mode 320 (FIG. 11) through ready mode step 488. Alternatively, if the directory is not empty as determined in step 484, then step 490 follows, wherein the system prompts (as above) with "NAME PLEASE". Note that the global keywords discussed above are not active. If the user responds with "CLEAR" as expected in step 492, the directory recall mode 480 is aborted and operation proceeds to the ready mode 320 (FIG. 11) through ready mode step 488.

However, if the user responds with some other speech, as determined in step 496, the VA 20 attempts to find the closest match to this other speech in step 498. For example, the user may say a name to access a user programmed directory memory in the VA 20. In this case, the VA 20 plays back a closest voice label match for confirmation by the user. After playing back the closest voice label, VA 20, according to step 500, sends and holds a CLEAR key stroke command for a period of time (e.g., for 1.5 seconds) followed by digit key strokes for the directory dialing sequence associated with the selected directory location to the portable 12. Flow then proceeds to a directory confirmation mode 550, which will be described below in more detail in reference to FIG. 16, through directory confirmation mode step 502. Note that, in the Figures, it is to be understood that a double bracket in a step is used to indicate that a command which is within the double brackets is being sent from the VA 20 to the portable 12, wherein the double bracketed command corresponds to holding down a key (e.g., the send key 46) for a period of time. Holding down a key delays the associated NOOP (key release) command.

Alternatively, back at step 496, if the user, instead, presses the UP 88 or DOWN 86 keys on the ECU 26, as determined in step 504, which are intercepted in step 506 along with associated NOOPs (note that NOOPs are key release associated signals) by the VA 20, then the key strokes are not forwarded to the portable 12. Flow then proceeds to a directory scroll mode 510, which is described in more detail below in reference to FIG. 15, through directory scroll mode step 508. Note that, back at step 504, if the user does not press the UP 88 or DOWN 86 keys on the ECU 26, then the flow of the VA 20 goes back to step 492.

Figure 15:
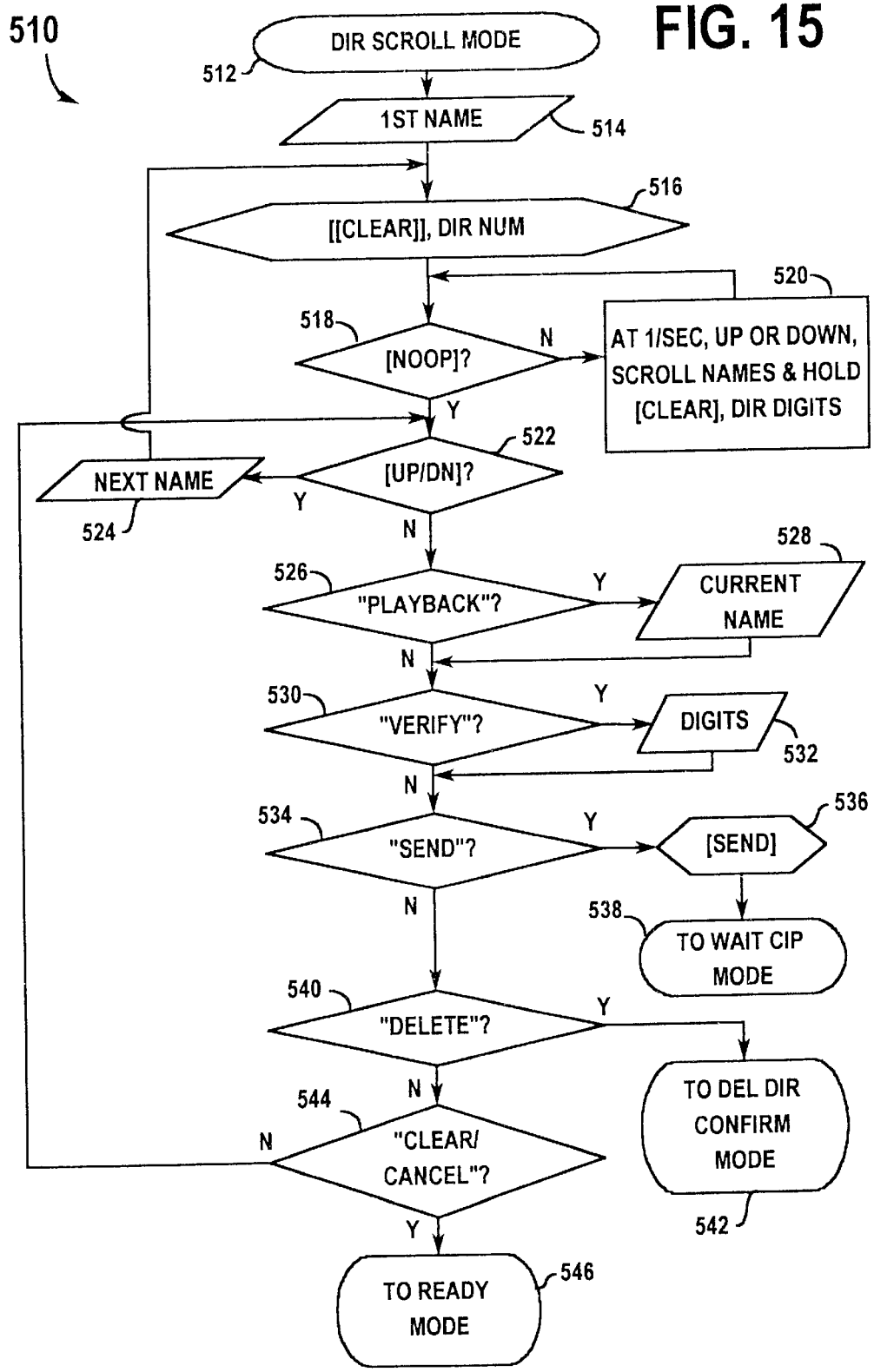
FIG. 15 is a flow chart representation of a directory scroll mode of operation thereof.

Consideration is now given to FIG. 15, which is a flow chart representation of the directory scroll mode 510 of operation of the VA 20. For the VA 20, any discussions herein of "to directory scroll mode", followed by a numerical reference, represent a flow to the directory scroll mode 510 and steps therein below directory scroll mode 512. In directory scroll mode 510, the pressing and releasing of t UP 88 or DOWN 86 keys is intercepted along with the associated NOOPs as above. In step 514 a first name stored in a directory or a next name in a scrolled direction stored in a directory if entering the directory scroll mode 510 from a directory confirmation mode 550 (described below in more detail in reference to FIG. 16), is played back. In step 516, a CLEAR key command (corresponding to a pressing of the CLEAR key 48 of the portable 12) is sent to the portable 12 and held for a period of time (e.g., for 1.5 seconds in the first preferred embodiment), as above, followed by digit keystrokes (the directory number) for a current dialing sequence corresponding to the selected directory name is sent to the portable 12. If the UP 88 or DOWN 86 keys remain depressed, (i.e., no NOOP key has been intercepted as determined in step 518), the directory entries (names) are correspondingly scrolled up or down, the CLEAR command is repeated to clear the portable 12 current dialing sequence memory, and the corresponding directory digits are sent to the portable 12 in step 520 after such time as the NOOP is received. Note that in the first preferred embodiment, whenever scrolling occurs, directory entries are scrolled at a rate (the scrolling rate) of one (1) entry per second as a circular queue. Also, note that the UP 88 key scrolls in ascending order, while the DOWN 86 key scrolls in descending order. After step 520, the system 10 flows back to step 518.

In contrast, in step 518, if there is a NOOP key that has been intercepted (including at the completion of scrolling), then the pressing of the UP 88 or DOWN 86 keys, as determined in step 522, whose corresponding commands are not sent to the portable 12, cause the next name to be played back in step 524 to the user over speaker 28. The next name is associated with a particular scrolling position, corresponding with the pressing of the UP 88 or DOWN 86 keys, in the directory to be played back in step 524. Then the flow of the VA 20 returns to step 516 above as indicated in FIG. 15.

Alternatively, in step 522, if the UP 88 or DOWN 86 keys are not pressed, then, in step 526, it is determined if the user wants to play back the current name. If the user says 'PLAYBACK' in step 526, then the current name is played back over the speaker 28 in step 528. Whether the user says "PLAYBACK" in step 526 or not, in step 530, it is determined if the user says "VERIFY". The user says "VERIFY" to hear a dialing sequence stored for the current directory entry. If the user says "VERIFY", then the current dialing sequence is played back to the user in step 532. Regardless of whether or not "VERIFY" is said by the user in step 530, it is determined in step 534 if the user wants to activate a call corresponding to the digits stored in the current dialing sequence in the portable 12. If the user says "SEND" as ascertained in step 534, the SEND key command is sent to the portable 20 from the VA 20 in step 536 and the VA 20 flow proceeds to wait CIP mode 1030 (FIG. 28) through wait CIP mode step 538.

If the user does not say "SEND" as determined in step 534, then it is determined in step 540 whether the user says "DELETE". The user says "DELETE" to delete the current entry from the directory. If the user says "DELETE", then the VA 20 flows to a delete directory confirmation mode 905, which will be described below in more detail in reference to FIG. 25, through delete directory confirmation mode step 542. However, if the user does not say "DELETE" in step 540 then it is ascertained whether the user says "CLEAR" or "CANCEL" in step 544. If the user says "CLEAR" or "CANCEL" as determined in step 544, then directory scroll mode 510 is aborted and the flow of the VA 20 returns to ready mode 320 (FIG. 11) through ready mode step 546. Alternatively, if the user does not say "CLEAR" or "CANCEL", then the flow of the VA 20 returns to step 522 as indicated in FIG. 15.

Figure 16:
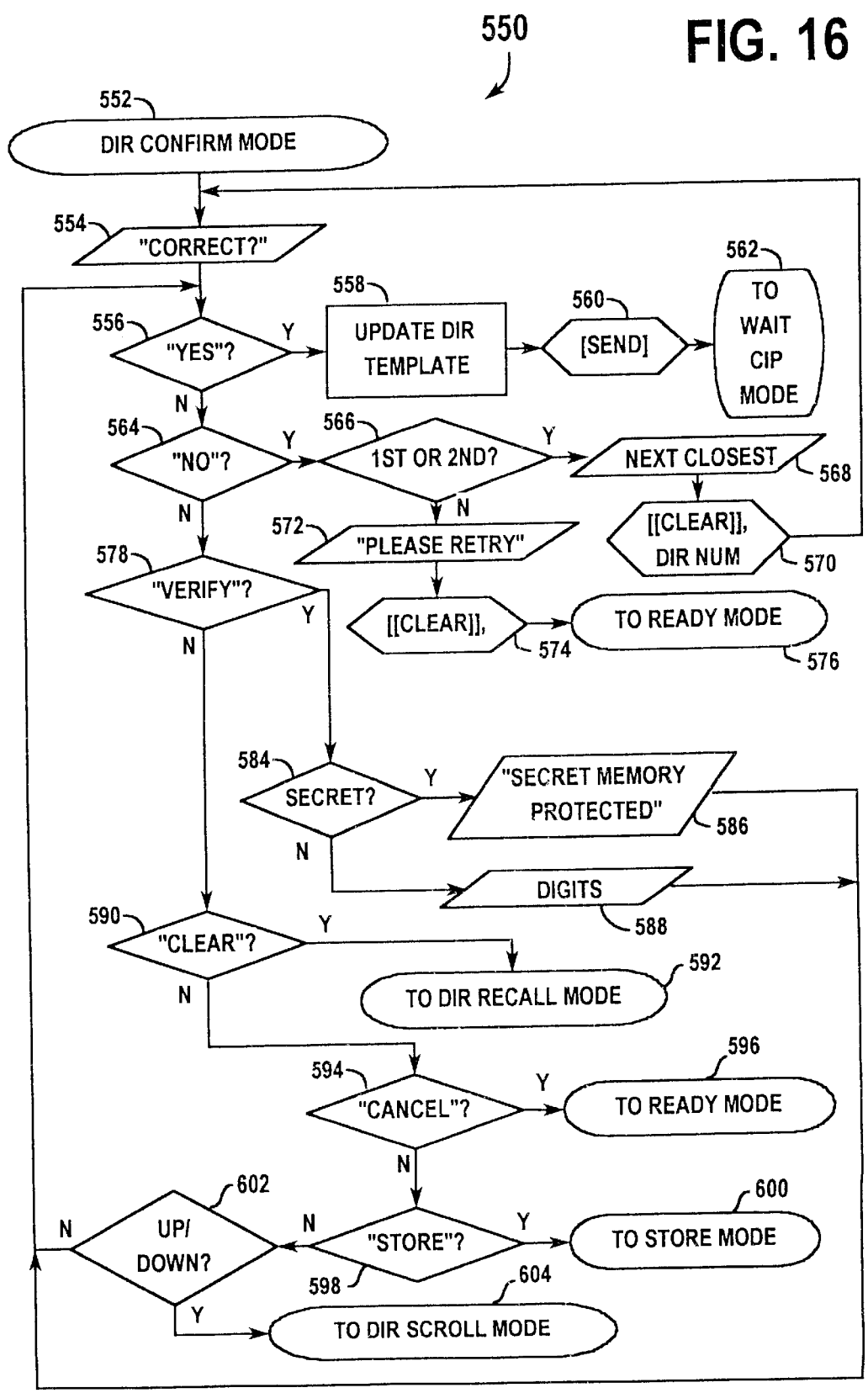
FIG. 16 is a flow chart representation of a directory confirm mode of operation thereof.

Consideration is next focused on FIG. 16 which is a flow chart representation of a directory confirmation mode 550 of operation of the VA 20. For the VA 20, any discussions herein of "to directory confirmation mode", followed by a numerical reference, represent a flow to the directory confirmation mode 550 and steps therein below directory confirmation mode 552. In step 554, the VA 20 prompts the user with the word "CORRECT". If the user says "YES", as determined in step 556, to confirm the name, then in step 558 a directory template is updated, followed by a SEND key stroke command being sent from the VA 20 to the portable 12 in step 560, and then the VA 20 flows to wait CIP mode 1030 (FIG. 28) through wait CIP mode step 562. However, if the user does not say "YES" as determined in step 556, but instead says "NO" as determined in step 564 (the user says "NO" to reject the current label or name), and if it is on the first or second try to match the name as ascertained in step 566, then, in step 568, a next closest match is selected by the VA 20, and the voice label associated with that match is played to the user. In step 570, the VA 20 transmits a CLEAR key stroke command for a period of time (e.g., delaying transmission of a NOOP command for 1.5 seconds in the first preferred embodiment) followed by digit keystrokes (the directory number) for a current dialing sequence corresponding to the next closest name. Subsequent to step 570, the flow of the VA 20 goes back to directory confirmation mode 550 (to step 554) as indicated in FIG. 16. Alternatively, in step 566, if it is on the third or more try to match the name, then the user is prompted with "PLEASE RETRY" in step 572 and the directory confirmation mode 550 is canceled by transmitting and holding down in step 574 (again, for 1.5 seconds in the preferred embodiment) a CLEAR key stroke command from the VA 20 to the portable 12, followed by flow to ready mode 320 (FIG. 11) through ready mode step 576.

Going back to step 564, if the used does not say "NO", then it is detected in step 578 if the user said "VERIFY" instead. The user says "VERIFY" to hear the current dialing sequence. If the user says "VERIFY" and if the current dialing sequence is secret (i.e., the number of digits="N" or "n" for the current dialing sequence), as determined in step 584, then the user is prompted in step 586 with "SECRET MEMORY PROTECTED", and the directory confirmation mode 550 is restarted back at step 556. However, if the current dialing sequence is not secret in step 584, then the current dialing sequence is played back digit by digit to the user over the speaker 28 in step 588 and the directory confirmation mode 550 is also restarted back at step 556.

Considering again step 578, if the user does not say "VERIFY", and if the user says "CLEAR" instead, as detected in step 590, then the attempt to recall by current name is aborted and the flow of the VA 20 goes to directory recall mode 480 through directory recall mode step 592. Alternatively, if the user does not say "CLEAR" for step 590, then it is determined in step 594 whether the user said "CANCEL". The user says "CANCEL" to abort the directory recall function and the VA 20 returns to ready mode 320 (FIG. 11) through ready mode step 596. Moreover, in step 594, if the user does not say "CANCEL", then it is ascertained in step 598 whether the user said "STORE". The user says "STORE" to save the recalled dialing sequence. If the user says "STORE", then the VA 20 goes to store mode 670 (FIG. 18) through store mode step 600. If "STORE" is not detected in step 598, flow is transferred to step 602 where it is determined if the UP 88 or DOWN 86 key was pressed. If either key was pressed, flow is transferred to the directory scroll mode 510 (FIG. 15) through directory scroll mode step 604, otherwise the directory confirmation mode 550 is restarted back at step 556, as indicated in FIG. 16.

Figure 17:
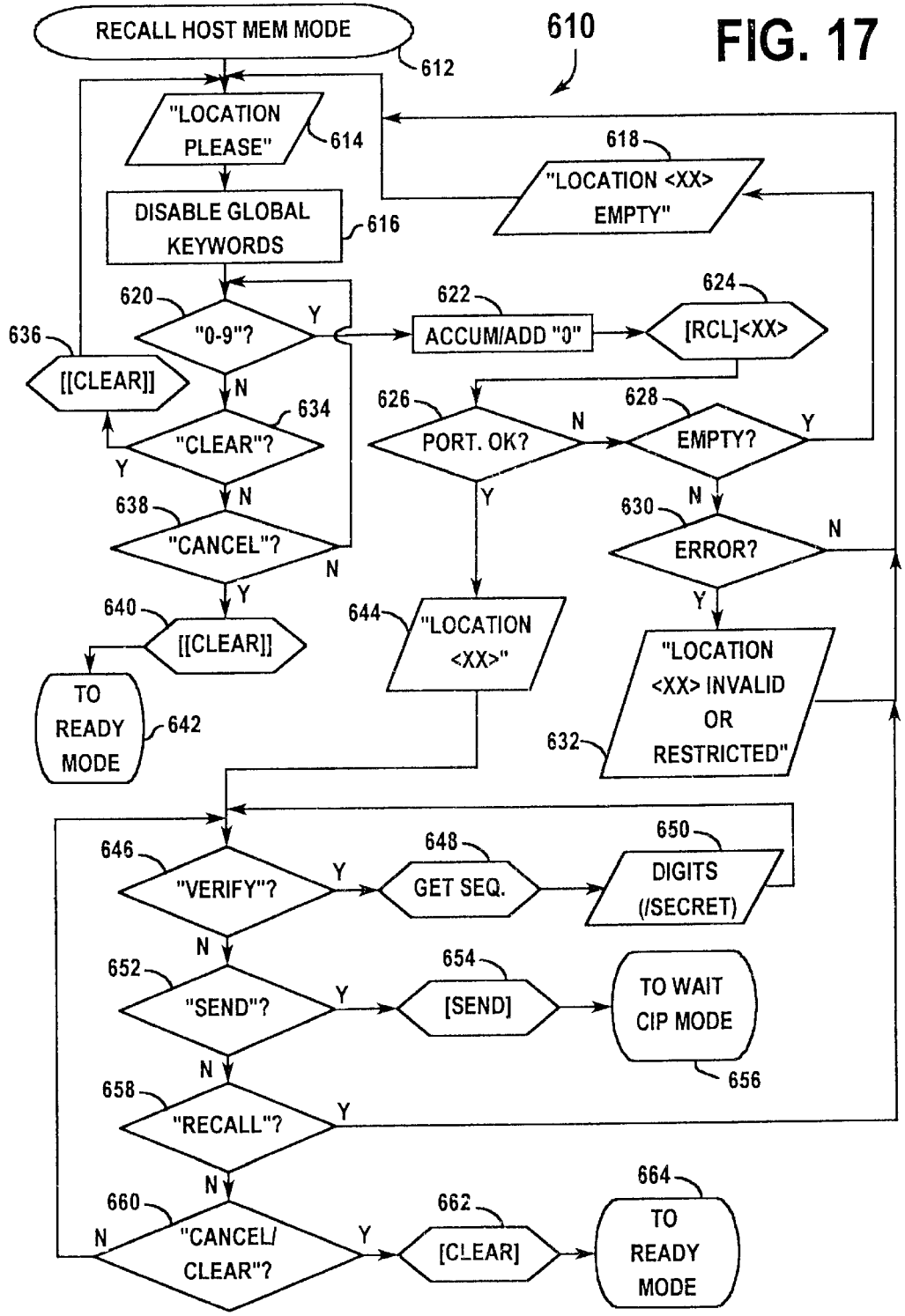
FIG. 17 is a flow chart representation of a recall host memory mode of operation thereof.

Attention is now centered on FIG. 17 which is a flow chart representation of a recall host memory mode 610 of operation of the VA 20. For the VA 20, any discussions herein of "to recall host memory mode", followed by a numerical reference, represent a flow to the recall host memory mode 610 and steps therein below recall host memory mode 612. In recall host memory mode 610, the VA 20 prompts the user with "LOCATION PLEASE" in step 614. Note that the global keywords are not active during digit recognition and are disabled in step 616. In step 620, it is determined whether the user indicates a memory location number in response to the "LOCATION PLEASE" prompt of step 614 by saying aloud digits (e.g., two digits in the first preferred embodiment), as indicated by "0–9" in step 620, in order to access the assigned user storage 116 of the portable 12. Note that in saying the digits, the user actually says aloud a particular combination from amongst any of the digits "zero", "one", "two", "three", etc. up to "nine", where saying the letter "O" is recognized by the VA 20 as if the user said "zero".

In step 622, if the user has verbally identified a memory location number, the VA 20 accumulates a 2-digit location number in <xx> format corresponding to the user's response or the VA 20 generates a 2-digit location number in "0<x>" format if the second digit is not spoken within three (3) seconds (in the first preferred embodiment) of the first digit (where x represents digits spoken by the user). Note that, although not specifically shown in FIG. 17, if the user says "CLEAR" in step 622, then the recall host memory mode function in process will be canceled and the VA 20 returns to step 614. After step 622, if the user has said digit(s) aloud, the VA 20 sends a "RCL" key stroke command plus an "<xx>" command (the 2-digit key strokes in step 622) to the portable 12 in step 624 (where xx now corresponds to the 2-digit number). The portable 12 is then checked to see if memory (the assigned user storage 116) of portable 12 is O.K. in step 626. If the memory (in the assigned user storage 116) of portable 12 is not O.K., and it is determined that the memory location (the assigned user storage 116) corresponding to the 2-digit number <xx> is empty in step 628, then the VA 20 prompts the user with "LOCATION <xx> EMPTY" in step 618, followed by restarting the recall host memory mode 610 in step 614. However, if the memory location is not empty in step 628, then it is determined in step 630 if there is a memory location number error, and if there is an error, the VA 20 prompts the user with "LOCATION <xx> INVALID OR RESTRICTED" in step 632, followed by restarting the recall host memory mode 610 in step 614. Alternatively, if there is no error in step 630, then the recall host memory mode 610 is restarted in step 614.

Going back to step 626, if the memory (the assigned user storage 116) of portable 12 is, instead, O.K. (i.e., available), then the VA 20 prompts the user with "LOCATION <xx>" in step 644. In step 646, if the user says "VERIFY" to hear a current dialing sequence, then a "RCL" "RCL" key stroke command is sent from the VA 20 to the portable 12 to access all digits of the current dialing sequence in step 648. The current dialing sequence is then played back over the speaker 28 digit by digit in step 650 unless a first digit="N" or "n" is obtained from the portable 12 by the VA 20, in which case the VA 20 prompts the user with "SECRET MEMORY PROTECTED". After step 650, the flow of the VA 20 continues back to step 646.

In considering step 646 again, if the user does not say "VERIFY", then it is ascertained in step 652 if the user responds instead with "SEND", in which case, the user wants to dial the current dialing sequence. If the user says "SEND", then a SEND key stroke command is transmitted to the portable 12 from the VA 20 in step 654 and flow proceeds to wait CIP mode 1030 through wait CIP mode step 656. Alternatively, if the user does not say "SEND", and instead responds with "RECALL" as detected in step 658, in which case the user wants to recall another portable 12 memory location. If the user says "RECALL", flow is transferred to step 614. If the keyword "RECALL" is not detected in step 658, and if, instead, it is determined that the user said "CANCEL" or "CLEAR", as detected in step 660, the VA 20 sends a CLEAR key stroke command to the portable 12 in step 662 and then flow returns to ready mode 320 (FIG. 11) through ready mode step 664. Note that, going back to step 620, if the user does not say any of the digits "0–9", then it is determined whether the user instead responds with either "CLEAR" (in step 634) or "CANCEL (in step 638). For either response, the current recall function is aborted and a CLEAR key stroke command is sent and held (again for 1.5 seconds in the first preferred embodiment) from the VA 20 to the portable 12 in steps 636 (for "CLEAR" in step 634) or 640 (for "CANCEL" in step 638). However, the VA 20 restarts the recall host memory mode 610 in step 614 from step 636, whereas the VA 20 goes to ready mode 320 (FIG. 11) through ready mode step 642 from step 640.

Figure 18:
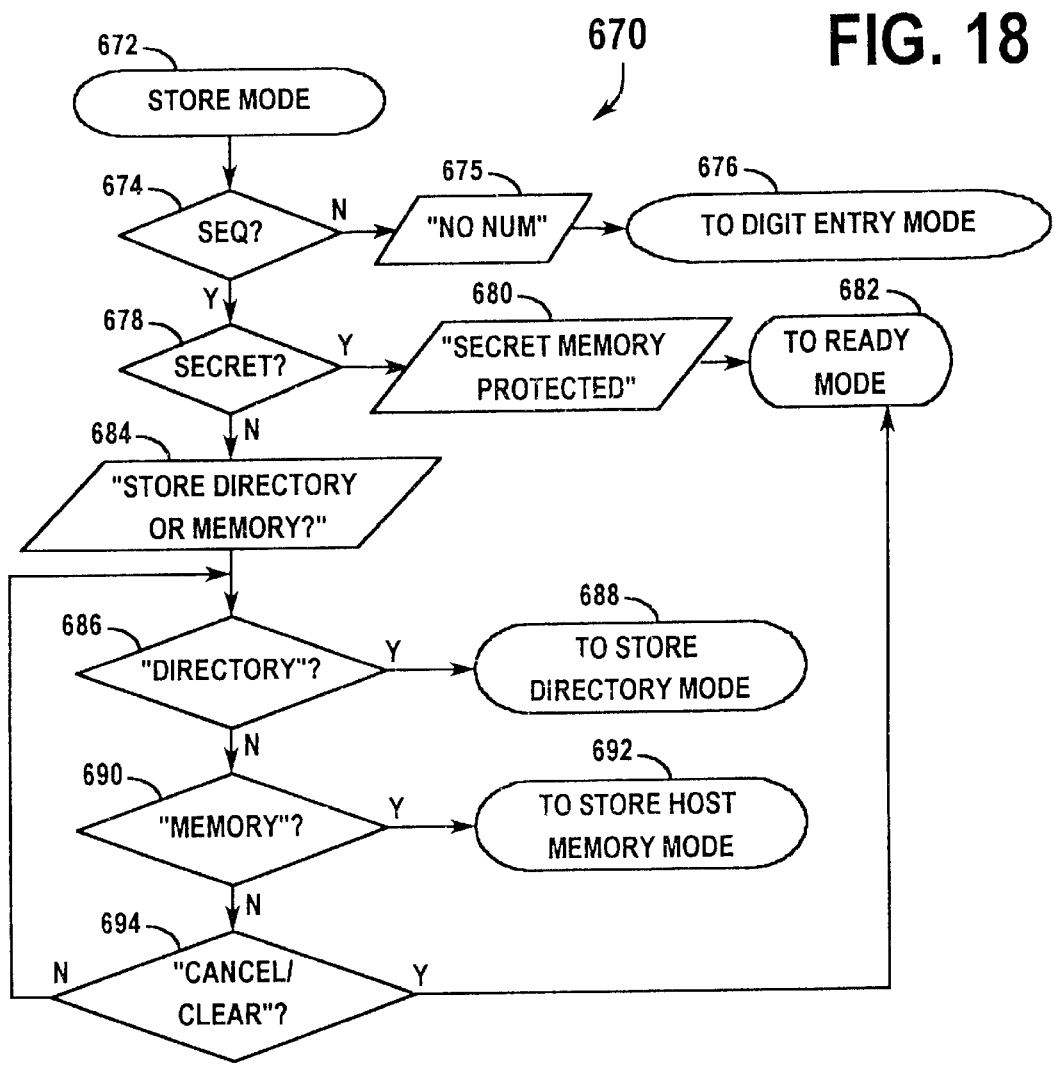
FIG. 18 is a flow chart representation of a store mode of operation thereof.

Consideration is now directed to FIG. 18 which is a flow chart representation of a store mode 670 of operation of the VA 20. For the VA 20, any discussions herein of "to store mode", followed by a numerical reference, represent a flow to the store mode 670 and steps therein below store mode 672. In step 674, a current dialing sequence is accessed as described above with the "RCL" "RCL" key stroke command being sent to the portable 12 from the VA 20. If the number of digits=0 (i.e., there is no current dialing sequence), then VA 20 prompts the user with "NO NUMBER" in step 675 and then goes to digit entry mode 400 (FIG. 12) through digit entry mode step 676. However, if there is a current dialing sequence and if digits="N" or "n" is returned to the VA 20, then it is determined in step 678 that the current dialing sequence is secret and the VA 20 prompts the user with "SECRET MEMORY PROTECTED" in step 680 and goes to ready mode 320 (FIG. 11) through ready mode step 682. However, if there is a current dialing sequence and it is not secret (step 678), then the VA 20 prompts the user with "STORE DIRECTORY OR MEMORY?" in step 684. If the user responds with "DIRECTORY" (detected in step 686), or with "MEMORY" (detected in step 690), or with "CANCEL" or "CLEAR" (detected in step 694), the VA 20 flows to store directory mode 700, which will be described in more detail below in reference to FIG. 19, through store directory mode step 688, or to store host memory mode 780, which will be described in more detail below in reference to FIG. 21, through store host memory mode step 692, or to ready mode 320 (FIG. 11) through ready mode step 682, respectively. If none of these responses are detected in steps 686, 690, or 694, then the VA 20 flows back to step 686.

Figure 19:
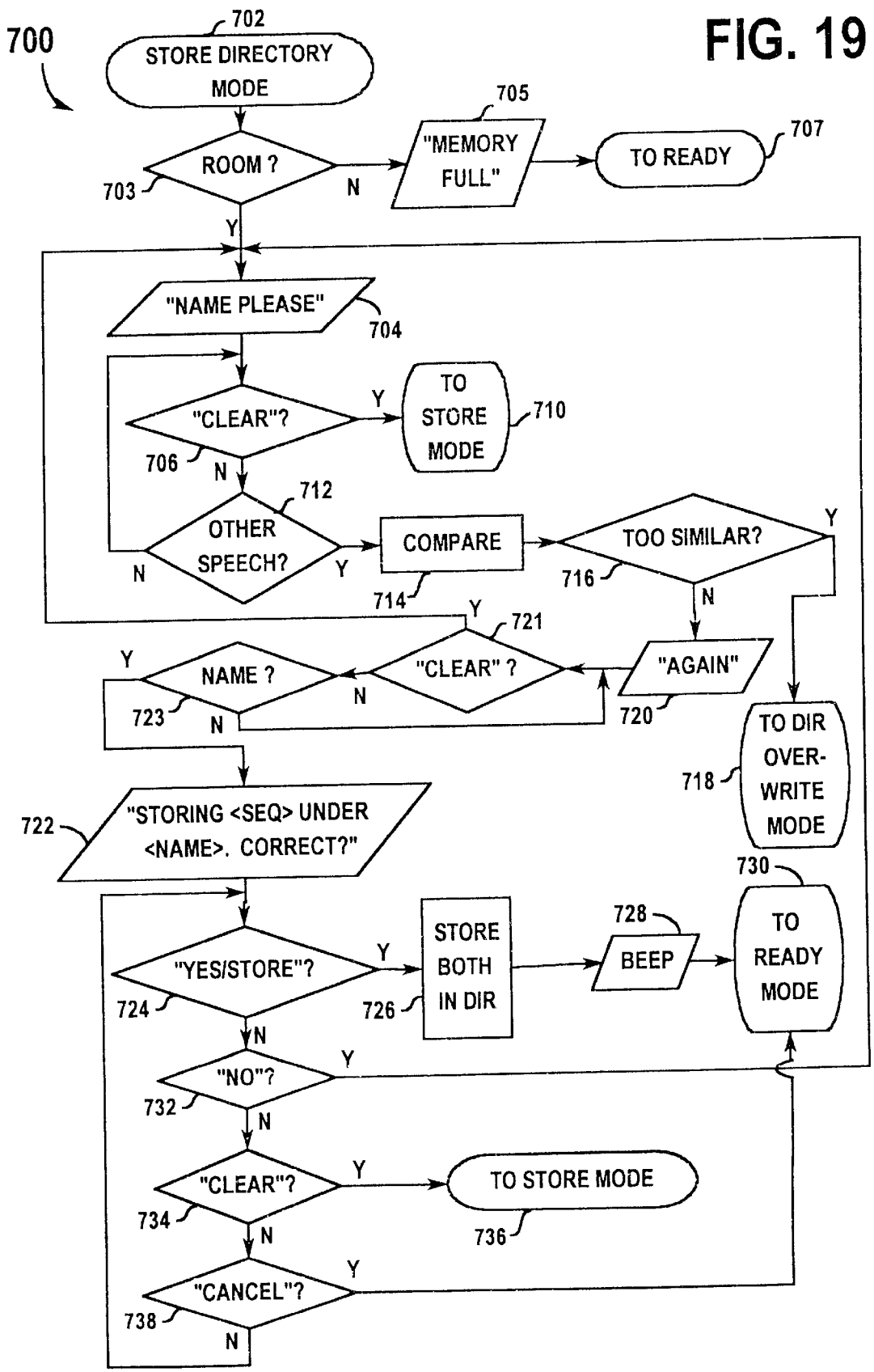
FIG. 19 is a flow chart representation of a store directory mode of operation thereof.

Consideration is now given to FIG. 19 which is a flow chart representation of a store directory mode 700 of operation of the VA 20. For the VA 20, any discussions herein of "to store directory mode", followed by a numerical reference, represent a flow to the store directory mode 700 and steps therein below store mode 702. In step 703, it is determined if there is enough room for storing information in the directory memory of the VA 20. If there is no room, then in step 705, the VA 20 prompts the user with "MEMORY FULL" and the VA 20 goes to ready mode 320 (FIG. 11) through ready mode step 707. However, if there is room in storage 116 as determined in step 703, then the VA 20 prompts the user with "NAME PLEASE" in step 704. Note that the global keywords are not active in the store directory mode 700. After step 704, it is determined in steps 706 and 712 whether the user responded to the prompt of step 704 with "CLEAR" or with some OTHER SPEECH), respectively. If the user responded with "CLEAR", as detected in step 706, then the store directory function of the store directory mode 700 is aborted and the VA 20 goes to store mode 670 (FIG. 18) through store mode step 710. However, if the user does not say "CLEAR" as would be detected in step 706, and if the user also does not respond with some OTHER SPEECH, as would be detected in step 712, then flow goes back (loops back) to step 706 as indicated in FIG. 19. But, if the user responded with OTHER SPEECH (i.e., the system 10 assumes that the user has said a NAME to use as the voice label for user programmed memory (RAM 167) in the VA 20), then the VA 20 evaluates the NAME for similarity with existing labels in step 714 (COMPARE). If the comparison is too similar in step 716, the VA 20 goes to directory overwrite mode 740, which will be described below in more detail in reference to FIG. 20, through directory overwrite mode step 718, otherwise the user is prompted with "AGAIN" in step 720 for training the VA 20 one (1) more time. Note that the training of the VA 20 one (1) more time after step 720 will not occur if the user says "CLEAR" as detected in step 721, in which case the VA 20 goes back to step 704 of the store directory mode 700. However, if the user does not say "CLEAR" as would be detected in step 721, and if the user does not repeat the NAME one (1) more time as detected in step 723, then the system keeps recycling back to step 721.

Alternatively, if the user says the NAME one (1) more time as detected and recorded in step 723, then the VA 20 prompts the user with "STORING <SEQ> UNDER <NAME>. CORRECT?" in step 722, where <SEQ> is a current dialing sequence and <NAME> is the user programmed voice label recorded in step 723. Steps 724, 732, 734, and 738 then detect whether the user responds to the prompt of step 722 with "YES/STORE", or "NO", or "CLEAR", or "CANCEL", respectively. If the user says "YES" or "STORE" as detected in step 724, then the VA 20 stores the current dialing sequence and the associated voice label in the user programmed directory memory (in RAM 167) of the VA 20 in step 726, which is followed by the issuance of a single beep over the speaker 28 from the VA 20 for user confirmation and then return to ready mode 320 (FIG. 11) through ready mode step 730. However, if the user does not say "YES" or "STORE" as detected in step 724, but instead, says "NO" as detected in step 732, then the VA 20 cancels the directory store in process and the store directory mode 700 is respecified by VA 20 going to step 704. Moreover, if the user does not say "NO" as detected in step 732, but, instead, says "CLEAR" as detected in step 734, then the VA 20 cancels the directory store in process and returns to store mode 670 (FIG. 18) through store mode step 736 to respecify the store mode operation of the store mode 670. Furthermore, if the user does not say "CLEAR" as detected in step 734, but instead says "CANCEL" as detected in step 738, then the directory store function of the directory store mode 700 is aborted and the VA 20 goes to ready mode 320 (FIG. 11) through ready mode step 730. Alternatively, if neither "YES/STORE", or "NO", or "CLEAR", or "CANCEL" is a response of the user, then the VA 20 goes back to step 724.

Figure 20:
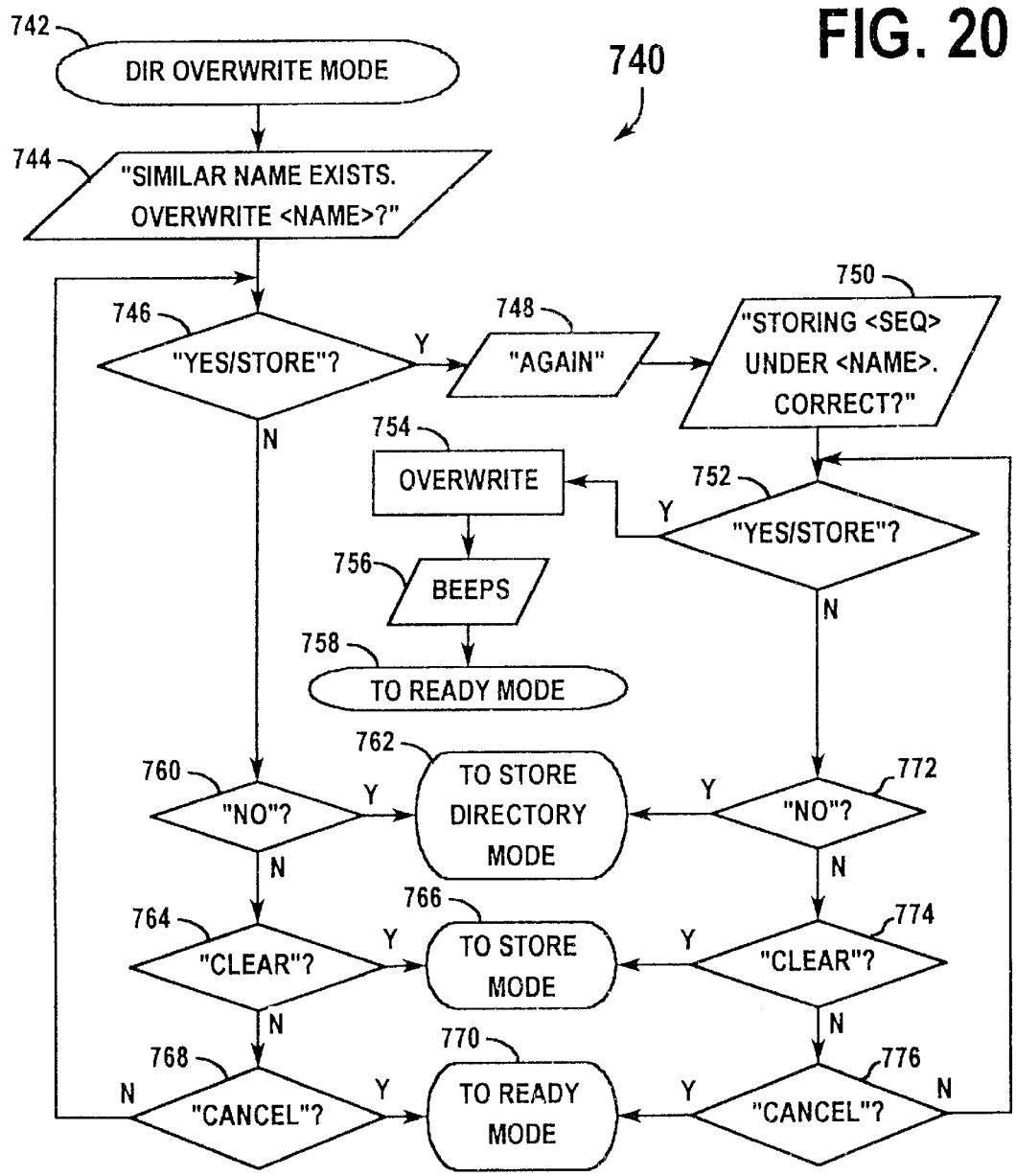
FIG. 20 is a flow chart representation of a directory overwrite mode of operation thereof.

Consideration is now given to FIG. 20 which is a flow chart representation of a directory overwrite mode 740 of operation of the VA 20. For the VA 20, any discussions herein of "to directory overwrite mode", followed by a numerical reference, represent a flow to the directory overwrite mode 740 and steps therein below directory overwrite mode 742. In step 744, the user is prompted with "SIMILAR NAME EXISTS. OVERWRITE <NAME>", where <NAME> is the user programmed voice label of an existing directory memory location. The user may respond to the prompt of step 744 with "YES/STORE", "NO", "CLEAR", or "CANCEL" as detected in steps 746, 760, 764, and 768, respectively. If the user says "YES" or "STORE" (detected in step 746), then the VA 20 prompts the user with "AGAIN" in step 748 for the user to speak the name one (1) more time to complete directory training and record the name, and then the user is prompted with "STORING <SEQ> UNDER <NAME>. CORRECT?" in step 750. If the user responds to the prompt in step 750 with a "YES" or "STORE" as detected in step 752, then the selected directory entry is overwritten in step 754, and the VA 20 issues two (2) beeps OVER THE SPEAKER 28 in step 756, and then returns to ready mode 320 (FIG. 11) through ready mode step 758.

On the other hand, the user may not respond to the prompt in step 750 with "YES" or "STORE", but may respond instead with "NO", "CLEAR", or "CANCEL" as detected in steps, 772, 774, and 776, respectively. For a response of "NO" to the prompt in step 750, the store directory function in process is canceled and the store directory function is restarted (respecified) by going to store directory mode 700 (FIG. 19) through store directory mode step 762. However, for a response of "CLEAR", instead, to the prompt in step 750, the store directory function in process is canceled and the store mode function is restarted by going to store mode 670 (FIG. 18) through store mode step 766. Moreover, for a response of "CANCEL", instead, to the prompt in step 750, the store function in process is canceled and the store function is aborted, followed by a return to ready mode 320 (FIG. 11) through ready mode step 770. Furthermore, if the user does not respond to the prompt in step 750 with either "YES/STORE", "NO", "CLEAR", or "CANCEL", then the flow of the VA 20 returns (loops back) to step 752 of directory overwrite mode 740.

Going back to step 746, if the user does not respond to the prompt in step 744 with "YES" or "STORE", then the user may instead respond with "NO", "CLEAR", or "CANCEL" as detected in steps 760, 764, and 768, respectively. If the user responds with either "NO", "CLEAR", or "CANCEL" to the prompt in step 744, then the flow of the VA 20 proceeds to step 762 from step 760 like from step 772, to step 766 from step 764 like from step 774, and to step 770 from step 768 like from step 776, respectively. However, if neither "NO", "CLEAR", or "CANCEL" are responded to the prompt in step 744, then the flow of the VA 20 returns (loops back) to step 746 of the directory overwrite mode 740.

Figure 21:
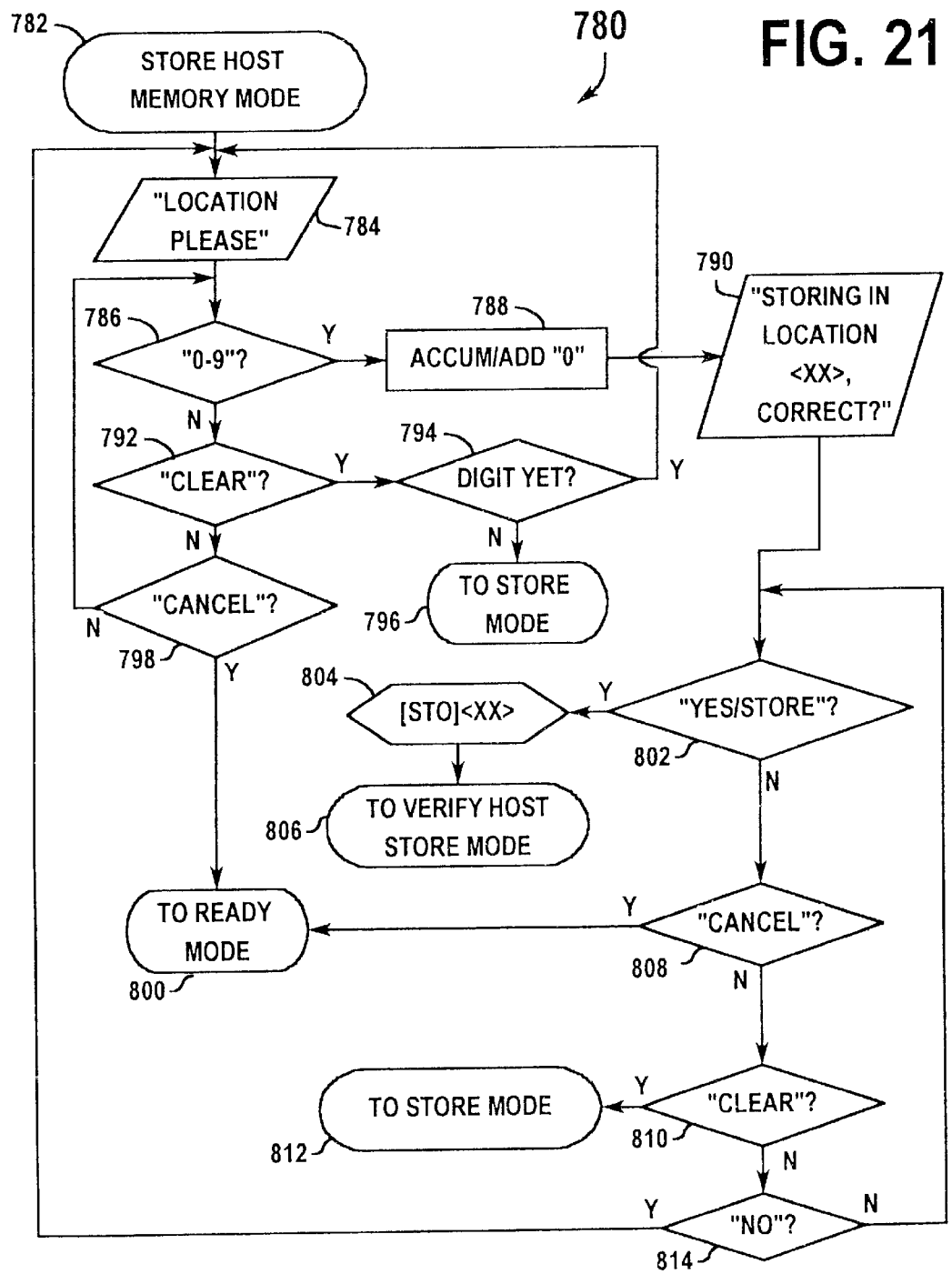
FIG. 21 is a flow chart representation of a store host memory mode of operation thereof.

Attention is next focused on FIG. 21 which is a flow chart representation of a store host memory mode 780 of operation of the VA 20. For the VA 20, any discussions herein of "to store host memory mode", followed by a numerical reference, represent a flow to the store host memory mode 780 and steps therein below store host memory mode 782. In step 784, the VA 20 prompts the user with "LOCATION PLEASE". The user may respond to the prompt in step 784 with a location number as indicated by "0–9" in step 784 in order to store in the assigned user storage 116 of the portable 12. Note that going from step 786 to step 788 in FIG. 21 is completely analogous to going from step 620 to step 622 in FIG. 17 and will not be repeated here. Also note that, although not specifically shown in FIG. 21, if the user says "CLEAR" in step 788, then the store host memory mode function in process will be canceled and the VA 20 returns to step 784. After step 788, the VA 20 prompts the user in step 790 with "STORING IN LOCATION <xx>, CORRECT?". As detected in steps 802, 808, 810, and 814, the user may respond to the prompt in step 790 with "YES" or "STORE", "CANCEL", "CLEAR", or "NO". If the user responds to the prompt in step 790 with "YES" or "STORE", then a current dialing sequence is stored in the assigned user storage 116 of the portable 12 by sending a "STO" (i.e., STORE) key stroke command plus an "<xx>" command (the xx key strokes) to the portable 12 in step 804 (where xx now corresponds to the 2-digit number of step 788 as above). After step 804, the flow of the VA 20 proceeds to verify host store mode 820, which is described in more detail below in reference to FIG. 22, through verify host store mode step 806.

However, if the user instead responds with "CANCEL" to the prompt of step 790, as detected in step 808, then the store host memory operation is canceled and the VA 20 goes to ready mode 320 (FIG. 11) through ready mode step 800. Moreover, if the user instead responds to the prompt of step 790 with "CLEAR", as detected in step 810, then the store host memory operation is canceled and the VA 20 goes to store mode 670 (FIG. 18) through store mode step 812. Furthermore, if the user instead responds to the prompt of step 790 with "NO", as detected in step 814, then the VA 20 goes back (loops back) to step 784 to restart the store host memory mode 780 and to respecify a memory (assigned user storage 116 of the portable 12) location number. Alternatively, if the user does not respond to the prompt of step 790, then the VA 20 goes back (loops back) to step 802.

Going back to step 786, in response to the prompt in step 784, if the user does not verbally specify location digits, the user may instead respond to this prompt with "CLEAR" or "CANCEL" as detected in steps 792 and 798, respectively. If the user responds with "CLEAR" as detected in step 792, and if the first digit of the location has already been detected by the VA 20 in step 794, the store host memory function in process is canceled and the VA 20 goes back to step 784 to restart the store host memory 780. However, if the first digit has not been detected in step 794, then the VA 20 goes to store mode 670 (FIG. 18) through store mode step 796. Alternatively, if the user instead responds to the prompt in step 784 with "CANCEL" as detected in step 798, then the store host memory function in process is canceled and the VA 20 returns to ready mode 320 (FIG. 11) through ready mode step 800. Note that if the user does not respond to the prompt in step 784, then the VA 20 goes back (loops back) to step 786.

Figure 22:
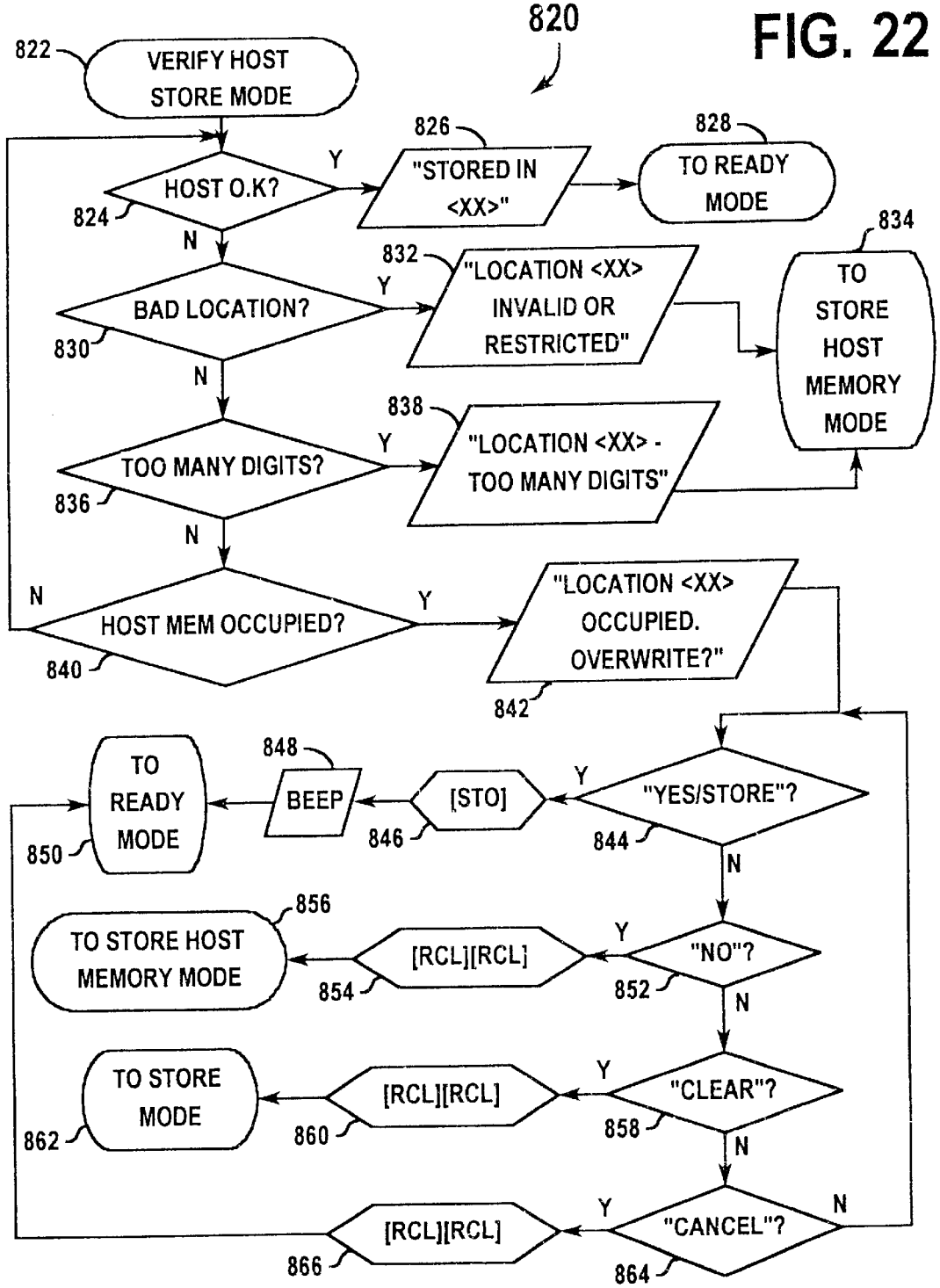
FIG. 22 is a flow chart representation of a verify host store mode of operation thereof.

Attention is now directed to FIG. 22 which is a flow chart representation of a verify host store mode 820 of operation of the VA 20. For the VA 20, any discussions herein of "to verify host store mode", followed by a numerical reference, represent a flow to the verify host store mode 820 and steps therein below verify host store mode 822. In step 824, it is determined whether memory store to the portable 12 was without error. If the memory store to the portable 12 was successful (i.e., HOST O.K.) in step 824, then the VA 20 prompts the user with "STORED IN <xx>" in step 826 and the VA 20 returns to ready mode 320 (FIG. 11) through ready mode step 828. However, if the memory was not successful, as determined in step 824, then there may be a memory location number error or a restricted memory error (BAD LOCATION) as determined in step 830, or there may be too many digits as determined in step 836, or the host (the portable 12) memory location may have been occupied as determined in step 840.

For a memory location error as determined in step 830, the VA 20 prompts the user with "LOCATION <xx> INVALID OR RESTRICTED" in step 832 and the VA 20 goes to store host memory mode 780 (FIG. 21) through store host memory mode step 834 to restart the store host memory mode 780. However, for too many digits as determined in step 836, the VA 20 prompts the user with "LOCATION <xx>-TOO MANY DIGITS" in step 838 and the VA 20 goes to store host memory mode 780 (FIG. 21) through store host memory mode step 834 to restart the store host memory mode 780. Moreover, for the host memory occupied as determined in step 840, the VA 20 prompts the user with "LOCATION <xx> OCCUPIED. OVERWRITE?" in step 842. Note that if none of the determinations expected in any of steps 824, 830, 836, or 840 occurs, then the flow of the VA 20 returns (loops back) to step 824 as indicated in FIG. 22 from step 840.

Returning to step 842, the user may respond to the prompt of step 842 with "YES/STORE", "NO", "CLEAR", or "CANCEL" as determined in steps 844, 852, 858, and 864, respectively. If the user responds to the prompt of step 842 with "YES" or "STORE", as detected in step 844, then a second "STO" (STORE) key stroke command is sent to the portable 12 in step 846 from the VA 20 to overwrite the selected memory location in the assigned user storage 116 of the portable 12. The VA 20 then issues a single beep in step 848 over the speaker 28 and returns to ready mode 320 (FIG. 11) through ready mode step 850. However, if the user instead responds with "NO", as detected in step 852, to the prompt of step 842, then the "RCL" "RCL" key stroke command is sent to the portable 12 from the VA 20 in step 854 to cancel the store operation currently in process, and the VA 20 goes to store host memory mode 780 (FIG. 21) through store host memory mode step 856 to restart the store host memory mode 780. Moreover, if the user instead responds with "CLEAR", as detected in step 858, to the prompt of step 842, then the "RCL" "RCL" key stroke command is also sent to the portable 12 from the VA 20 in step 860 to abort the memory store operation, and the VA 20 goes to store mode 670 (FIG. 18) through store mode step 862 to restart the store mode 670. Furthermore, if the user instead responds with "CANCEL", as detected in step 864, to the prompt of step 842, then the "RCL" "RCL" key stroke command is also sent to the portable 12 from the VA 20 in step 866 to abort the store operation, and the VA 20 goes to ready mode 320 (FIG. 11) through ready mode step 850 to restart the ready mode 320. Note that if none of the possible "YES/STORE", "NO", "CLEAR", or "CANCEL" responses is said by the user, then the VA 20 goes back (loops back) to step 844 from step 864.

Figure 23:
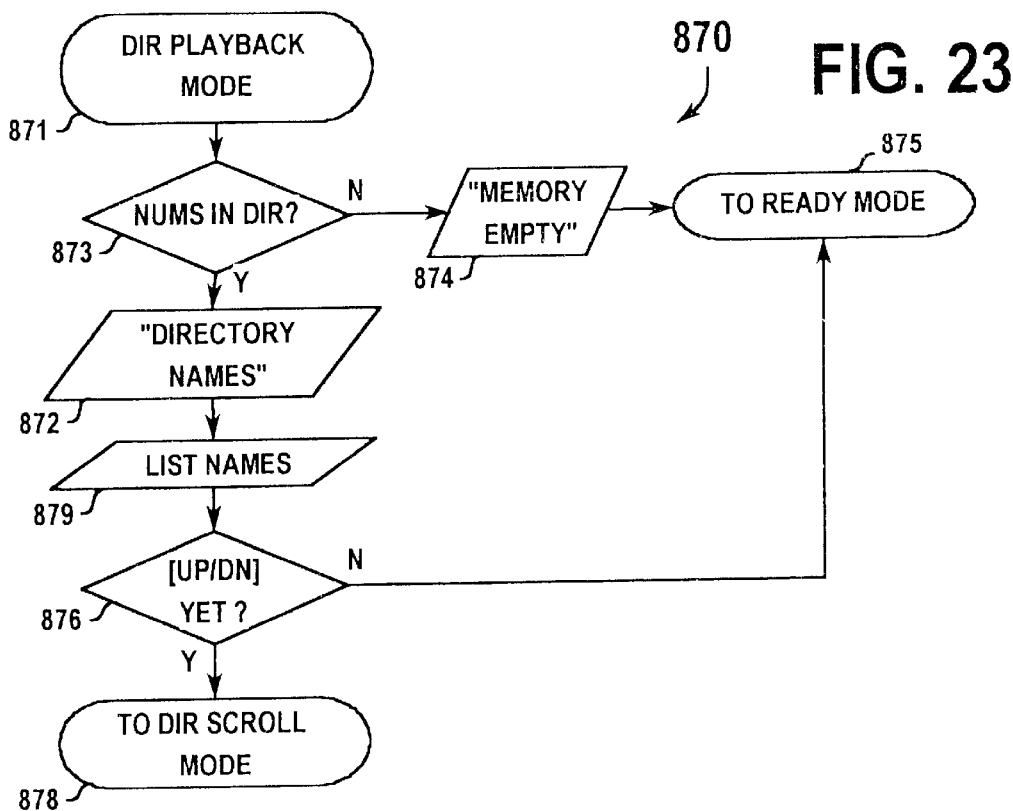
FIG. 23 is a flow chart representation of a directory playback mode of operation thereof.

Consideration now centers on FIG. 23 which is a flow chart representation of a directory playback mode 870 of operation of the VA 20. For the VA 20, any discussions herein of "to directory playback mode", followed by a numerical reference, represent a flow to the directory playback mode 870 and steps therein below directory playback mode 871. As detected in step 873, if no numbers are in a directory memory of the VA 20, the VA 20 prompts the user with "MEMORY EMPTY" in step 874, and then the flow of the VA 20 goes to ready mode 320 (FIG. 11) through ready mode step 875. However, in step 873, if numbers are instead detected in the directory memory, then the VA 20 prompts the user with "DIRECTORY NAMES" in step 872, and then plays back (voice synthesizes from the VA 20 and outputs over the speaker 28 a names list) all directory names in memory location order from the assigned user storage 116 of the portable 12 in rapid fire mode (i.e., with no pause between labels) in step 879. Note that the global keywords are not active in the directory playback mode 870. While step 879 is in process, the VA 20 will intercept any UP 88 or DOWN 86 key stroke commands and associated NOOPs from the user pressing these keys on the ECU 26 in step 876 during directory playback mode 870 and proceed to directory scroll mode 510 (FIG. 15) through directory scroll mode step 878. These UP 88 or DOWN 86 key stroke commands and associated NOOPs are not forwarded to the portable 12 (the microprocessor 108). Note that in step 876, if no UP 88 or DOWN 86 key stroke commands and associated NOOPs are detected by the VA 20, then the VA 20 goes to ready mode 320 (FIG. 11) through ready mode step 875.

Figure 24:
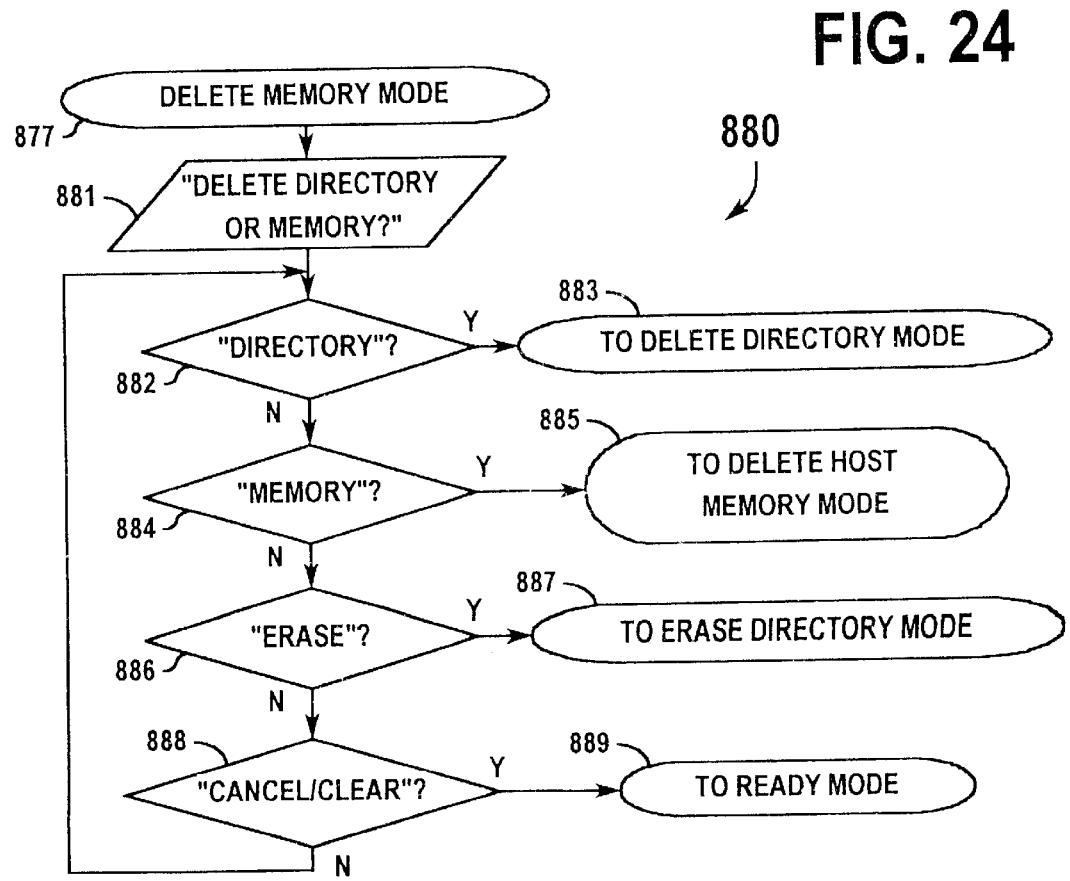
FIG. 24 is a flow chart representation of a delete memory mode of operation thereof.

Attention is next steered to FIG. 24 which is a flow chart representation of a delete memory mode 880 of operation of the VA 20. For the VA 20, any discussions herein of "to delete memory mode", followed by a numerical reference, represent a flow to the delete memory mode 880 and steps therein below delete memory mode 877. In step 881, the VA 20 prompts the user with "DELETE DIRECTORY OR MEMORY". The user may respond to the prompt in step 881 with "DIRECTORY", "MEMORY", "ERASE", or "CANCEL/CLEAR" as detected in steps 882, 884, 886, or 888. If the user responds with "DIRECTORY" as detected in step 882, then the VA 20 goes to delete directory mode 890 to delete a directory entry in the directory memory (RAM 167) of the VA 20 as will be described below in more detail in reference to FIG. 25, through delete directory mode step 883. However, if the user responds instead with "MEMORY" as detected in step 884, then the VA 20 goes to delete host memory mode 980 to delete a memory in the assigned user storage 116 of the portable 12 as will be described below in more detail in reference to FIG. 27, through delete host memory mode step 885. Moreover, if the user responds instead with "ERASE" as detected in step 886, then the VA 20 goes to erase directory mode 940 to delete all directory entries in the directory memory (RAM 167) of the VA 20 as will be described below in more detail in reference to FIG. 26, through erase directory mode step 887. Furthermore, if the user responds instead with "CANCEL" or "CLEAR" as detected in step 888, then the VA 20 goes to ready mode 320 (FIG. 11) through ready mode step 889 to return to ready mode 320. Note that if the user does not respond to the prompt of step 881 with the expected "DIRECTORY", "MEMORY", "ERASE", or "CANCEL/CLEAR", then from step 888, the VA 20 goes back (loops back) to step 882.

Figure 25:
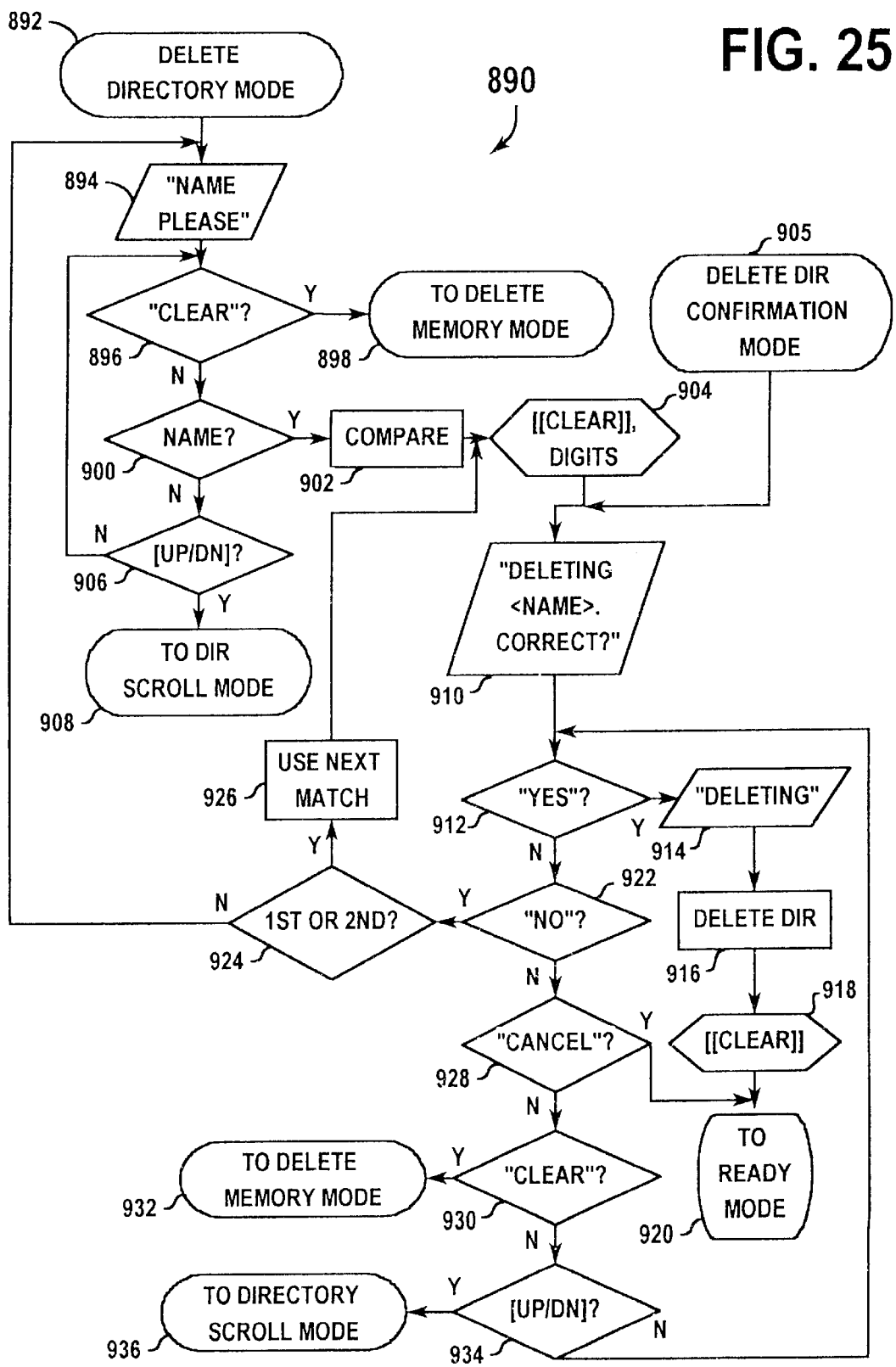
FIG. 25 is a flow chart representation of a delete directory mode of operation thereof.

Consideration is now given to FIG. 25 which is a flow chart representation of a delete directory mode 890 of operation of the VA 20. For the VA 20, any discussions herein of "to delete directory mode", followed by a numerical reference, represent a flow to the delete directory mode 890 and steps therein below delete directory mode 892. In step 894, the VA 20 prompts the user with "NAME PLEASE". Note that in the delete directory mode 890, the global keywords are not active. The user may respond to the prompt of step 894 with "CLEAR", a NAME, or UP 88 or DOWN 86 key presses as detected in steps 896, 900, and 906, respectively. If the user responds with "CLEAR" as detected in step 896, then the delete directory function in process of the delete directory mode 890 is aborted and the VA 20 returns to delete memory mode 880 (FIG. 24) through delete memory mode step 898. However, skipping step 900 for the moment, if the user responds instead by pressing the UP 88 or DOWN 86 keys (during the directory recall function for the directory scroll mode 510), as detected in step 906, then these key press commands and their associated NOOPs are intercepted by the VA 20. These intercepted key press commands and their associated NOOPs are not forwarded to the portable 12 (the microprocessor 108), and the VA 20 goes to directory scroll mode 510 (FIG. 15) through directory scroll mode 908. Otherwise, if these UP 88 or DOWN 86 keys are not pressed as would be detected in step 906, and if the expected responses are not detected in steps 896 and 900, then the VA 20 goes back (loops back) to step 896 from step 906.

Now considering step 900, if the user instead says aloud the name of a user programmed VA 20 memory (in the RAM 167) in response to the prompt in step 894, as detected in step 900, then, in step 902, the VA 20 selects a closest label match (COMPARE) for confirmation by the user (see step 910 below), but the closest label match is not output to the user over the speaker 28. The VA 20 then sends, in step 904, a CLEAR key stroke command held for a period of time as above (held for 1.5 seconds in the first preferred embodiment), followed by dialing sequence digit key strokes (corresponding to the closest label match) terminated with the "RCL" "RCL" key stroke command to the portable 12 to display digits. The VA 20 then prompts the user with "DELETING <NAME>. CORRECT?" in step 910 for confirmation. Note that the delete directory confirmation mode 905 of the system 10, which was discussed above in regard to delete directory confirmation mode step 542 of directory scroll mode 510 (FIG. 15), flows into step 910 as indicated in FIG. 16.

In response to the prompt of step 910, the user may say "YES", "NO", "CANCEL", "CLEAR", or the user may press the UP 88 or DOWN 86 keys, as detected in steps 912 922, 928, 930, and 934. If the user responds to the prompt in step 910 with "YES", as detected in step 912, then the VA 20 prompts the user with "DELETING" in step 914. The directory entry is then deleted in step 916, followed by a CLEAR key stroke command held down for a period of time as above (held for 1.5 seconds in the first preferred embodiment) in step 918, and then the VA 20 goes to ready mode 320 (FIG. 11) through ready mode step 920. However, if the user instead responds to the prompt of step 910 with "NO" as detected in step 922, and if on the first or second try to match the NAME as determined in step 924, then a next closest directory NAME match is used in step 926 to restart step 904 (confirmation with the next closest directory NAME is restarted) using a voice label of this next closest directory match. But, on a third try as detected in step 924, the VA 20 goes (confirmation is canceled and the user is prompted with "PLEASE RETRY", which is not shown in FIG. 25) to step 894 to restart the delete directory mode 890.

Going back to step 922, if the user does not respond to the prompt in step 910 with "NO", and if the user instead responds with "CANCEL", as detected in step 928, then the delete directory function in process of the delete directory mode 890 is canceled and the VA 20 goes to ready mode 320 (FIG. 11) through ready mode step 920. Moreover, if the user, instead, responds to the prompt in step 910 with "CLEAR", as detected in step 930, then the delete directory function in process of the delete directory mode 890 is also canceled and the VA 20 goes to the delete memory mode 880 (FIG. 24) through delete memory mode step 932. Furthermore, if the user instead responds to the prompt in step 910 by pressing the UP 88 or DOWN 86 keys, then the key stroke commands associated with the pressing of these keys, along with the associated NOOPs, as detected in step 934, are intercepted by the VA 20 and are not forwarded to the portable 12 by the VA 20 as above, and the VA 20 goes to directory scroll mode 510 (FIG. 15) through directory scroll mode step 936.

Figure 26:
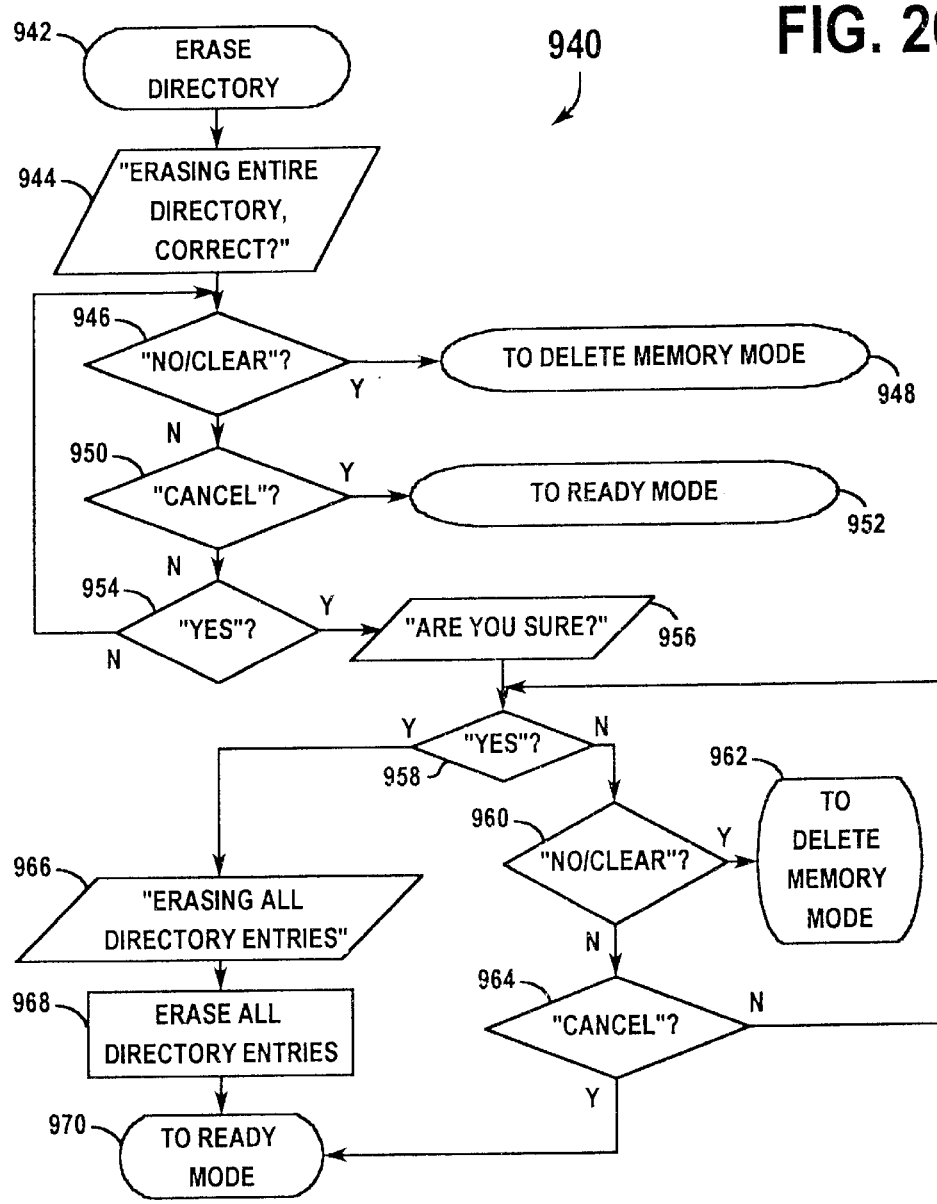
FIG. 26 is a flow chart representation of an erase directory mode of operation thereof.

Attention is now drawn to FIG. 26 which is a flow chart representation of an erase directory mode 940 of operation of the VA 20. For the VA 20, any discussions herein of "to erase directory mode", followed by a numerical reference, represent a flow to the erase directory mode 940 and steps therein below erase directory mode 942. In step 944, the VA 20 prompts the user with "ERASING ENTIRE DIRECTORY. CORRECT?". The user may respond to the prompt of step 944 with "NO/CLEAR", "CANCEL", or "YES", as detected in steps 946, 950, and 954. If the user responds to the prompt in step 944 with "NO" or "CLEAR", as detected in step 946, then the VA 20 goes to the delete memory mode 880 (FIG. 24) through delete memory mode step 948 to respecify the delete function thereof. However, if the user instead responds to the prompt of step 944 with "CANCEL", as detected in step 950, then the erase function of the erase directory mode 940 is aborted and the VA 20 returns to ready mode 320 (FIG. 11) through ready mode step 952. Moreover, if the user instead responds to the prompt in step 944 with "YES", as detected in step 954, then the VA 20 prompts with "ARE YOU SURE?" in step 956. The user may now respond to the prompt in step 956 with "YES", "NO/CLEAR", or "CANCEL", as detected in steps 958, 960, and 964, respectively. Note that if none of the above expected responses occurs as detected in steps 946, 950, and 954, then the VA 20 goes back (loops back) to step 946 from step 954.

For a "YES" response to the prompt of step 956, as detected in step 958, the VA 20 prompts the user with "ERASING ALL DIRECTORY ENTRIES" in step 966. Then, in step 968, all the directory entries are erased, followed by return to ready mode 320 (FIG. 11) through ready mode step 970. Alternatively, for a "NO/CLEAR" response to the prompt of step 956, as detected in step 960, the VA 20 returns to the delete memory mode 880 (FIG. 24) through delete memory mode step 962 to respecify the delete function of the delete memory mode 880. In contrast, for a "CANCEL" response to the prompt in step 956, as detected in step 964, the VA 20 returns to ready mode 320 (FIG. 11) through ready mode step 970. Note that if none of the expected responses are detected in steps 958, 960, or 964, then the VA 20 goes back (loops back) to step 958 from step 964.

Figure 27:
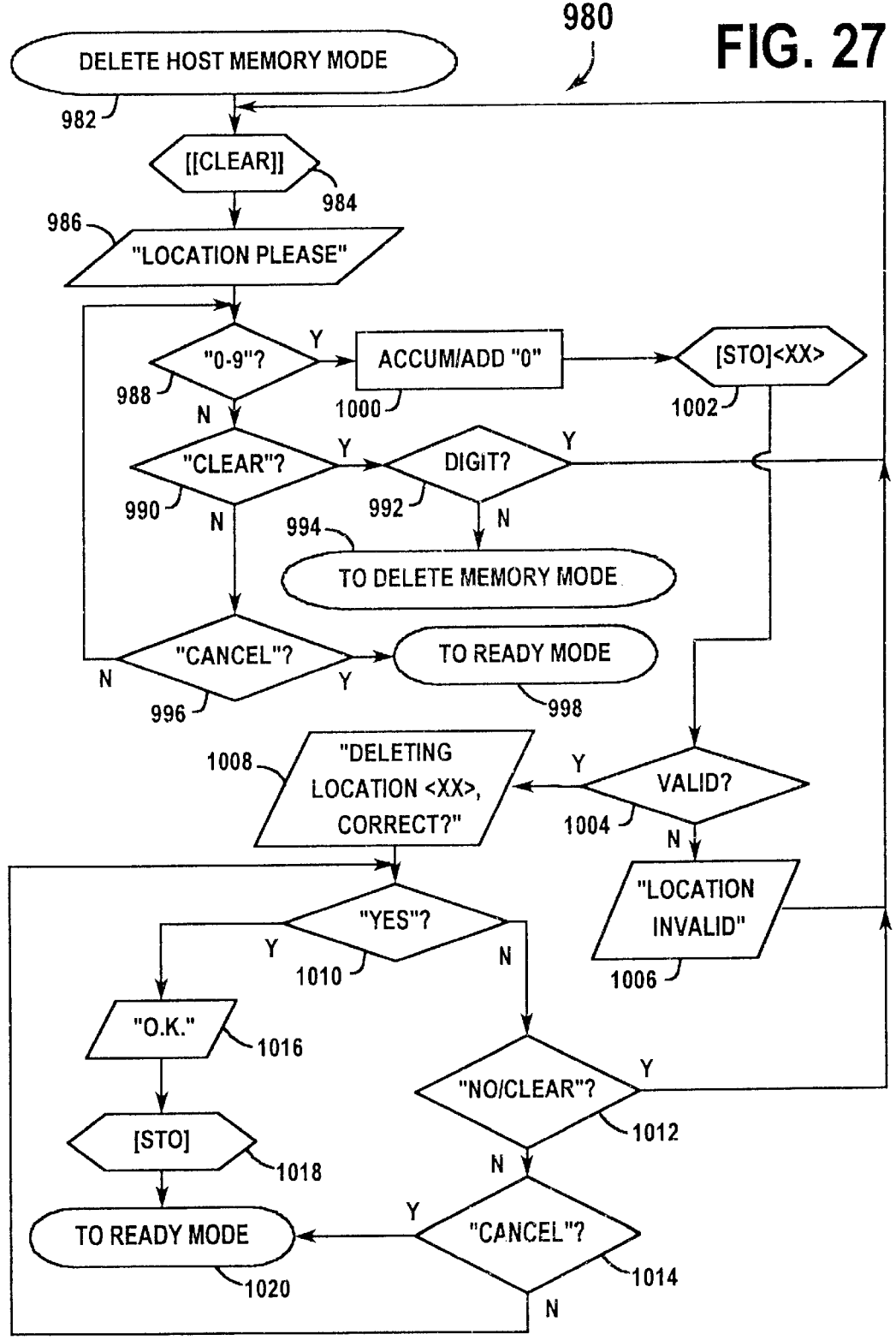
FIG. 27 is a flow chart representation of a delete host memory mode of operation thereof.

Reference is now made to FIG. 27 which is a flow chart representation of a delete host memory mode 980 of operation of the VA 20. For the VA 20, any discussions herein of "to delete host memory mode", followed by a numerical reference, represent a flow to the delete host memory mode 980 and steps therein below delete host memory mode 982. In step 984, the CLEAR key stroke command is sent and held for a period of time (e.g., for 1.5 seconds in the first preferred embodiment), and then the VA 20 prompts the user with "LOCATION PLEASE" in step 986. The user may respond to the prompt in step 986, as detected in step 988, by saying a memory location number aloud, such as a combination of digits chosen from the digits 0–9 as indicated in step 988 by "0–9", and which is analogous to step 786 of FIG. 21. As before, if the user says the letter "O", the VA 20 interprets this as "zero". The user may also respond to the prompt of step 986 by saying either "CLEAR" or "CANCEL", as detected in steps 990 and 996, respectively.

For a digit response to the prompt of step 986, as detected in step 988, a 2-digit location number (meant to correspond to a memory location in the assigned user storage 116 of the portable 12) is accumulated in step 1000, as above. After this accumulation, a "STO" key stroke command plus an <xx> key stroke, where xx is representative of the 2-digit location number as before, is sent to the portable 12 from the VA 20 in step 1002. The command sent in step 1002 is used to check for a memory location number error, and if there is an error as detected in step 1004 (VALID?), the VA 20 prompts the user with "LOCATION INVALID" in step 1006, and the VA 20 then goes back to step 984 to restart the delete host memory mode 980. However, if there is no location error as would be detected in step 1004, then the VA 20 prompts the user with "DELETING LOCATION <xx>. CORRECT?" in step 1008. The user may respond to the prompt in step 1008 with "YES", "NO/CLEAR", or "CANCEL", as detected in steps 1010, 1012, and 1014, respectively.

If the user responds with "YES" to the prompt in step 1008 in order to delete location xx, as detected in step 1010, then the VA 20 prompts the user with "O.K." in step 1016. Step 1016 is followed by a "STO" key stroke command being sent to the portable 12 to complete the memory erase key sequence, which is followed by the VA 20 returning to ready mode 320 (FIG. 11) through ready mode step 1020. However, if the user responds to the prompt in step 1008 with "NO" or "CLEAR", as detected in step 1012, then the VA 20 goes to step 984 to return to the delete host memory mode 980 to respecify the delete function. Alternatively, if the user responds to the prompt in step 1008 with "CANCEL", as detected in step 1014, then a CLEAR key stroke command is sent to the portable 12 to abort the delete operation in process and to also return the VA 20 to ready mode 320 (FIG. 11) through ready mode step 1020. Note that if none of the expected responses to the prompt in step 1008 is detected in steps 1010, 1012, or 1014, then the VA 20 goes back (loops back) to step 1010.

Returning to step 986, as indicated above, the user may respond with "CLEAR", as detected in step 990, instead of responding to the prompt in step 986 with digits for detection in step 988. If the first digit, as would be detected in step 988, has not yet been detected in step 988, as determined in step 992, then the delete host memory operation of the delete host memory mode 980 is canceled and the VA 20 goes to delete memory mode 880 (FIG. 24) through delete memory mode step 994. Alternatively, if the first digit has already been detected in step 988, as determined in step 992, then the delete host memory operation in process is canceled and the VA 20 goes to step 984 to restart the delete host memory mode 980.

Again, going back to step 986, however, if the user instead responds to the prompt in step 986 with "CANCEL", as detected in step 996, then the delete host memory operation in process is canceled to return the VA 20 to ready mode 320 (FIG. 11) through ready mode step 998. However, if none of the expected responses are detected in steps 988, 990, or 996 then the VA 20 goes back (loops back) to step 988 from step 996.

Figure 28:
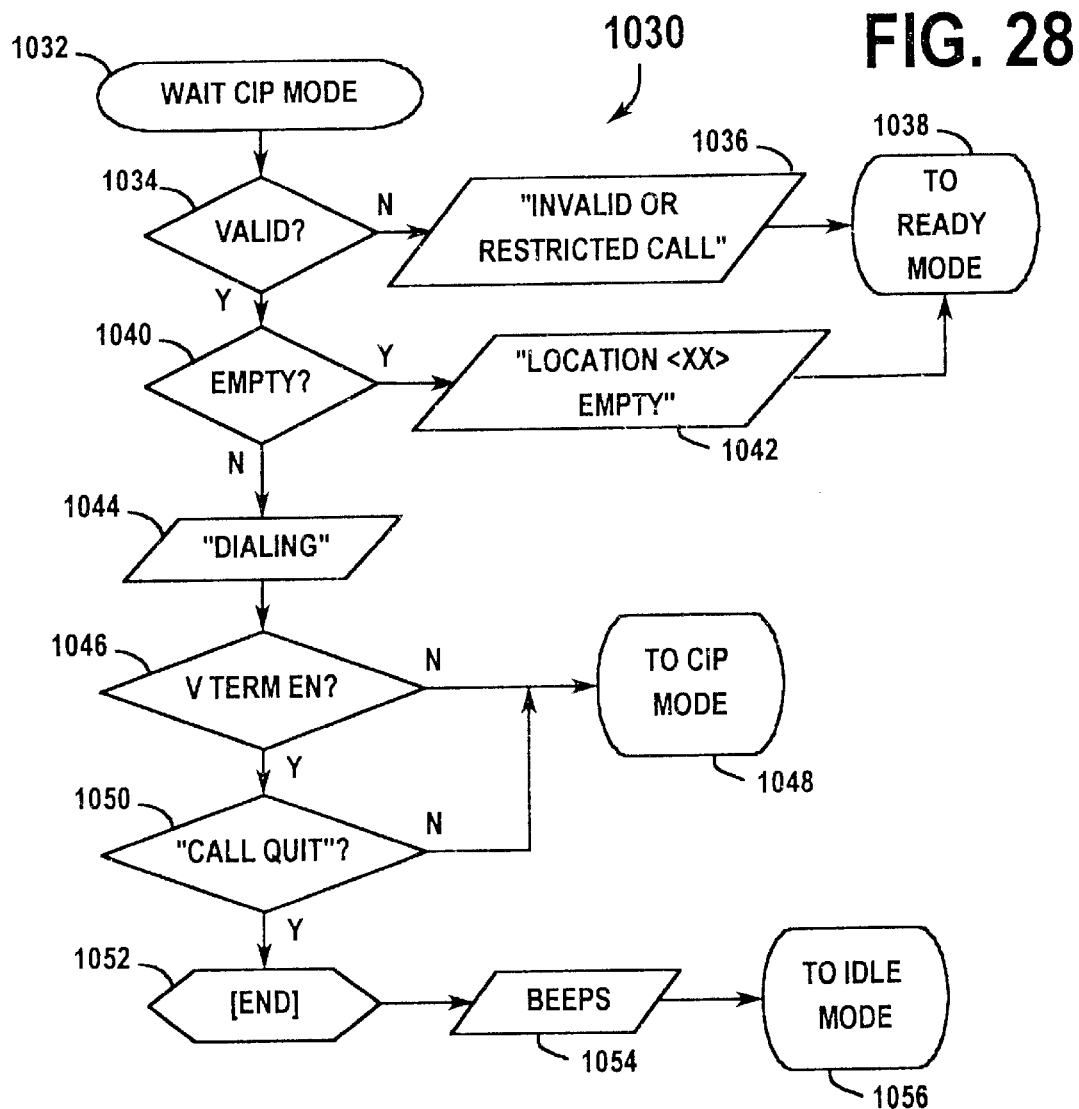
FIG. 28 is a flow chart representation of a wait call in process (CIP) mode of operation thereof.

Consideration is now directed to FIG. 28, which is a flow chart representation of a wait CIP (waiting for CIP) mode 1030 of operation of the VA 20. For the VA 20, any discussions herein of "to wait CIP mode", followed by a numerical reference, represent a flow to the wait CIP mode 1030 and steps therein below wait CIP mode 1032. Note that during wait CIP mode 1030, any other operation in process in the VA 20 is terminated. If a setting of the VA 20, i.e., voice termination, is not enabled (VOICE TERMINATION ENABLE=OFF), then voice recognition algorithms in the wait CIP mode 1030 should be turned off in the VA 20. Also note that all global keywords are not active in the wait CIP mode 1030.

In step 1034, the VA 20 determines whether there is a memory location number error (i.e., is the memory location number valid). If the memory location number is not valid, then the VA 20 prompts the user with "INVALID OR RESTRICTED CALL" in step 1036, followed by the VA 20 going to ready mode 320 (FIG. 11) through ready mode step 1038. On the other hand, if the memory location number is valid as determined in step 1034, then it is determined in step 1040 whether the memory location is empty. If the memory location is empty, as detected in step 1040, then the VA 20 prompts the user with "LOCATION <xx> EMPTY" in step 1042 (where xx represents the memory location combination number as above), and then the VA 20 goes to ready mode 320 (FIG. 11) through ready mode step 1038.

Alternatively, if the memory location is not empty as determined in step 1040, then the VA 20 prompts the user with "DIALING" in step 1044. Now if the setting of the VA 20, i.e., the voice termination, is enabled (VOICE TERMINATION ENABLE=ON), as determined in step 1046, and if the user responds to the prompt in step 1044 with "CALL QUIT", as detected in step 1050, then the VA 20 sends an END key stroke command in step 1052 to the portable 12 to terminate the call in process (CIP). Following step 1052, the VA 20 issues two (2) beeps in step 1054 over the speaker 28, and then the VA 20 goes to idle mode 200 (FIG. 8) through idle mode step 1056.

Note that back in step 1046, if the setting of the VA 20, i.e., the voice termination, is, instead, not enabled (i.e., VOICE TERMINATION=OFF), as determined in step 1046, then the VA 20 goes to CIP mode 1060, which will be described below in more detail in reference to FIG. 29, through CIP mode step 1048. Now, if VOICE TERMINATION=OFF, and if the user responds to the prompt in step 1044 with "CALL QUIT", then this response is not detected at all in step 1050 since step 1050 is skipped as indicated in FIG. 28. However, if the setting of the VA 20, i.e., the voice termination, is enabled (VOICE TERMINATION ENABLE=ON), as determined in step 1046, and if the user does not respond to the prompt in step 1044 with "CALL QUIT", as would be detected in step 1050, then the VA 20 also goes to CIP mode 1060 (FIG. 29) through CIP mode step 1048.

Figure 29:
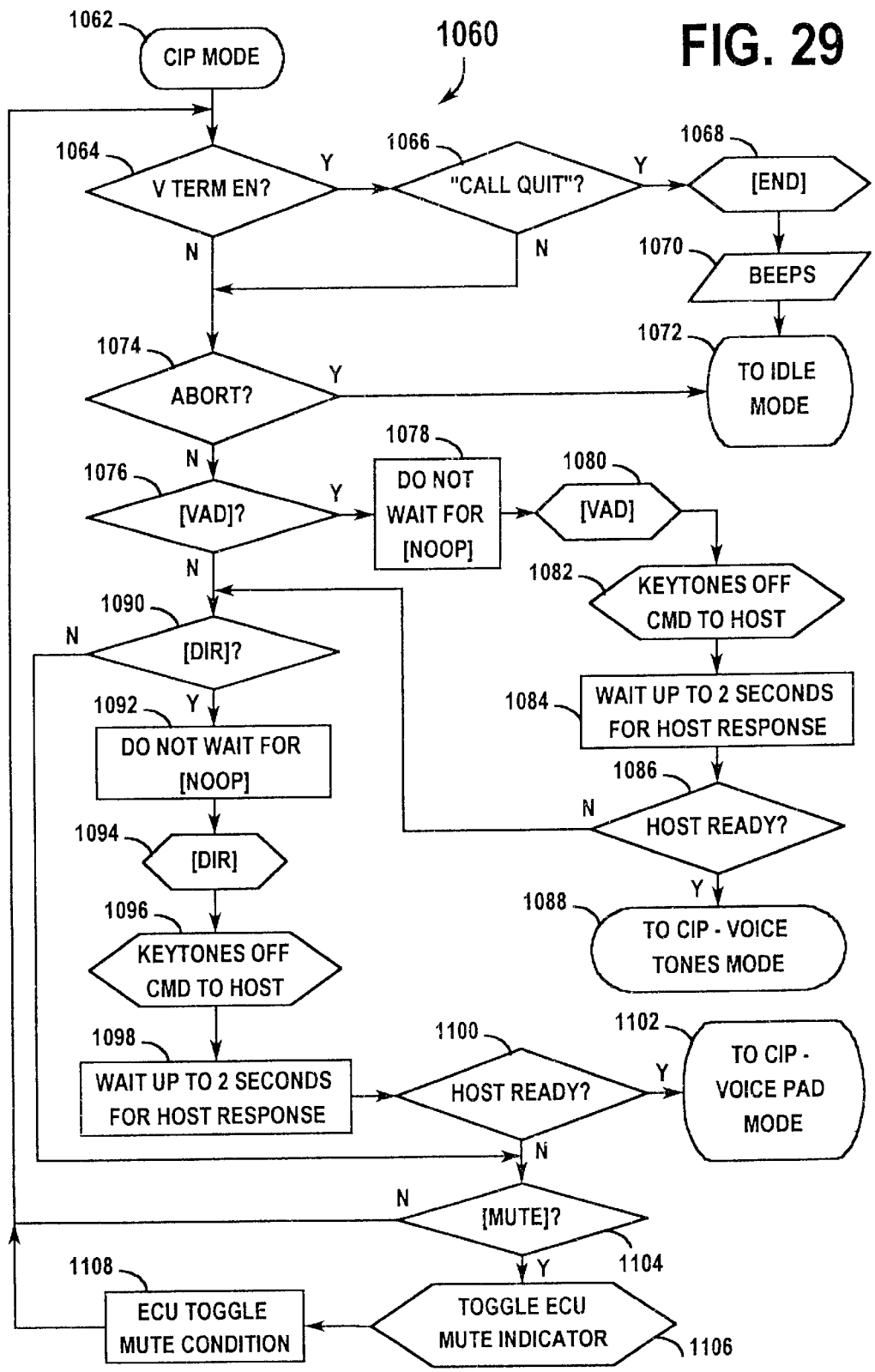
FIG. 29 is a flow chart representation of a CIP mode of operation thereof.

Attention is now focused on FIG. 29, which is a flow chart representation of a CIP (call in process) mode 1060 of operation of the VA 20. For the VA 20, any discussions herein of "to CIP mode", followed by a numerical reference, represent a flow to the CIP mode 1060 and steps therein below CIP mode 1062. In CIP mode 1060, any other operation in process in the VA 20 is terminated. If VOICE TERMINATION ENABLE=OFF, voice recognition algorithms of the VA 20 are not active in the CIP mode 1060. Also, note that the global keywords are not active in the CIP mode 1060.

In the CIP mode 1060, in step 1064, it is determined whether the VA 20 is set for voice termination enabled. For voice termination enabled, if the user says "CALL QUIT", as detected in step 1066, then an END key stroke command is sent to the portable 12 from the VA 20 in step 1068 to terminate the call in process. Following step 1068, the VA 20 issues two (2) beeps in step 170 over the speaker 28, and then the VA 20 returns to the idle mode 200 (FIG. 8) through idle mode step 1072. Note that if the voice termination is not enabled, as determined in step 1064, then if the user says "CALL QUIT", it is not detected at all in step 1066 since step 1066 is skipped as indicated in FIG. 29. Note also that, as determined in step 1064, if the voice termination is not enabled, or if it is enabled and the user does not say "CALL QUIT", as determined in step 1066, then the VA 20 goes to step 1074, wherein it is determined whether the VA 20 processing is to be aborted. In step 1074, the VA 20 processing is aborted if a TRANSFER TO C-CH (cellular-channel) command is received at the VA 20, in which case the VA 20 goes to idle mode 200 (FIG. 8) through idle mode step.

If the user presses the VAD key 96 on the ECU 26 to activate DTMF dialing by voice, as detected in step 1076, the VA 20 does not wait to receive an associated NOOP from the ECU 26 as indicated in step 1078, but rather, the VAD key 96 command is forwarded by the VA 20 to the portable 12 in step 1080 (as with other key presses in previous charts even though not shown). Step 1080 is followed by sending a KEYTONES OFF command from the VA 20 to the portable 12 in step 1082, and then the VA 20 waits for up to two (2) seconds (time-out in the first preferred embodiment) for the portable 12 to respond to the KEYTONES OFF command in step 1084. If the host (the portable 12) is ready, as determined in step 1086, the portable 12 is in DTMF manual dial mode and the VA 20 (the portable 12) goes to CIP-voice tones mode 1120, which will be described below in more detail in reference to FIG. 30, through CIP-voice tones mode step 1088. However, back in step 1086, if the host (the portable 12) is not ready, then the VAD key 96 key press command is ignored and the VA 20 stays in the CIP mode 1060, going to step 1090, which will be described below.

Considering step 1076 again, if the user does not press the VAD key 96 of the ECU 26, as detected in step 1076, then it is determined in step 1090 whether the user presses the DIR key 94 of the ECU 26 instead to activate the scratchpad entry (the scratchpad memory 126 of the portable 12) by voice. If the user presses the DIR key 94 on the ECU 26 to activate scratchpad entry by voice, as detected in step 1090, the VA 20 does not wait to receive an associated NOOP from the ECU 26 as indicated in step 1092, but rather, the DIR key 94 command is forwarded by the VA 20 to the portable 12 in step 1094. Step 1094 is followed by sending a KEYTONES OFF command from the VA 20 to the portable 12 in step 1096, and then the VA 20 waits for up to two (2) seconds (time-out in the first preferred embodiment) for the portable 12 to respond to the KEYTONES OFF command in step 1098. If the host (the portable 12) is ready (VAD READY is received at the VA 20), as determined in step 1100, the portable 12 has entered silent scratchpad mode and the VA 20 goes to CIP-voice pad mode 1150, which will be described below in more detail in reference to FIG. 31, through CIP-voice pad mode step 1102.

However, back in step 1100, if the host (the portable 12) is not ready, then the DIR key 94 key press command is ignored and the VA 20 stays in the CIP mode 1060, going to step 1104 to determine whether the user presses the MUTE key 90. If the MUTE key 90 is pressed, as detected in step 1104, then the portable 12, through the VA 20, sends a command to the ECU 26 to toggle the ECU mute indicator (light) 92 status in step 1106. Step 1106 is followed by step 1108 in which the ECU 26 actually toggles the status of the mute condition indicator, followed by the VA 20 going back to step 1064 and staying in the CIP mode 1060. Note that for any other key press on the ECU 26, this other key press is ignored by the VA 20 and the VA 20 stays in the CIP mode 1060.

Considering step 1104 again, if the MUTE key 90 on the ECU 26 is not pressed by the user, as determined in step 1104, then the VA 20 goes back to step 1064 and stays in the CIP mode 1060. Moreover, considering step 1090 again, if the DIR key 94 on the ECU 26 is not pressed by the user, as determined in step 1090, then the VA 20 goes to step 1104 and stays in the CIP mode 1060 also.

Figure 30:
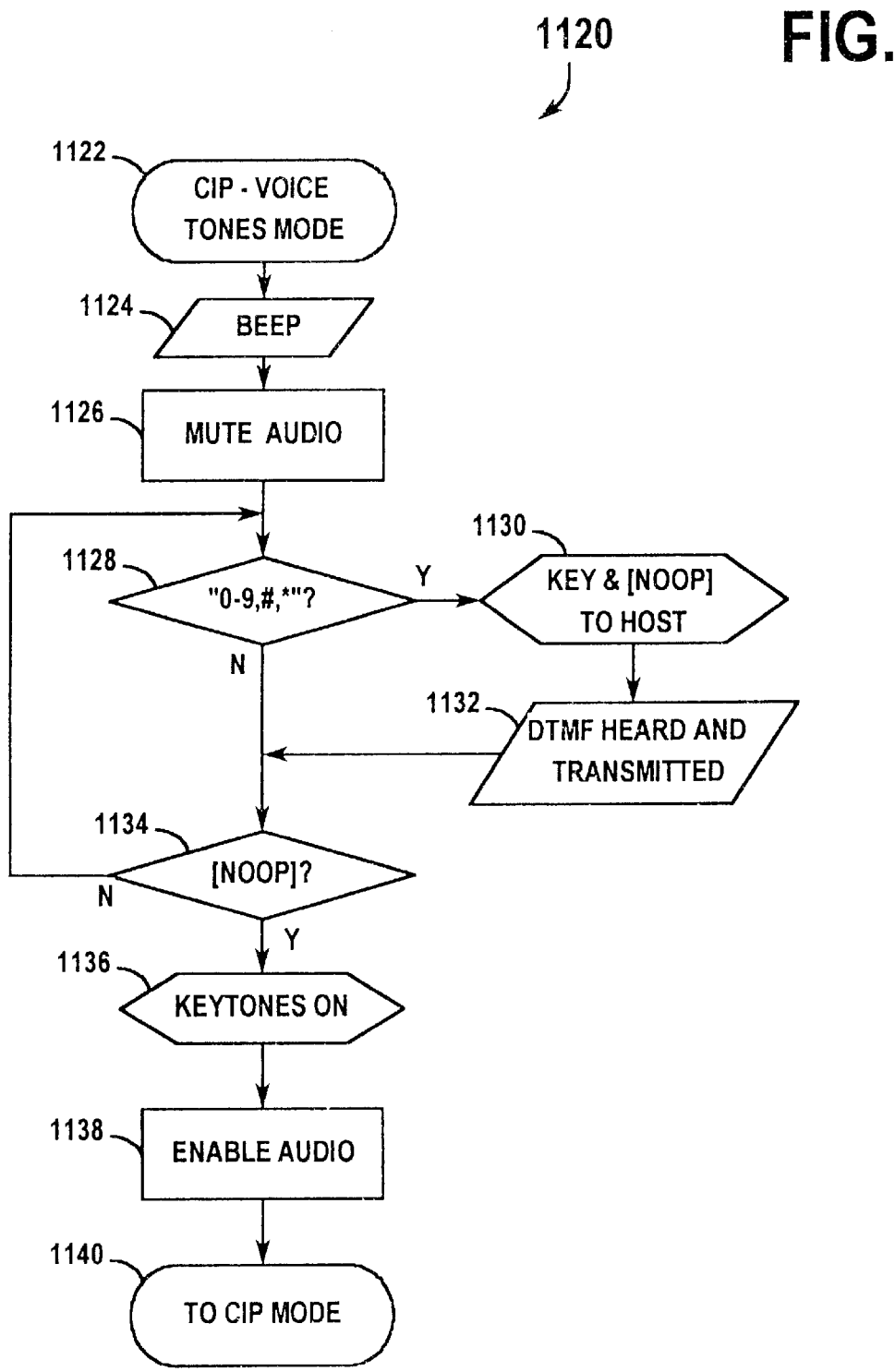
FIG. 30 is a flow chart representation of CIP—voice tones mode of operation thereof.

Consideration now centers on FIG. 30, which is a flow chart representation of a CIP-voice tones mode 1120 of operation of the VA 20. For the VA 20, any discussions herein of "to CIP-voice tones mode", followed by a numerical reference, represent a flow to the CIP-voice tones mode 1120 and steps therein below CIP-voice tones mode 1122. The CIP-voice tones mode 1120 allows DTMF tone dialing by voice as long as the VAD key 96 on the ECU 26 is depressed by the user. In step 1124, the VA 20 issues a single beep as a confirmation of being in the CIP-voice tones mode 1120. Note that the portable 12 is now in a DTMF manual dial mode. In step 1126, any audio signals received from the user or the distant party (e.g., still during the cellular telephone call) are muted and are not sent out over the audio lines to the portable 12 or the speaker 28, respectively. Now in step 1128, the user says aloud a digit (i.e., the user says aloud one digit at a time for each passage through step 1128) chosen from the digits 0–9, #, or *, as indicated by "0–9, #, *" in step 1128. The saying of the digit aloud is picked up by the microphone 70 of the ECU 26 and converted to an audio signal which is recognized by the VA 20 to generate a key command which is sent to the portable 12 to generate a DTMF tone (a DTMF tone is generated which corresponds to the digit said aloud). Note that, again, saying the letter "O" is recognized as if the user says "zero".

Note also that, as the user says the digit aloud, it is not necessary to provide a confirmation tone for the digit recognized by the VA 20 since a DTMF tone will be generated anyway by the portable 12 in the DTMF manual dial mode. In step 1130, a digit key stroke corresponding to the recognized digit, as well as a NOOP associated with the VAD key 96 being depressed, are sent to the portable 12 from the VA 20. This is followed by outputting the DTMF tone for the digit, which was said aloud by the user, over the speaker 28 to be heard by the user, as well as transmitting the DTMF tone from the portable 12 (e.g., during a cellular telephone call) in step 1132. The DTMF tone may be required to access features during a cellular telephone call to a system external to the VA 20, for example, to receive bank account information. Note that there are numerous other application which may be envisioned for the VA 20 in accordance with the present invention.

Returning to FIG. 30, it is determined, in step 1134, by the VA 20 whether the user has released the VAD key 96 on the ECU 26 by detecting an associated NOOP. If the VAD key 96 is not released by the user, then the VA 20 goes back (loops back) to step 1128 to receive a next digit said aloud by the user. However, if the NOOP associated with the release of the VAD key 96 on the ECU 26 is detected in step 1134, then a KEYTONES ON command is sent from the VA 20 to the portable 12 in step 1136, followed by re-enabling audio signals again in step 1138 (e.g., by the VA 20 during a cellular telephone call). After step 1138, the VA 20 goes to CIP mode 1060 (FIG. 29) through CIP mode step 1140.

Figure 31:
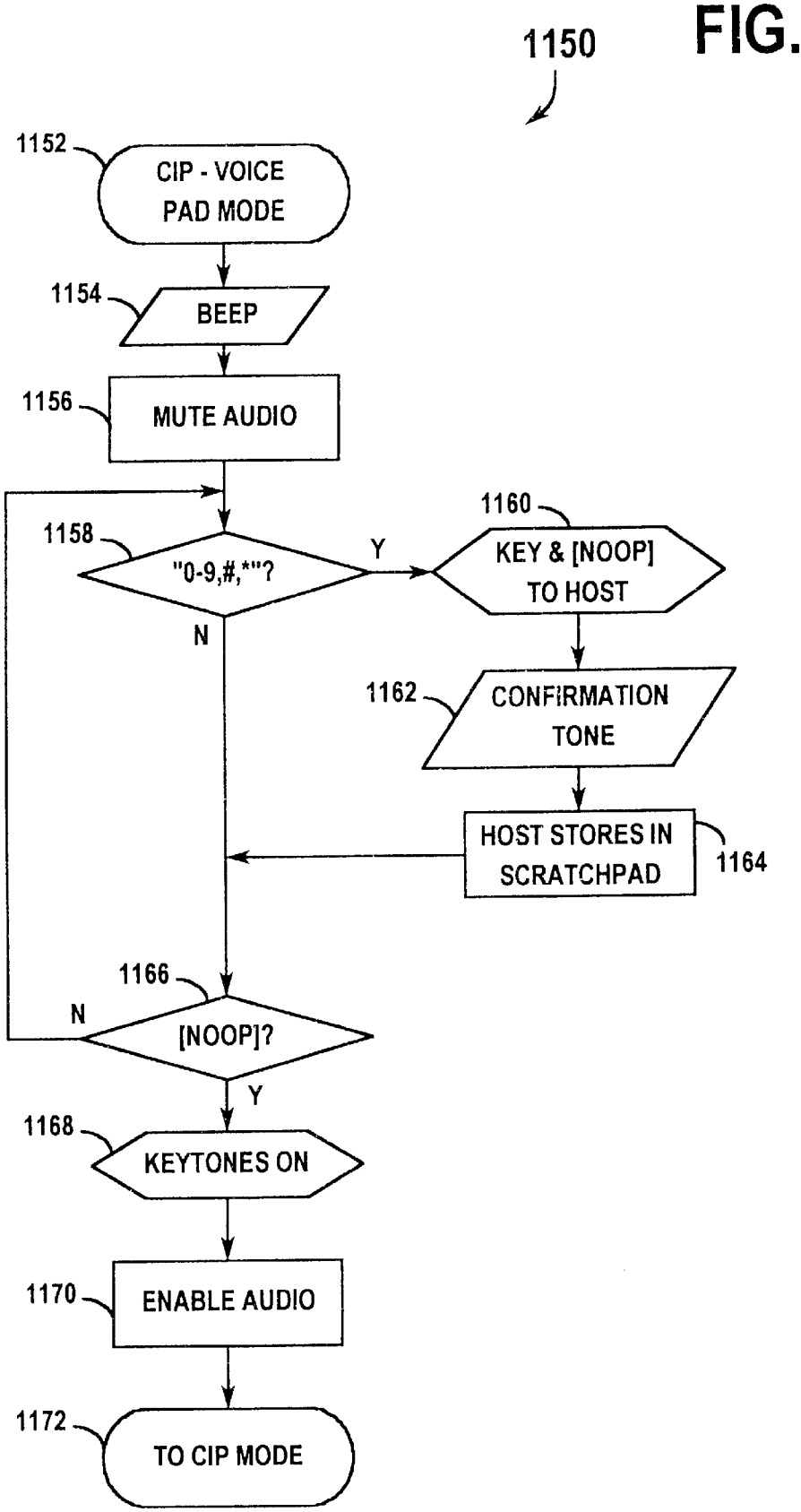
FIG. 31 is a flow chart representation of CIP—voice pad mode of operation thereof.

Reference is now made to FIG. 31, which is a flow chart representation of a CIP-voice pad mode 1150 of operation of the VA 20. For the VA 20, any discussions herein of "to CIP-voice pad mode", followed by a numerical reference, represent a flow to the CIP-voice pad mode 1150 and steps therein below CIP-voice pad mode 1152. The CIP-voice pad mode 1150 allows scratchpad entry (to scratchpad memory 126 of the portable 12) by voice as long as the DIR key 94 of the ECU 26 is depressed. In step 1154, the VA 20 issues a single beep as a confirmation of being in the CIP-voice pad mode 1150. Note that the portable 12 is now in a silent scratchpad mode. In step 1156, any audio signals received from the user or the distant party (e.g., still during the cellular telephone call) are muted and are not sent out over the audio lines to the portable 12 or the speaker 28, respectively. Now in step 1158, if the user says aloud a digit, as for the CIP-voice tones mode 1120, (i.e., the user says aloud one digit at a time for each passage through step 1158) chosen from the digits 0–9, #, or *, as indicated by "0–9, #, *" in step 1158, the saying of the digit aloud is picked up by the microphone 70 of the ECU 26 and converted to an audio signal which is recognized by the VA 20 to generate a digit to be stored in the scratchpad memory 126 of the portable 12. Note that, again, saying the letter "O" is recognized as if the user says "zero".

Note also that, as the user says the digit aloud, the VA 20 will provide a confirmation tone for each digit recognized by the VA 20 since KEYTONES=OFF in the portable 12 (see step 1162 below). In step 1160, a digit key stroke corresponding to the recognized digit, as well as an associated NOOP, are generated in the VA 20 and sent to the portable 12 from the VA 20. This is followed by outputting the confirmation tone for the digit, which was said aloud by the user, over the speaker 28 to be heard by the user in step 1162, which is, in turn, followed by the portable 12 storing the generated digit in the scratchpad memory 126 of the portable 12 in step 1164.

Now, in step 1166, it is determined by the VA 20 whether the user has released the DIR key 94 on the ECU 26 by detecting an associated NOOP for a key release of the DIR key 94. If the DIR key 94 is not released by the user, then the VA 20 goes back (loops back) to step 1158 to receive a next digit said aloud by the user. However, if the NOOP associated with the release of the DIR key 94 on the ECU 26 is detected in step 1166, then a KEYTONES ON command is sent from the VA 20 to the portable 12 in step 1168, followed by re-enabling audio signals again in step 1170. After step 1170, the VA 20 goes to CIP mode 1060 (FIG. 29) through CIP mode step 1172.

It is intended that the scope of the present invention also include various other embodiments. Accordingly, it should be understood that the each of the embodiments disclosed herein, including the first preferred embodiment, includes features and characteristics which are considered independently inventive. Thus, the disclosure of variations and alterations of the preferred embodiment is intended only to reflect on the breadth of the scope of the present invention without suggesting that any of the specific features and characteristics of the first preferred embodiment are more obvious or less important.

Regarding specific application of the many inventive aspects of the present invention, a variety of environmental and economic considerations are understood to contribute to the alteration or omission of selected inventive aspects. For example, while the ECU of the first preferred embodiment does not include a display or all of the keys present on conventional primary control units, such is not the case with some other embodiments of the present invention where conservation of vehicle space is not a concern or the drivers of a particular type of car prefer to see those elements. Nonetheless, other inventive aspects of the present invention are included in those larger ECU's, such as, for example, at least one of the VAD and DIR keys integrated to invoke associated unique functions of the first preferred embodiment discussed above. Likewise, mere removal of the ECU internal microphone to another location in the vehicle is certainly contemplated depending on vehicle shapes and noise patterns. Furthermore, other embodiments of the present invention include enabling portable telephones alone (no ECU) to take full advantage of a VA through new keystroke combinations of current keys on the portable telephone, as well as the addition of new designated keys. Still other embodiments include a full-function handset automotive system instead of the portable/holder system of the first preferred embodiment.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of all means or step plus function elements in the claims below are intended to include any structure, material, or acts for performing the functions in combination with other claimed elements as specifically claimed.

I claim:

1. A method for interfacing a voice activated vehicular telephone system with a user through an external control unit with a plurality of user keys, said method comprising steps of:

monitoring a first user key of the plurality of user keys on the external control unit to detect user operation of the first user key;

playing a voice prompt through the voice activated vehicular telephone system requesting the user to speak a telephone number to be dialed responsive to detecting user operation of the first user key;

monitoring a second user key of the plurality of user keys on the external control unit to detect user operation of the second user key; and playing a voice prompt through the voice activated vehicular telephone system requesting the user to speak a name of a stored audio label associated with a stored telephone number to be dialed responsive to detecting user operation of the second user key.

2. The method of claim 1, wherein the playing steps are each further responsive to a step of determining that a call is not in progress.

3. The method of claim 2, further including a step of converting spoken digits into transmitted DTMF digits responsive to both the voice activated vehicular telephone system being in a call in process mode and user operation of the first user key being detected.

4. The method of claim 2, further including a step of, responsive to both the voice activated vehicular telephone system being in a call in process mode and user operation of the second user key being detected, converting spoken digits into digits in memory available for immediate dialing upon completion of the call.

5. The method of claim 1, further including a step after the first playing step of recording a spoken telephone number through a microphone in the external control unit, and further including a step after the second playing step of recording a spoken name through the microphone in the external control unit.

6. The method of claim 1, wherein the external control unit includes at most only a partial complement of digit keys, whereby voice interaction with the voice activated vehicular telephone system is promoted.

7. A method for interfacing a voice activated vehicular telephone system with a user through an external control unit with a plurality of user keys, said method comprising steps of:

monitoring a first user key of the plurality of user keys on the external control unit to detect user operation of the first user key;

recognizing a call in process mode of operation of the voice activated vehicular telephone system; and responsive to both detecting user operation of the first user key and recognition of the call in process mode of operation of the voice activated vehicular telephone system, converting spoken digits into transmitted DTMF digits.

8. The method of claim 7, further comprising steps of monitoring a second user key of the plurality of user keys on the external control unit to detect user operation of the second user key; and responsive to both detecting user operation of the second user key and recognition of the call in process mode of operation of the voice activated vehicular telephone system, converting spoken digits into digits in memory available for immediate dialing upon completion of the call.

9. The method of claim 8, further comprising a step of playing a voice prompt through the voice activated vehicular telephone system requesting the user to speak a name of a stored audio label associated with a stored telephone number to be dialed responsive to detecting user operation of the second user key and a lack of recognition of the call in process mode of operation of the voice activated vehicular telephone system.

10. The method of claim 7, further comprising a step of playing a voice prompt through the voice activated vehicular telephone system requesting the user to speak a telephone number to be dialed responsive to detecting user operation of the first user key and a lack of recognition of the call in process mode of operation of the voice activated vehicular telephone system.

11. A voice activated vehicular telephone system comprising:

a portable telephone including a plurality of keys;

a portable telephone holder coupled to said portable telephone;

a voice adapter coupled to said portable telephone holder and including voice processing circuitry; and an external control unit coupled to said voice adapter and including a plurality of keys totaling fewer than said plurality of keys included in said portable telephone.

12. The apparatus of claim 11, wherein said external control unit includes at most only a partial complement of digit keys, whereby voice interaction with said voice activated vehicular telephone system is promoted.

13. The apparatus of claim 11, wherein said plurality of keys included in said external control unit includes a voice activated dialing key and a directory key.

14. The apparatus of claim 13, wherein said voice adapter is configured to, responsive to being notified by said external control unit of the use of said voice activated dialing key, playback an audible system prompt requesting the user to speak a number to be dialed, and wherein said voice adapter is configured to, responsive to being notified by said external control unit of the use of said directory key, playback an audible system prompt requesting the user to speak a name of a stored audio label associated with a stored telephone number to be dialed.

15. The apparatus of claim 13, wherein said voice adapter is configured to, responsive to being notified by said external control unit of the use of said voice activated dialing key during a call in process mode of operation, convert spoken digits into transmitted DTMF digits, and wherein said voice adapter is configured to, responsive to being notified by said external control unit of the use of said directory key during a call in process mode of operation, converting spoken digits into digits in memory available for immediate dialing upon completion of the call in process mode of operation.

16. The apparatus of claim 11, wherein said voice activated vehicular telephone system consists of only one visual display, wherein said one visual display is included on said portable telephone.

17. An external control unit apparatus for being mounted in a vehicle to provide a user interface to a voice activated vehicular telephone system, said apparatus comprising:
   a rigid vehicular mounting structure;
   a plurality of keys connected to said rigid vehicular mounting structure, wherein said external control unit apparatus includes at most only a partial complement of digit keys, whereby voice interaction with the voice activated vehicular telephone system is promoted; and
   an interface circuit connected to said rigid vehicular mounting structure and coupled to said plurality of keys for coupling said plurality of keys to the voice activated vehicular telephone system.

18. The apparatus of claim 17, wherein said external control unit includes fewer than five digit keys.

19. The apparatus of claim 17, wherein said external control unit includes fewer than fifteen keys.

20. The apparatus of claim 19, wherein said plurality of keys includes a plurality of speed dial keys, a send key, an end key, a mute key, and a pair of volume keys.

21. The apparatus of claim 17, wherein said plurality of keys includes a voice activated dialing key and a directory key.

22. The apparatus of claim 21, wherein said voice activated dialing key is so connected to said voice activated vehicular telephone system that use of said voice activated dialing key results in playback of an audible system prompt requesting the user to speak a number to be dialed.

23. The apparatus of claim 22, wherein said playback occurs when said voice activated dialing key is activated while a call is not in progress, and wherein said voice activated dialing key is so connected to said voice activated vehicular telephone system that use of said voice activated dialing key during a call results in said voice activated telephone system converting spoken digits into transmitted DTMF digits.

24. The apparatus of claim 21, wherein said directory key is so connected to said voice activated vehicular telephone system that use of said directory key results in playback of an audible system prompt requesting the user to speak a name of a stored audio label associated with a stored telephone number to be dialed.

25. The apparatus of claim 24, wherein said playback occurs when said directory key is activated while a call is not in progress, and wherein said directory key is so connected to said voice activated vehicular telephone system that use of said directory key during a call results in said voice activated vehicular telephone system converting spoken digits into digits in memory available for immediate dialing upon completion of the call.

26. The apparatus of claim 17, further comprising a microphone connected to said rigid vehicular mounting structure and coupled to said interface circuit to provide audio input to said voice activated vehicular telephone system.

* * * * *